United States Patent
Ogasahara et al.

(10) Patent No.: US 6,963,423 B2
(45) Date of Patent: Nov. 8, 2005

(54) IMAGE PROCESSING METHOD AND APPARATUS

(75) Inventors: Takayuki Ogasahara, Kanagawa (JP); Hiroshi Tajika, Kanagawa (JP); Yuji Konno, Kanagawa (JP); Norihiro Kawatoko, Kanagawa (JP); Tetsuya Edamura, Kanagawa (JP); Tetsuhiro Maeda, Kanagawa (JP); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 608 days.

(21) Appl. No.: 09/940,529

(22) Filed: Aug. 29, 2001

(65) Prior Publication Data

US 2002/0054305 A1 May 9, 2002

(30) Foreign Application Priority Data

Aug. 31, 2000 (JP) .................................... 2000-264351
Jul. 31, 2001 (JP) .................................... 2001-232918

(51) Int. Cl.[7] ............................................. G06F 15/00
(52) U.S. Cl. .................... 358/1.8; 358/1.9; 358/1.2; 358/3.02; 358/3.09; 347/41; 347/43
(58) Field of Search ..................... 388/1.8; 347/41, 347/43, 104; 358/1.9, 1.2, 1.1, 3.02, 3.09, 3.12

(56) References Cited

U.S. PATENT DOCUMENTS

| 5,568,168 | A |  | 10/1996 | Watanabe ..................... 347/43 |
| 5,673,074 | A |  | 9/1997 | Miyauchi et al. ............ 347/104 |
| 6,155,668 | A | * | 12/2000 | Otsuki et al. .................. 347/41 |

FOREIGN PATENT DOCUMENTS

| EP | 0 879 705 | 11/1998 |
| EP | 0 936 075 | 8/1999 |
| JP | 11-291506 | 10/1999 |
| JP | 00-203882 | 7/2000 |

* cited by examiner

*Primary Examiner*—Twyler Lamb
(74) *Attorney, Agent, or Firm*—Fitzpatrick, Cella, Harper & Scinto

(57) ABSTRACT

Printing on an area of a printing medium in which printing locations may be significantly deviated due to inaccurate feeding of the printing medium can be performed, without degrading image quality. Specifically, when lines in this area (second area) are printed using four scanning operations (passes) of a print head, a duty in masking process is set at zero for the scanning operation (pass A) after a change-line operation for feeding the printing medium with a possible large shift feeding error, and is distributed to other scanning operations. Thus, no dots are formed during this scanning operation (pass A), thereby preventing significantly deviated dots from being formed.

27 Claims, 48 Drawing Sheets

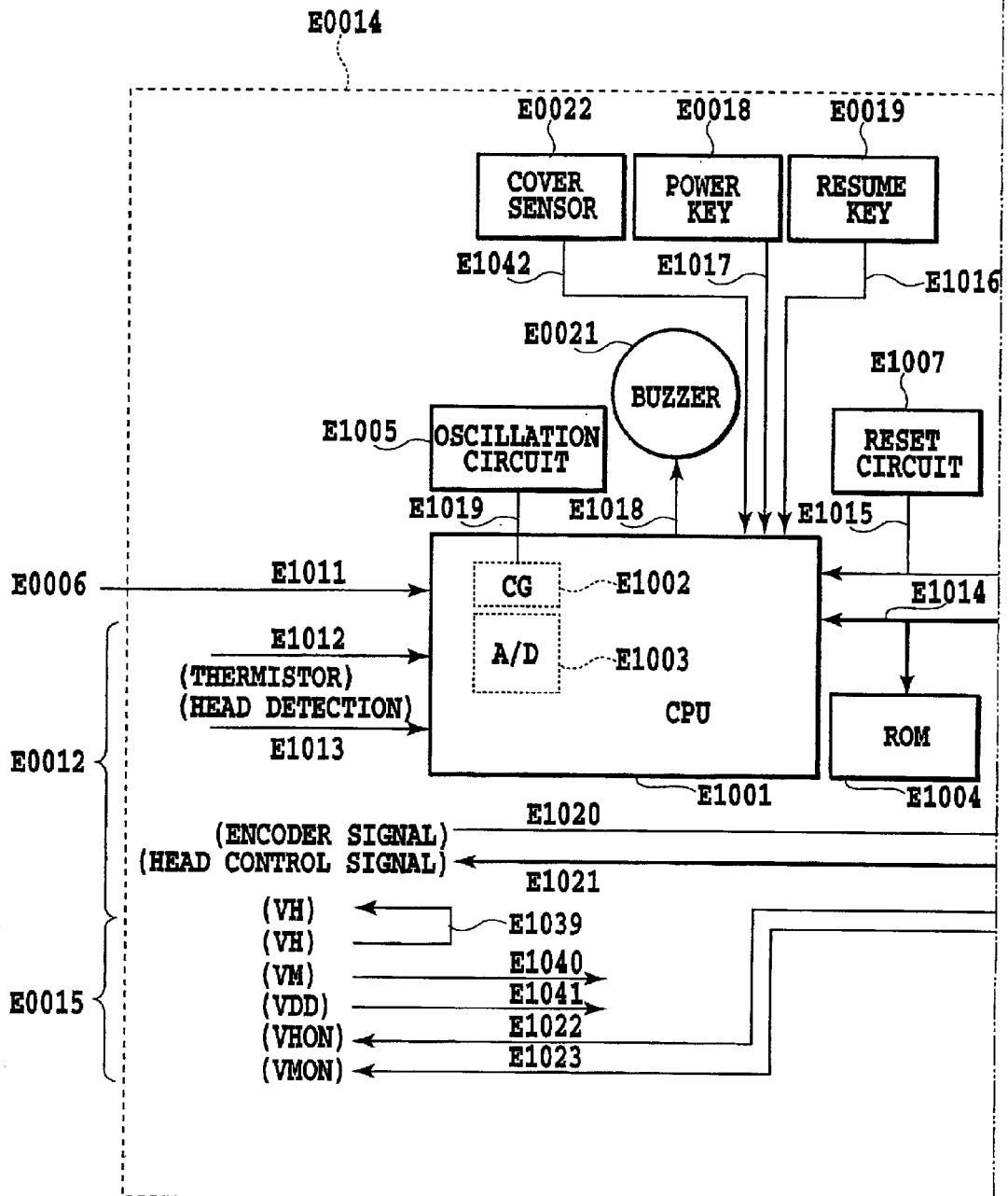

PATCH PRINTED ON
AREA OF SHEET
WHICH IS ENSURED
THAT SHEET IS FED
ACCURATELY
(FIRST AREA)

PATCH PRINTED ON
AREA OF SHEET
WHICH IS NOT
ENSURED
THAT SHEET IS FED
ACCURATELY
(SECOND AREA)

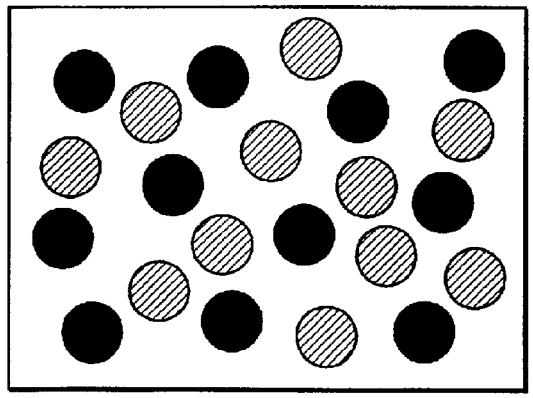
FIG.23A DOT FORMATION WITHOUT DEVIATION OF DOTS
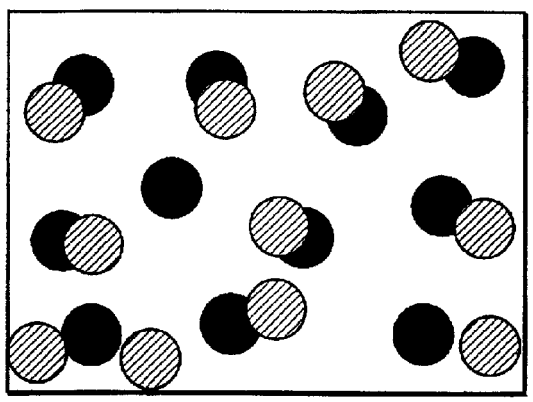
FIG.23B DOT FORMATION WITH DEVIATION OF DOTS CAUSED BY FEEDING ERROR
● DOTS FORMED IN FIRST PASS
◐ DOTS FORMED IN SECOND PASS
◎ NOISE DOTS
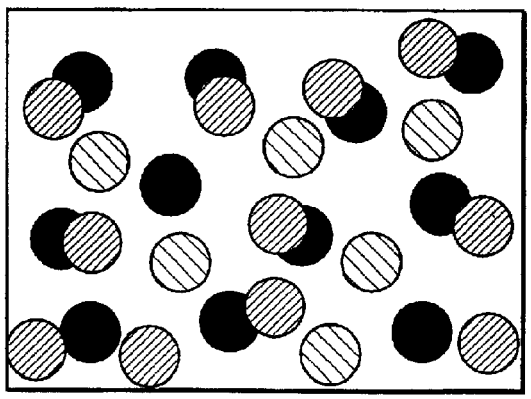
FIG.23C DOT FORMATION OBTAINED BY ADDING NOISE DOTS TO THAT OF FIG.23B

| |
|---|
| FIRST NEW LINE ;NOISE: 0% |
| SECOND NEW LINE ;NOISE: 1% |
| THIRD NEW LINE ;NOISE: 3% |
| FOURTH NEW LINE ;NOISE: 5% |
| FIFTH NEW LINE ;NOISE: 3% |
| SIXTH NEW LINE ;NOISE: 1% |
| SEVENTH NEW LINE ;NOISE: 0% |

FIG.25

DOT FORMATION WITHOUT FEEDING ERROR

DOT FORMATION WITH FEEDING ERROR

● DOTS FORMED IN FIRST PASS

▨ DOTS FORMED IN SECOND PASS

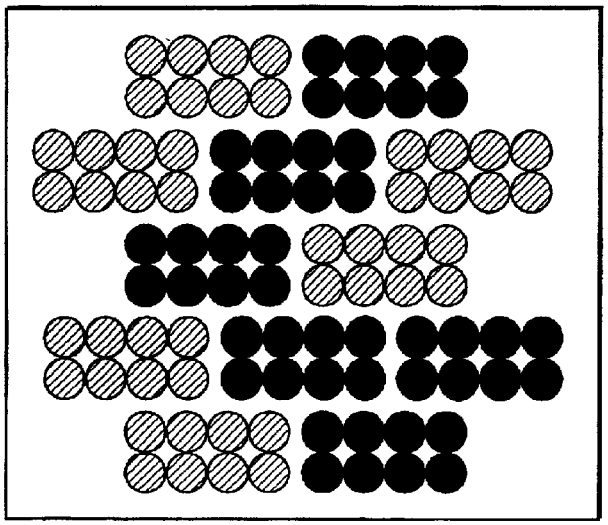
FIG.27A DOT FORMATION WITHOUT FEEDING ERROR
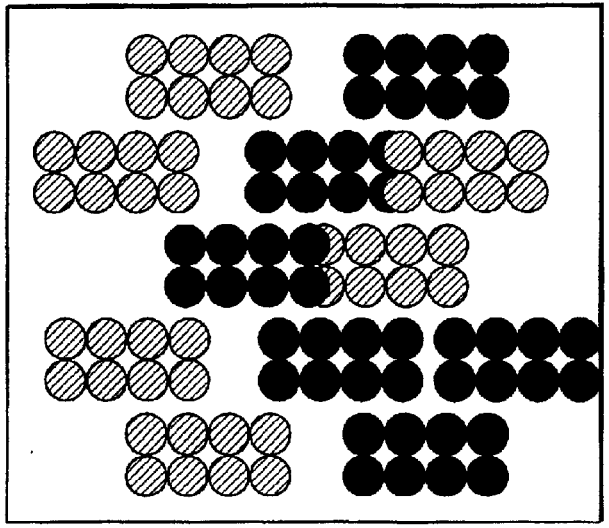
FIG.27B DOT FORMATION WITH FEEDING ERROR
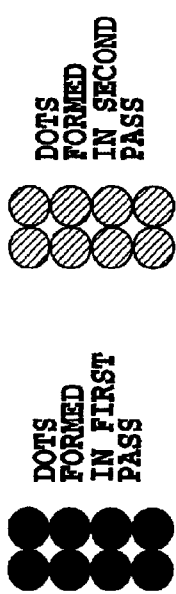
DOTS FORMED IN SECOND PASS
DOTS FORMED IN FIRST PASS

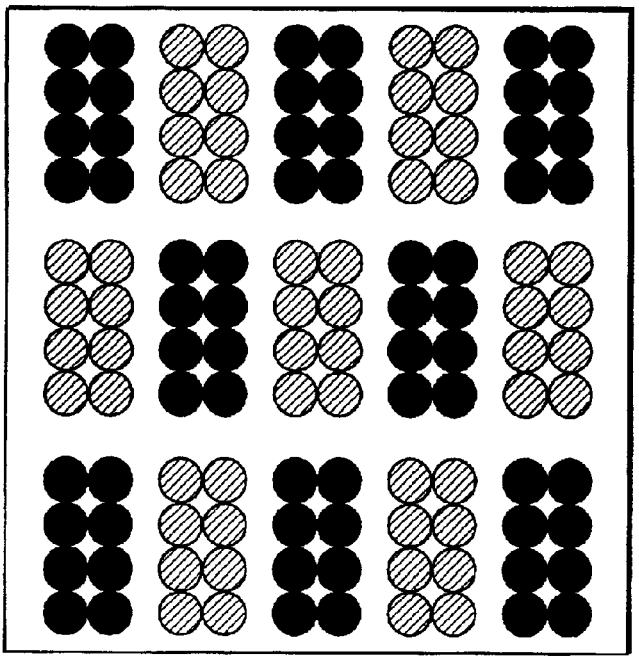
FIG.28A
DOT FORMATION WITHOUT ERROR
IN MAIN-SCANNING DIRECTION
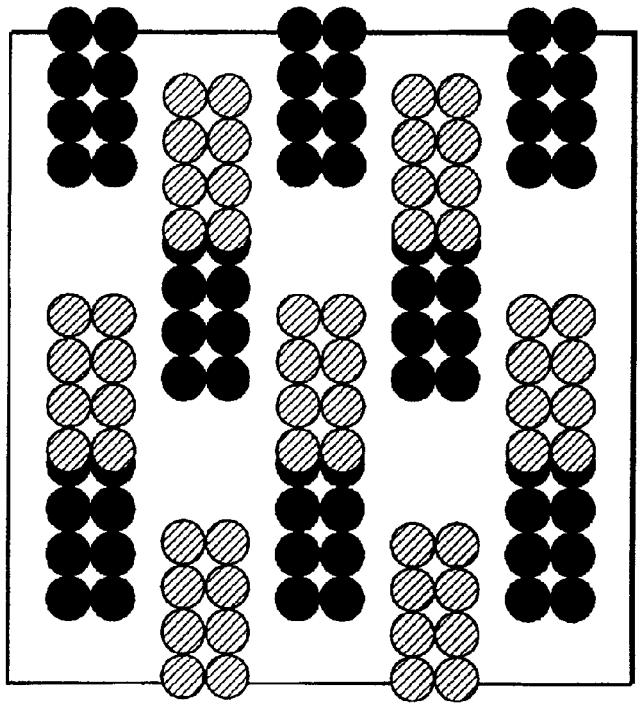
FIG.28B
DOT FORMATION WITH ERROR
IN MAIN-SCANNING DIRECTION
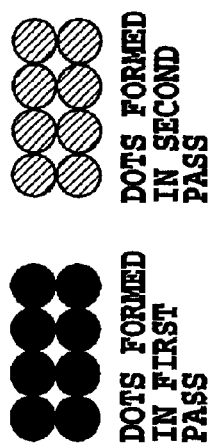
DOTS FORMED IN FIRST PASS
DOTS FORMED IN SECOND PASS

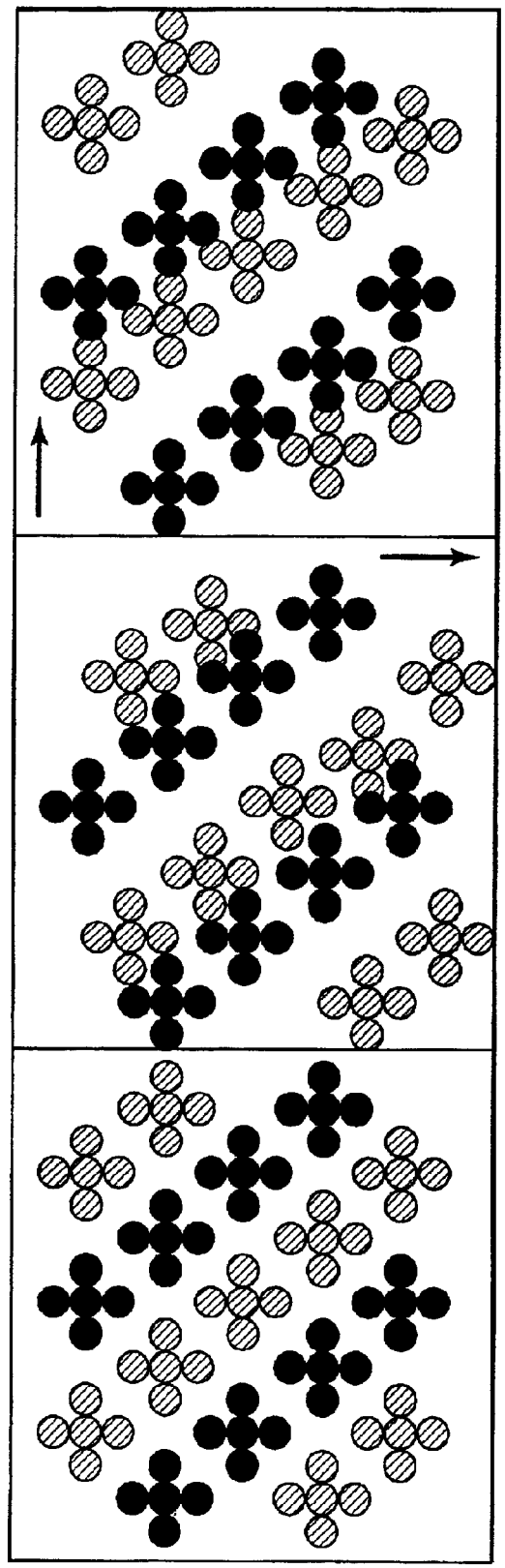
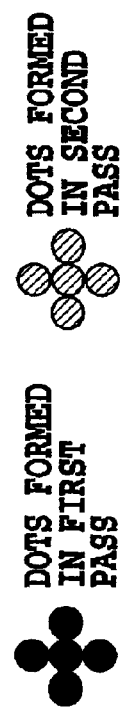
FIG.29A DOT FORMATION WITHOUT FEEDING ERROR
FIG.29B DOT FORMATION WITH ERROR IN SUB-SCANNING DIRECTION
FIG.29C DOT FORMATION WITH ERROR IN MAIN-SCANNING DIRECTION

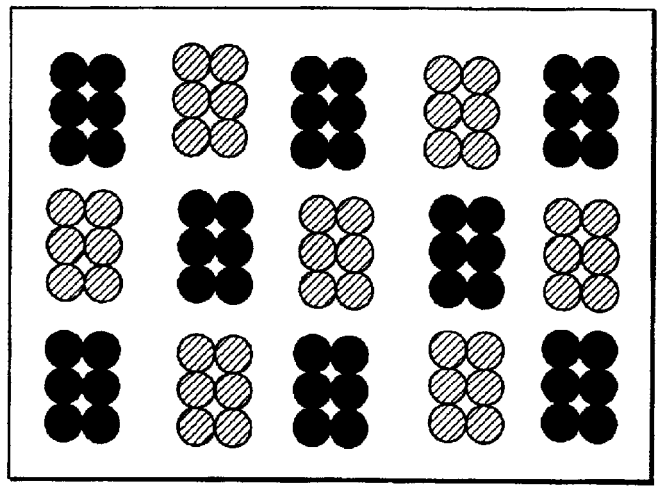
FIG.30A  DOT FORMATION WITHOUT FEEDING ERROR
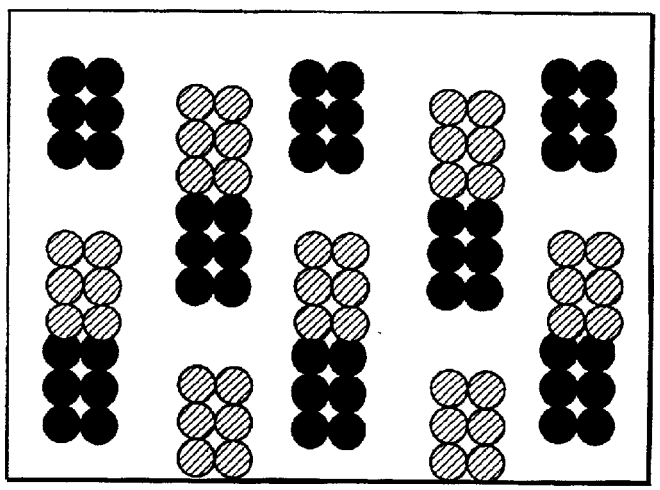
FIG.30B  DOT FORMATION WITH FEEDING ERROR
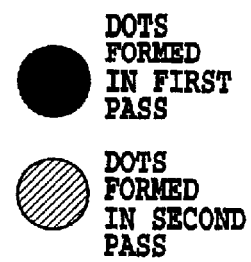
● DOTS FORMED IN FIRST PASS
◐ DOTS FORMED IN SECOND PASS RANDOM DOT FORMATION
(CONTAINING LOW FREQUENCY COMPONENTS)
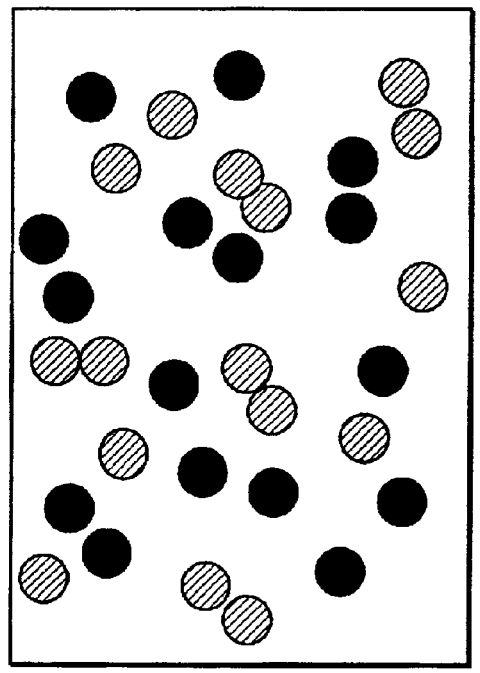
DOT FORMATION
WITHOUT FEEDING ERROR
FIG.31A
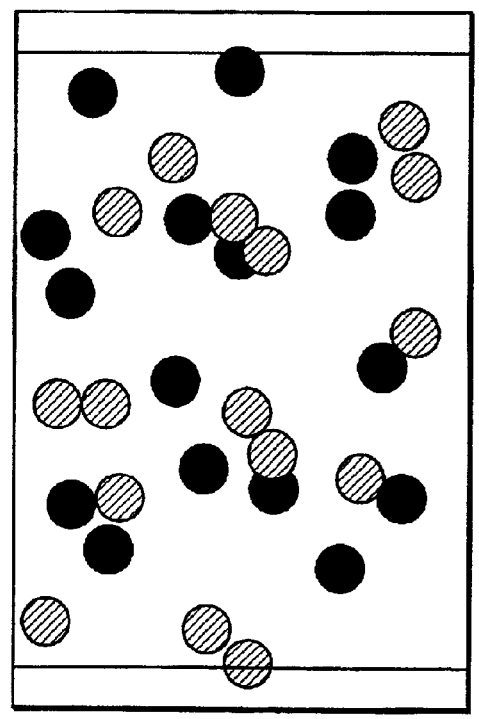
DOT FORMATION
WITH FEEDING ERROR
FIG.31B
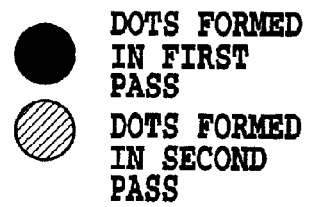
DOTS FORMED IN FIRST PASS
DOTS FORMED IN SECOND PASS

DOT FORMATION WITH USE OF BLUE NOISE
(HIGH FREQUENCY COMPONENTS) MASK

DOT FORMATION
WITHOUT FEEDING ERROR

DOT FORMATION
WITH FEEDING ERROR

● DOTS FORMED IN FIRST PASS

◎ DOTS FORMED IN SECOND PASS

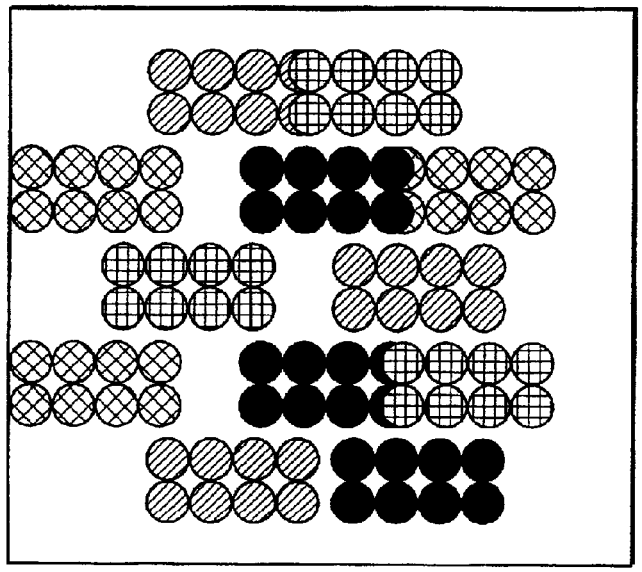
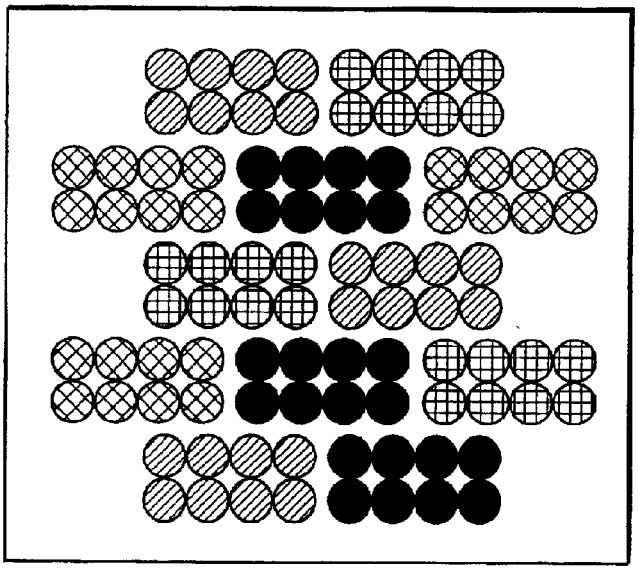
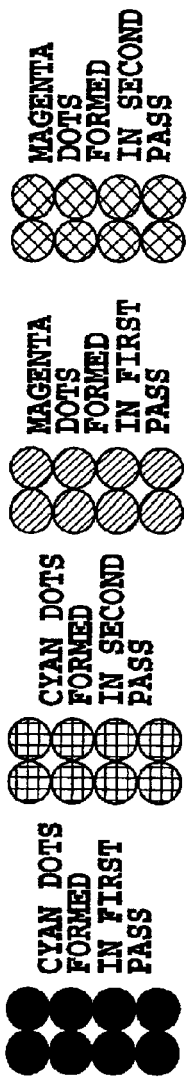
FIG.33A DOT FORMATION WITHOUT FEEDING ERROR
FIG.33B DOT FORMATION WITH FEEDING ERROR

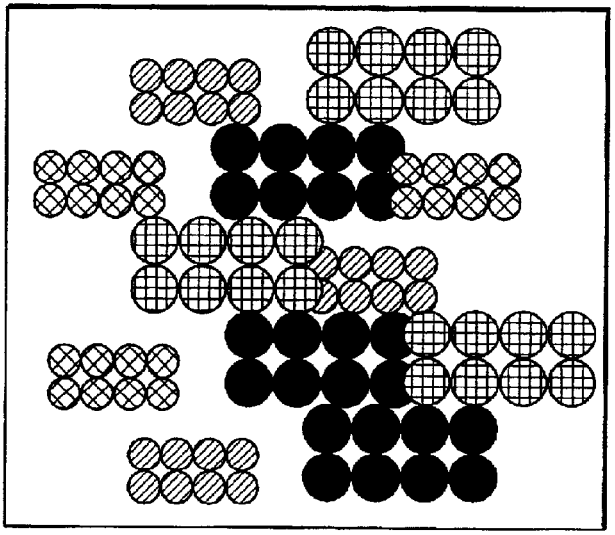
FIG.34A DOT FORMATION WITHOUT FEEDING ERROR
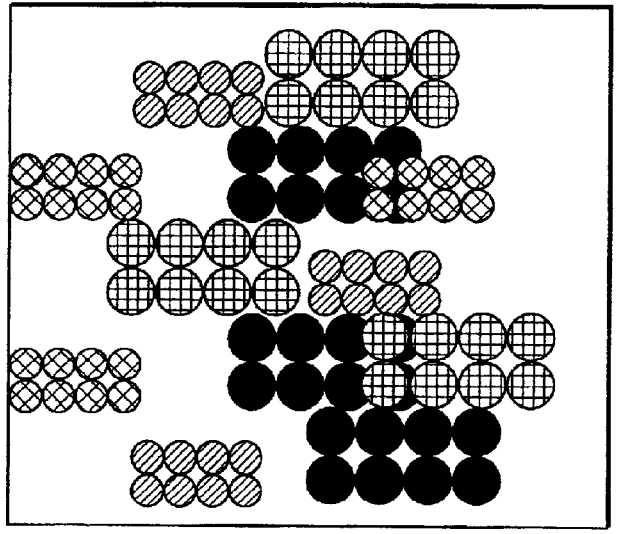
FIG.34B DOT FORMATION WITH FEEDING ERROR
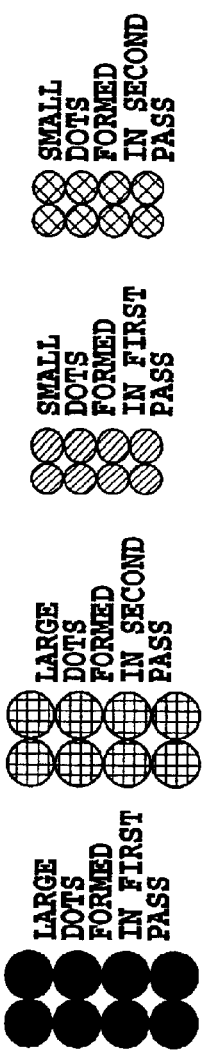

NORMAL DIFFUSION
COEFFICIENT

| | | * | 7 | | | | |
|---|---|---|---|---|---|---|---|
| 5 | 3 | 1 | 0 | | | | |

FIG.36A

DIFFUSION
COEFFICIENT USED
FOR CASE OF LARGE
DEVIATION IN
MAIN-SCANNING
DIRECTION

| | | * | 7 | 5 | 3 | 2 | 1 |
|---|---|---|---|---|---|---|---|
| 8 | 6 | 5 | 4 | 3 | 2 | 1 | 0 |

FIG.36B

DIFFUSION
COEFFICIENT USED
FOR CASE OF LARGE
DEVIATION IN
SUB-SCANNING
DIRECTION

| | | * | 9 | 5 | 2 | 1 | |
|---|---|---|---|---|---|---|---|
| 8 | 6 | 5 | 4 | 3 | 1 | 1 | |
| 5 | 6 | 3 | 5 | 5 | 6 | 6 | |
| 4 | 4 | 3 | 4 | 4 | 5 | 5 | |
| 3 | 3 | 3 | 4 | 4 | 3 | 3 | |
| 1 | 2 | 6 | 7 | 8 | 9 | 0 | |

FIG.36C

* SUBJECT PIXEL

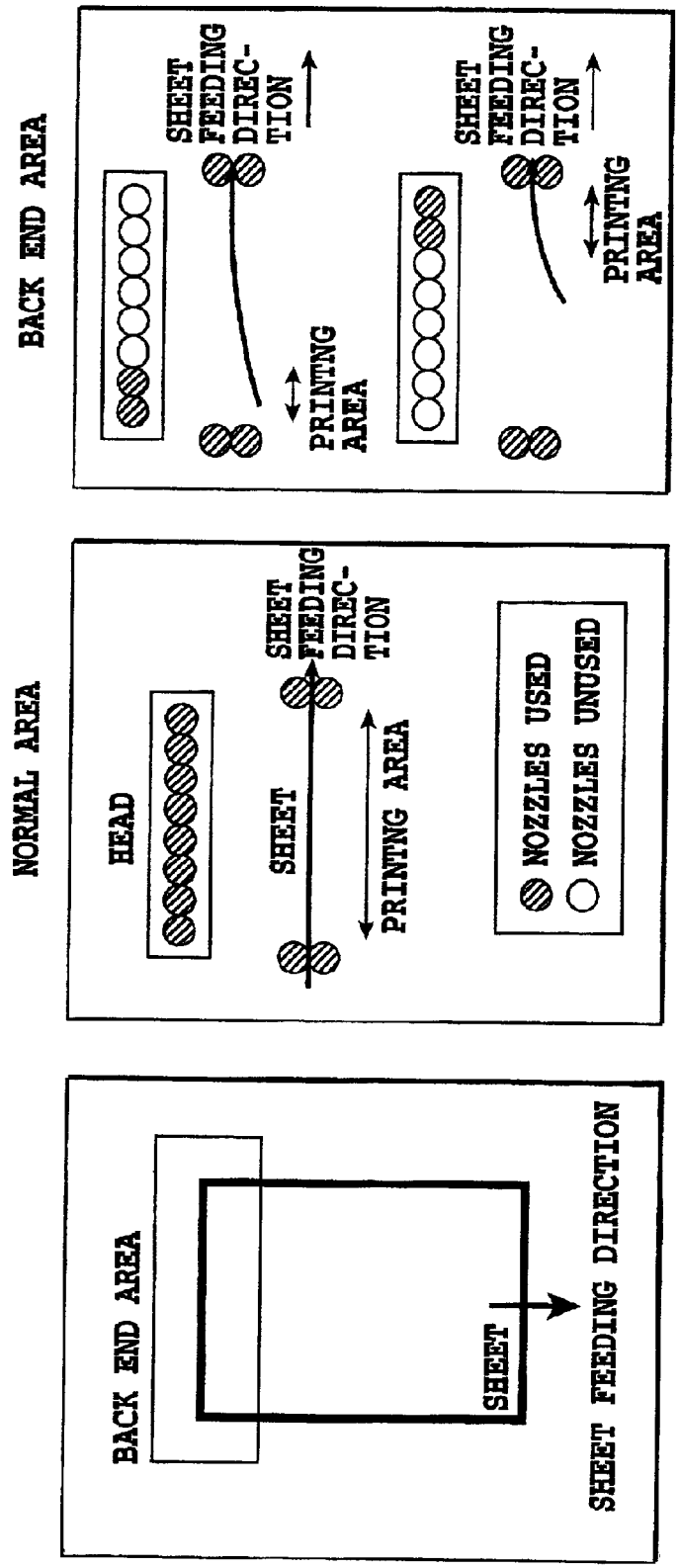

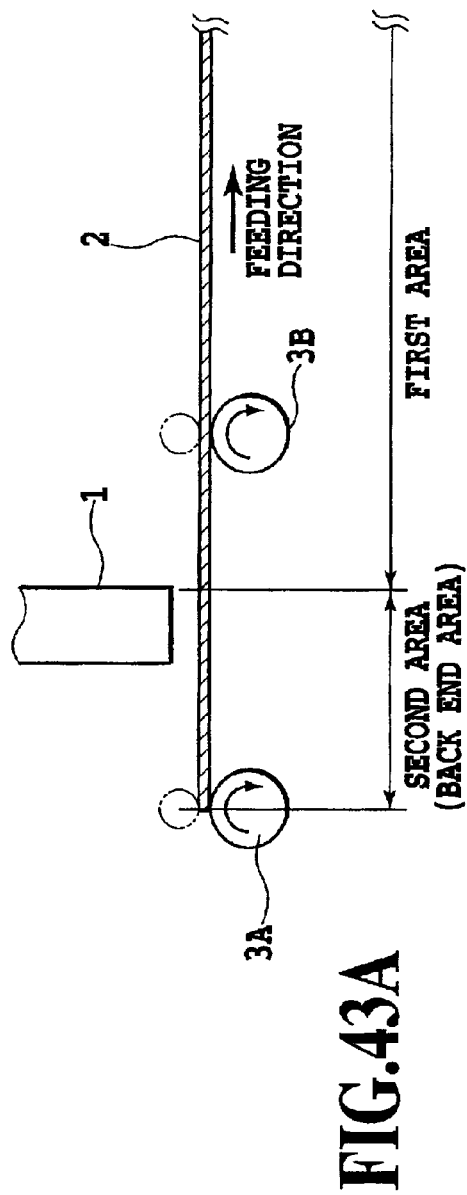
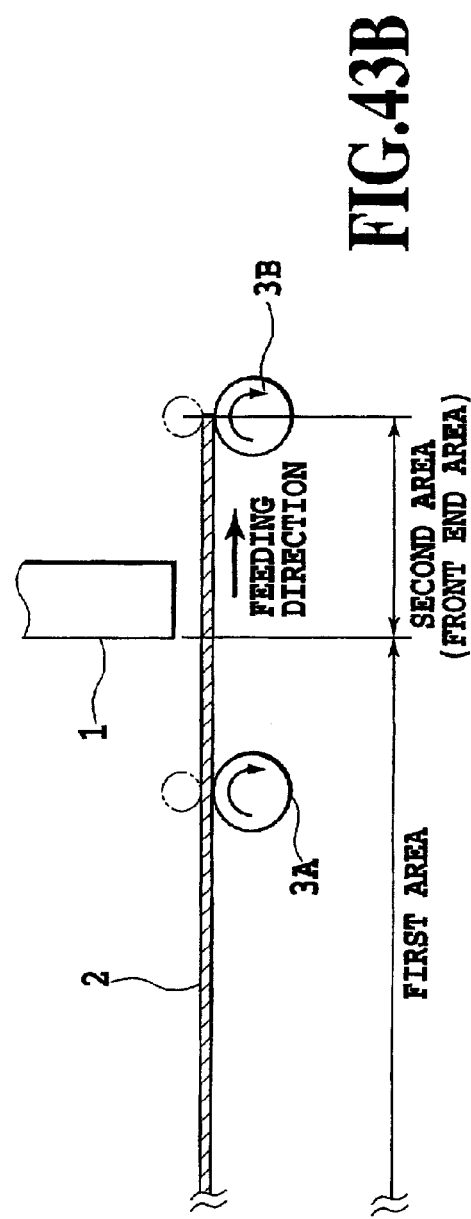

IMAGE PROCESSING METHOD AND APPARATUS

This application is based on Japanese Patent Application Nos. 2000-264351 filed Aug. 31, 2000 and 2001-232918 filed Jul. 31, 2001, the content of which is incorporated hereinto by reference.

BACKGROUND OF THE INVENTION

1. Field of the Invention

The present invention relates to an image processing method and apparatus, and more specifically, to an image processing method and apparatus for decreasing the degradation of a printed image caused by the relative deviation of formed dot locations resulting from sheet feeding, in a printing apparatus such as an ink jet printer.

2. Description of the Prior Art

A sheet feeding mechanism for feeding a sheet in a printing apparatus such as a printer generally includes two sets of rollers provided on upstream and downstream sides of a print head, respectively, and rotates these rollers to feed the sheet at a predetermined amount as the print head is caused to execute a printing operation. For example, on the upstream side is provided a pair of a roller rotated by driving force and a pinch roller for pressing the sheet against the above roller to generate feeding force, whereas on the downstream is provided a pair of a roller similarly rotated by driving force and a spur for pressing the sheet against the above roller. Then, the sheet is fed under a condition of making a peripheral velocity of the downstream roller slightly faster than that of the upstream roller and of applying an appropriate tension to the sheet between these pairs of rollers. Thus, a printing surface of the sheet on which the print head is caused to execute the printing operation can be kept flat and the sheet can be fed accurately.

As described above, the sheet is relatively accurately fed when the sheet is located between the upstream roller and the downstream roller. At the start or end of sheet feeding, however, when the sheet is fed with its front or back end is disengaged from the corresponding pair of rollers, it cannot be fed so accurately. As a result, dots may not be formed at normal locations in a feeding direction, resulting in a feeding error in which the dots are mutually deviated.

On the other hand, it is common for the printer to output an image on a sheet fed with one of its ends disengaged from the corresponding pair of rollers, as in the printing of a photograph image on an entire space of sheet of a predetermined size.

FIGS. 43A and 43B are views for explaining feeding of the sheet (hereinafter also referred to as a "printing medium"). FIG. 43A shows that the sheet is fed only by upstream rollers at the end of sheet feeding. FIG. 43B shows that the sheet is fed only by downstream rollers at the start of sheet feeding.

As shown in FIG. 43A, an area of the printing medium 2 between a location of a back end thereof at the time when the medium is disengaged from an upstream roller 3A and a location on the medium immediately below a back end of a printing width of the print head 1 as observed at that time (this area is hereinafter referred to as a "back end area") is fed only by the downstream roller 3B. Then, the back end area of the medium faces (the printing width of) the print head 1 while being fed. In this state, the sheet remains flat due to its rigidity. However, since the sheet is disengaged from the roller 3A and the corresponding pinch roller, the amount of sheet feeding may be larger or smaller than a predetermined one or the sheet may float due to the lack of a predetermined tension acting on the sheet.

Likewise, at the start of sheet feeding, as shown in FIG. 43B, an area of the printing medium 2 between the location of the front end thereof at the time when the medium reaches the downstream roller 3B and a location on the medium immediately below the back end of the printing width of the print head 1 as observed at that time (this area is hereinafter referred to as a "front end area") is fed only by the upstream roller 3A. Then, the front end area of the medium faces the print head 1 while being fed. Phenomenon as described above also may occur in the case of printing on this area is performed.

The size of the front or back end area is essentially determined by the distance between the upstream roller and the downstream roller and by the printing width (in the ink jet method, the length of an array of ejection ports) of the print head arranged between the two pairs of rollers. The distance between the two pairs of rollers tends to be reduced due to demands for a reduction of an apparatus size and improving of accuracy in feeding the printing media. Thus, the size of the back or front end area is dominated by the length of the array of ejection ports of the print head. On the other hand, the printing width of the print head, that is, the length of the array of ejection ports, now tends to be increased in order to increase a printing speed. In this case, the size of the back or front end area must also be increased, as is apparent from FIGS. 43A and 43B.

The increase in the size of the back or front end area corresponds to an increase in a possibility of performing printing on this area or in an amount of printing on this area. Correspondingly, printing is performed in a condition that the printing medium is not so accurately fed.

Further, when an amount of feeding sheet at one feeding operation increases due to increase in the length of the printing width, a correspondingly significant error in the sheet feeding is likely to occur in the area of the sheet which cannot be transported so accurately. This also applies to, for example, multi-pass printing, in which the amount of sheet fed at one feeding operation is smaller than the printing width of the print head.

To solve these problems, for example, Japanese Patent Application Laid-open No. 11-291506 describes a reduction of a number of nozzles used in the above described back end area, that is, a reduction of the printing width for the purpose of reducing the amount of sheet fed at one feeding operation, thus lessening a feeding error. This publication essentially discloses the invention of a printing method of increasing resolution on a basis of interlacing to restrain the back end area from being fed inaccurately. It describes not only the reduction of the feeding amount as described above but also an increase in a size of a dot for the purpose of making the feeding error unrecognized as well as performing printing of a raster, an array of pixels extending in a scanning direction, using two different nozzles.

The invention described in the above publication, however, cannot properly deal with a phenomenon known as "kicking" the printing medium and which occurs during feeding of the back end area to cause a significant feeding error. That is, the kicking of the sheet is a phenomenon in which when the sheet is disengaged from the upstream roller and its pinch roller, the feeding force of the downstream roller or the like causes the sheet to be fed at a larger amount than normal feeding of the medium. The technique of simply reducing the feeding amount as described in the above publication may cause a more uneven print density, such as a "stripe" to appear. Further, it is difficult for the interlacing technique described in the above publication to control the sheet feeding so as to, for example, extremely reduce the feeding amount in a particular feeding operation correspondingly to the large amount of error that may occur in such particular feeding operation. For the interlacing technique, the most important point is to feed the sheet so as to accurately form dots at locations obtained by dividing nozzle pitch, and it is thus difficult to significantly change the amount of feeding in a particular feeding operation.

Another problem that may occur in the back or front end area is as follows. A phenomenon in which when the sheet is disengaged from one of the pairs of rollers, it may float due to a lack of an appropriate tension acting on the sheet (this phenomenon is hereinafter also referred to as "sheet floating") and an error in dot forming locations, which is similar to the above-described error due to the low feeding accuracy, may occur. Further, the dots may be deviated not only in the feeding direction but also in a direction other than the feeding direction, for example, a scanning direction, because the lack of an appropriate tension acting on the sheet may cause the sheet to be curled or cause it to be warped to form projections and recesses when it comes into contact with ribs located under a sheet feeding passage. Such a dot deviation cannot be easily prevented by reducing the number of nozzles used for printing and thus reducing the feeding amount as described in the above publication, and may degrade the printed image in the back or front end area of the sheet as with the feeding error.

SUMMARY OF THE INVENTION

An object of the present invention is to provide an image processing method and an image processing apparatus that is operative when a printing medium is fed, to properly perform printing in an area such as the back or front end area of a printing medium in which printed locations are relatively significantly deviated.

In a first aspect of the present invention, there is provided an image processing method for a printing apparatus, which uses a printing head provided with a plurality of arranged printing elements and performs a plurality of times of scanning with the printing head on a printing medium, between the plurality of times of feeding of the printing medium being executed, so that different printing elements are correspondingly used for a same scanning line to form dots for performing printing, wherein if printing is performed on a second area in which a deviation of dot forming location becomes lager than that in a first area, the first and second areas being defined on the printing medium in relation to feeding the printing medium, a process relating to generation of dot forming data for printing in each of the plurality of times of scanning is differentiated from the process relating to generation of dot forming data for the first area.

In a second aspect of the present invention, there is provided an image processing method for a printing apparatus, which uses a printing head provided with a plurality of arranged printing elements and performs a plurality of times of scanning with the printing head on a printing medium, between the plurality of times of feeding of the printing medium being executed, so that different printing elements are correspondingly used for a same scanning line to form dots for performing printing, wherein a process relating to generation of dot forming data for printing in each of the plurality of times of scanning is differentiated in accordance with a location of the printing medium on a feeding path.

Preferably, the process relating to generation of dot forming data for the second area may be differentiated from the process relating to generation of dot forming data for the first area, so that the a dot may be formed in each of the plurality of times of scanning so as not to be noticeable a deviation of dot forming location.

In a third aspect of the present invention, there is provided a control method for a printing apparatus, which uses a printing head provided with a plurality of arranged printing elements and performs scanning with the printing head relatively to a printing medium so as to perform printing, wherein if printing is performed on a second area in which a deviation of dot forming location becomes lager than that in a first area, the first and second areas being defined on the printing medium in relation to feeding the printing medium, feeding of the printing medium is executed at the same feeding amount as the first area, a range of printing elements used is changed by shifting the printing elements used without changing a number of printing elements which is a number of printing elements used for the first area, and printing is controlled to be performed with the changed printing elements.

In a fourth aspect of the present invention, there is provided an image processing apparatus for performing an image processing so as to use a printing head provided with a plurality of arranged printing elements and to perform a plurality of times of scanning with the printing head on a printing medium, between the plurality of times of feeding of the printing medium being executed, so that different printing elements are correspondingly used for a same scanning line to form dots for performing printing, wherein if printing is performed on a second area in which a deviation of dot forming location becomes lager than that in a first area, the first and second areas being defined on the printing medium in relation to feeding the printing medium, a process relating to generation of dot forming data for printing in each of the plurality of times of scanning is differentiated from the process relating to generation of dot forming data for the first area.

In a fifth aspect of the present invention, there is provided an image processing apparatus for performing an image processing so as to use a printing head provided with a plurality of arranged printing elements and to perform a plurality of times of scanning with the printing head on a printing medium, between the plurality of times of feeding of the printing medium being executed, so that different printing elements are correspondingly used for a same scanning line to form dots for performing printing, wherein a process relating to generation of dot forming data for printing in each of the plurality of times of scanning is differentiated in accordance with a location of the printing medium on a feeding path.

Preferably, the process relating to generation of dot forming data for the second area may be differentiated from the process relating to generation of dot forming data for the first area, so that the a dot may be formed in each of the plurality of times of scanning so as not to be noticeable a deviation of dot forming location.

In a sixth aspect of the present invention, there is provided a printing apparatus, which uses a printing head provided with a plurality of arranged printing elements and performs scanning with the printing head relatively to a printing medium so as to perform printing, wherein if printing is performed on a second area in which a deviation of dot forming location becomes lager than that in a first area, the first and second areas being defined on the printing medium in relation to feeding the printing medium, feeding of the printing medium is executed at the same feeding amount as the first area, a range of printing elements used is changed by shifting the printing elements used without changing a number of printing elements which is a number of printing elements used for the first area, and printing is controlled to be performed with the changed printing elements.

With the above construction, the printing medium has the first and second areas specified for feeding of the printing medium, and when the second area is printed, in which the dot forming locations are more significantly deviated in relation to the printing medium than in the first area, the process for generating dot forming data for each printing operation of the plurality of scanning operations is made differed from the one for the first area. Preferably, the process is made differed from the process for the first area in such a manner that the dots are formed during each of the plurality of scanning operations so that the deviation of the dot forming locations in the second area is made unnoticeable. Accordingly, even if the deviation of the dot forming locations on the printing medium increases because of a printing medium feeding error in the second area or the unevenness of the printing medium, the degradation of the printed image caused by the deviation of the dot locations is not perceived when the printed image is viewed as a whole.

Further, when the second area is subject to printing, the range of printing elements in the print head used for the second area has the same size as the range of printing elements used for the first area in relation to feeding of the printing medium and includes printing elements different from those used for printing on the first area. Consequently, the printing operation can be performed so as to deal with and compensate for the feeding error without changing the amount of printing on a single scanning operation, thus restraining the deviation of the dots resulting from the above described errors.

The above and other objects, effects, features and advantages of the present invention will become more apparent from the following description of embodiments thereof taken in conjunction with the accompanying drawings.

BRIEF DESCRIPTION OF THE DRAWINGS

FIGS. 23A to 23C are diagrams for explaining another process for printing on the second area according to the embodiment of the present invention, wherein dots as noises are printed in spaces formed due to the deviation of printed dots;

FIG. 25 is a diagram for explaining a configuration for eliminating the inconveniences of the process shown in FIG. 24;

FIGS. 27A and 27B are diagrams showing a mask pattern that can deal with a more significant dot deviation in the sheet feeding direction by comparative dot formations which are differed in the formation without or with the dot deviation, respectively;

FIGS. 28A and 28B are diagrams for explaining still another process for printing on the second area according to the embodiment of the present invention, and showing a mask pattern hard to be affected by the deviation of the dots in a main-scanning direction by comparative dot formations which are differed in the formation without or with the dot deviation, respectively;

FIGS. 29A to 29C are diagrams for explaining still another process for printing on the second area according to the embodiment of the present invention, and showing a mask pattern hard to be affected by the deviation of the dots in the sheet feeding and the main-scanning directions by comparative dot formations which are differed in the formation without or with the dot deviation, respectively;

FIGS. 30A and 30B are diagrams showing another example of a mask pattern hard to be affected by the dot deviation in the sheet feeding direction by comparative dot formations which are differed in the formation without or with the dot deviation, respectively;

FIGS. 31A and 31B are diagrams showing a comparative example of a mask pattern hard to be affected by the dot deviation in the sheet feeding direction;

FIGS. 33A and 33B are diagrams for explaining still another process for printing on the second area according to the embodiment of the present invention, and showing mask patterns for respective colors which are hard to be affected by the deviation of the dots in the sheet feeding direction by comparative dot formations which are differed in the formation without or with the dot deviation, respectively;

FIGS. 34A and 34B are diagrams for explaining still another process for printing on the second area according to the embodiment of the present invention, and showing mask patterns for respective sizes of dots which are hard to be affected by the deviation of the dots in the sheet feeding direction by comparative dot formations which are differed in the formation without or with the dot deviation, respectively;

FIGS. 36A to 36C are diagrams for explaining still another process for printing on the second area according to the embodiment of the present invention, and showing diffusion coefficients used for an error diffusion process and which are adapted to deal with the deviation of the dot forming locations in the sheet feeding and the main-scanning directions;

FIGS. 37A to 37C are diagrams for explaining a process for printing on the second area according to the embodiment of the present invention, wherein the range of ejection ports used for printing is limited;

FIGS. 43A and 43B are diagrams for explaining a phenomenon in which the printing medium is fed inaccurately in its back and front end areas during feeding the printing medium.

DETAILED DESCRIPTION OF THE PREFERRED EMBODIMENTS

The embodiments of the present invention will be described below in detail with reference to the drawings.

Before describing the embodiments of the present invention, which deal with the printing of the above described front or back end area upon feeding the printing medium, a printer based on the ink jet printing method will be described below as an image processing or printing apparatus for implementing an image processing method of the present invention, described in FIG. 19 and subsequent figures, or as a printing apparatus for printing images on the basis of printing data obtained from an image processing apparatus such as a personal computer which implements the image processing method of the present invention. That is, the image processing of the present invention may be executed by a host apparatus such as a personal computer or a printing apparatus such as a printer, a copier, or facsimile terminal equipment.

I.1 Apparatus Body

Figure 1:
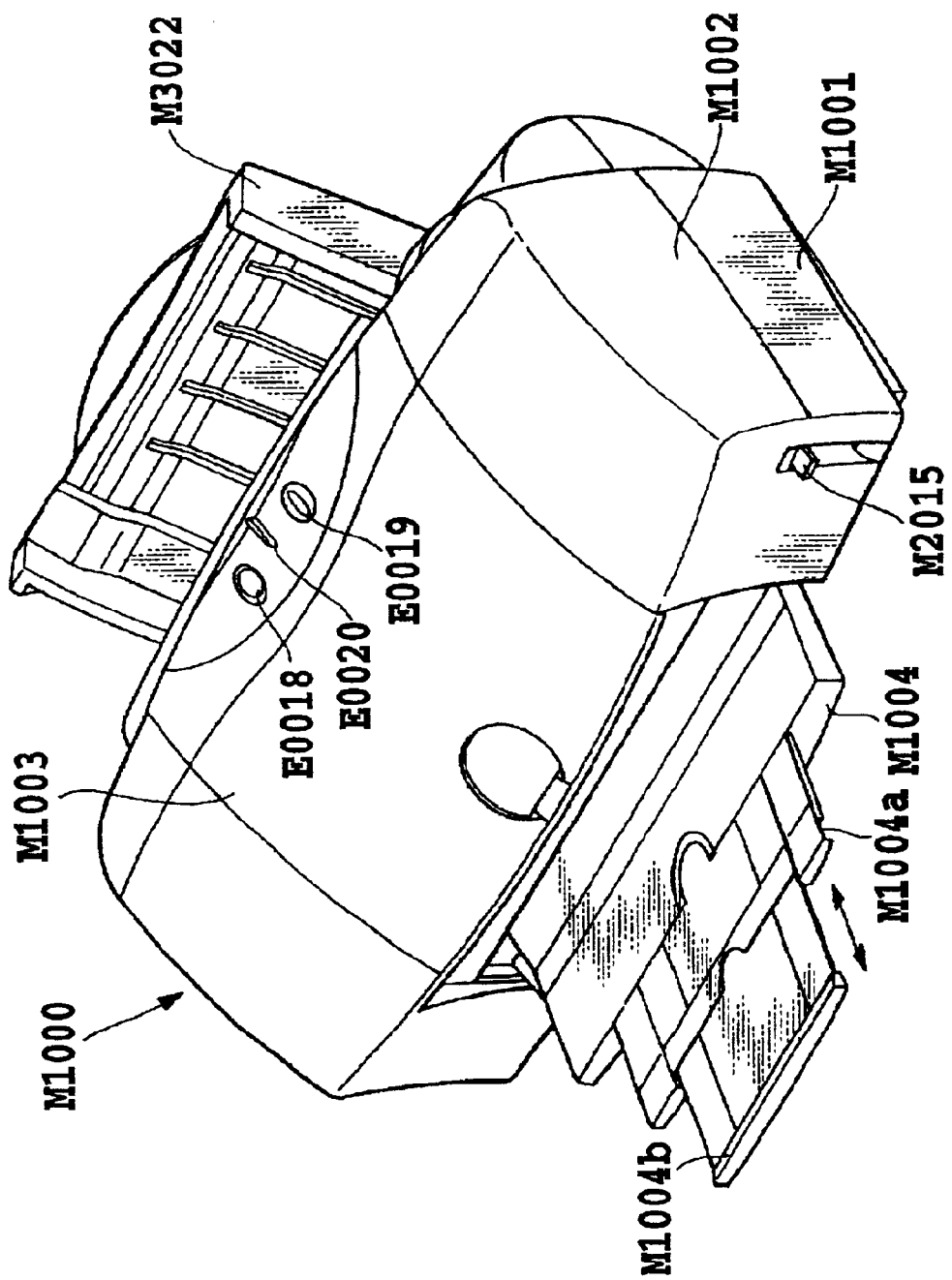
FIG. 1 is a perspective view showing an external construction of an ink jet printer as one embodiment of the present invention.
Figure 2:
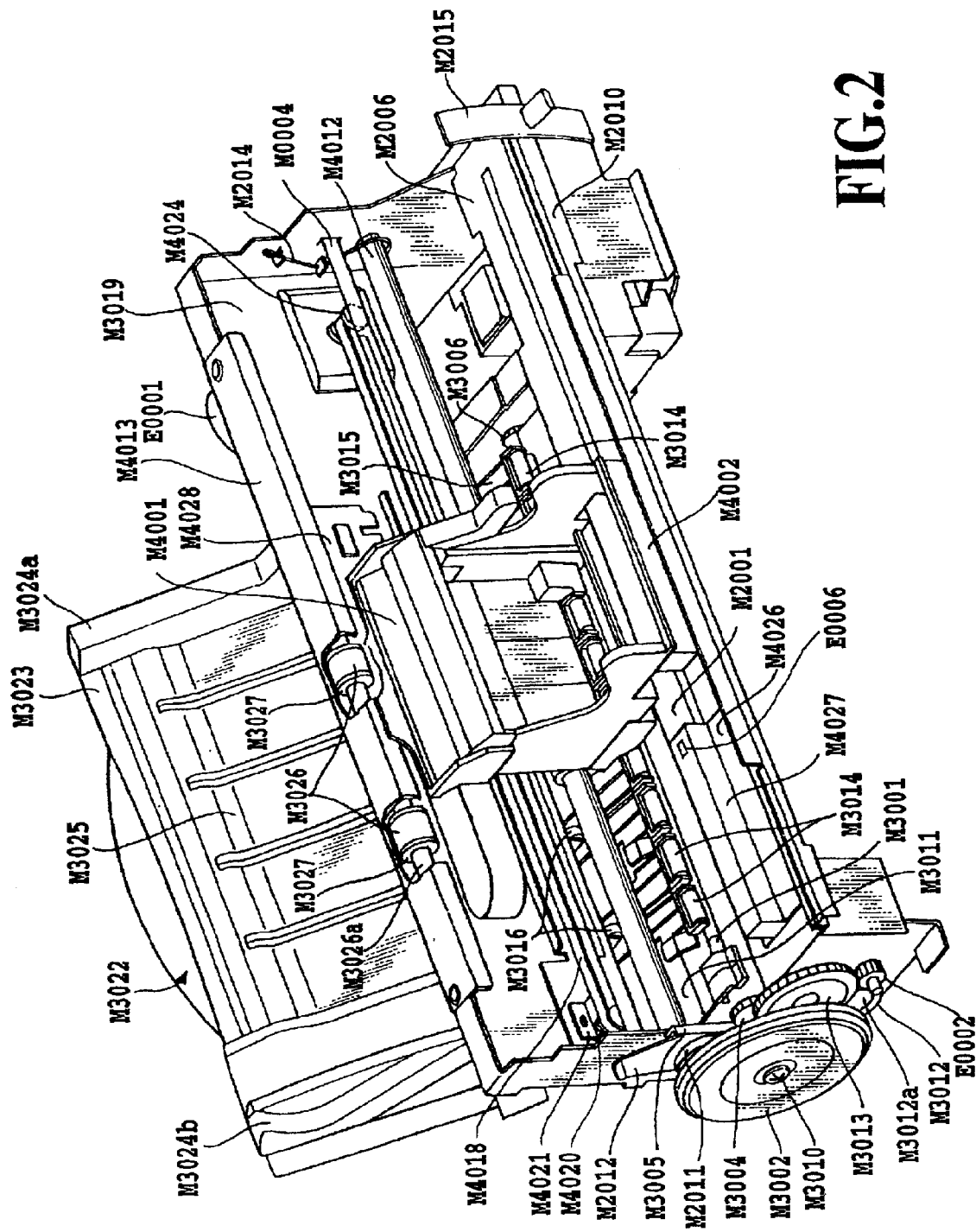
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 15) may be sounded. When the trouble is eliminated, the resume key E0019 is pressed to resume the printing.

I.2 Printing Operation Mechanism

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit M4000 to perform a desired printing on the print sheet carried to the print position; and an ejection performance recovery unit M5000 to recover the ink ejection performance of the print unit M4000.

Next, the construction of each mechanism will be explained.

I.2.1 Automatic Sheet Feed Unit

By referring to FIGS. 2 and 3 the automatic sheet feed unit M3022 will be described.

The automatic sheet feed unit M3022 in this embodiment horizontally feeds one of print sheets stacked at an angle of about 30–60 degrees to the horizontal plane, so that the sheet is discharged out of a sheet feed port not shown into the printer body while being kept in an almost horizontal attitude.

The automatic sheet feed unit M3022 includes feed rollers M3026, sheet guides M3024a, M3024b, a pressure plate M3025, an ASF base M3023, sheet separators M3027, and separation claws not shown. The ASF base M3023 forms a housing of the automatic sheet feed unit M3022 and is provided at the back of the printer body. On the front side of the ASF the pressure plate M3025 supporting the print sheets is mounted at an angle of about 30–60 degrees to the horizontal plane and a pair of sheet guides M3024a, M3024b that guide the ends of the print sheets project forwardly. One of the sheet guides M3024b is movable in the sheet width direction to conform to the horizontal size (width) of the sheets.

Rotatably supported on the left and right sides of the ASF base M3023 is a drive shaft M3026a that is connected through a gear not shown to a PG motor and which has rigidly secured thereto a plurality of feed rollers M3026 semicircular in cross section.

Figure 15:
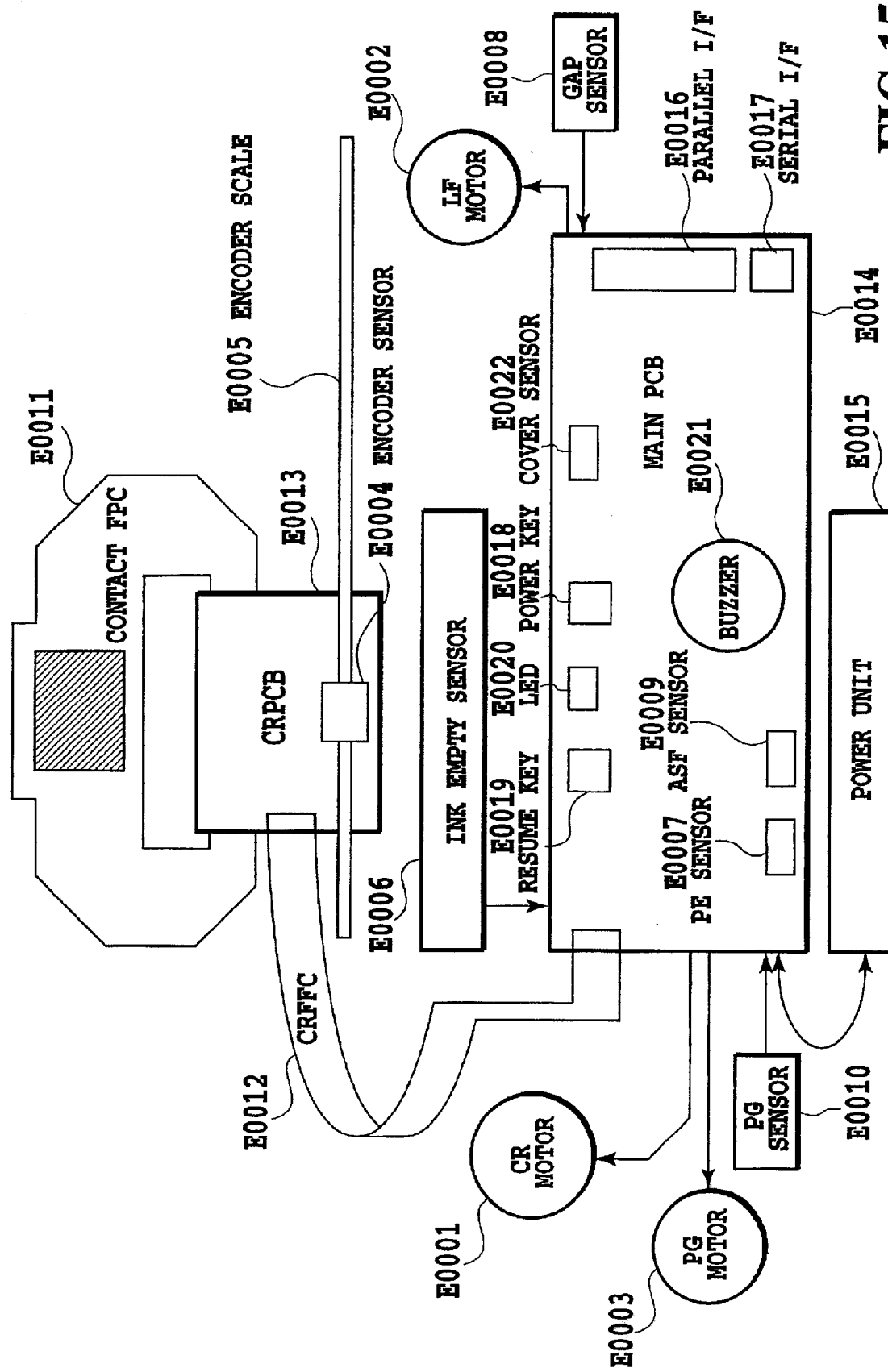
FIG. 15 is a block diagram schematically showing the overall configuration of an electric circuitry of the printer according to one embodiment of the present invention.

The print sheets stacked on the pressure plate M3025 are fed by the feed rollers M3026 that are driven by the PG motor E0003 (FIG. 15). The stacked sheets are separated one by one from the top of the stack by the sheet separators M3027 and the separation claws and forwarded to the paper transport unit M3029. The lower end of the pressure plate M3025 is resiliently supported by a pressure plate spring M3028 interposed between the pressure plate M3025 and the ASF base M3023, so that the contact force between the feed rollers and the sheet can be kept constant regardless of the number of sheets stacked.

Figure 3:
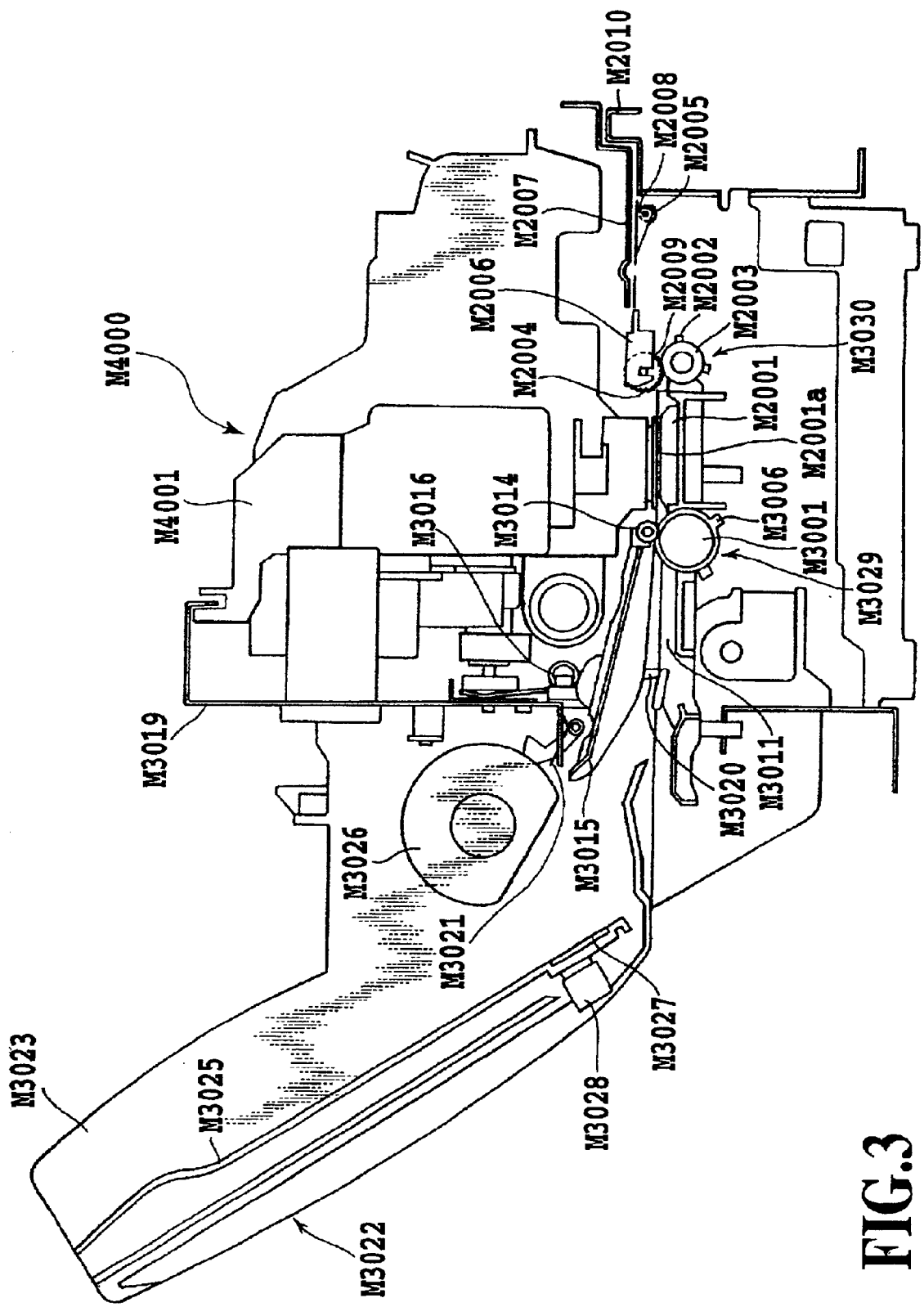
FIG. 3 is a side view of FIG. 2.

In a transport (feeding) path from the automatic sheet feed unit M3022 to the paper transport unit M3029, a PE lever M3020 urged clockwise in FIG. 3 by a PE lever spring M3021 is pivotally mounted on a chassis M3019 which is secured to the printer body M1000 and formed of a metal plate member with a predetermined rigidity. When the print sheet separated and fed from the automatic sheet feed unit M3022 moves along the path and its front end abuts against one end of the PE lever and pivots it, a PE sensor not shown senses the rotation of the PE lever M3020, detecting that the print sheet has entered into the transport path.

After the entrance into the transport path of the print sheet has been detected, the print sheet is transported a predetermined distance downstream by the feed rollers M3026. That is, the print sheet is fed until its front end contacts a nip portion formed by an LF roller M3001, which is at rest and provided in the paper transport unit described later, and pinch rollers M3014 and the print sheet deflects about 3 mm in loop, at which time the sheet is stopped.

I.2.2 Paper Transport (Feeding) Unit

Figure 4:
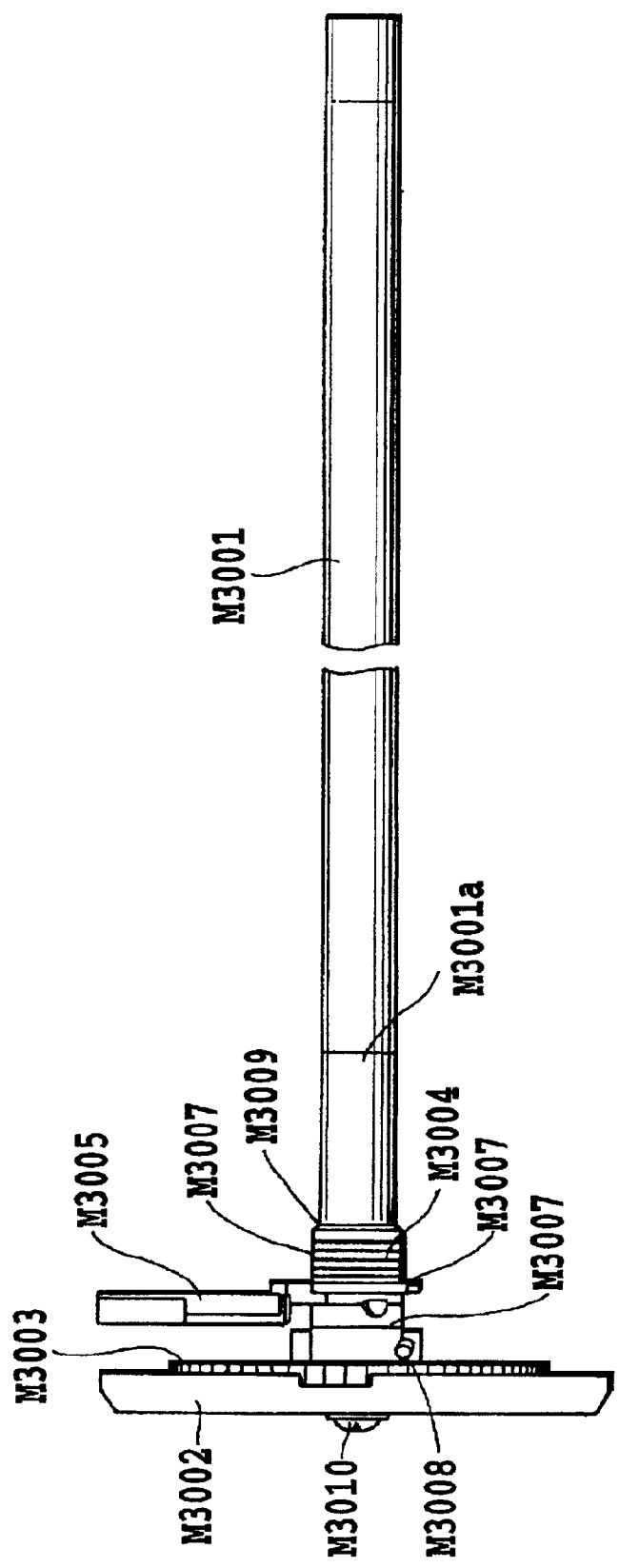
FIG. 4 is a front view showing a feed roller and an LF gear cover shown in FIG. 2.

The paper transport unit M3029 has an LF roller M3001, pinch rollers M3014 and a platen M2001. The LF roller M3001 is secured to a drive shaft rotatably supported on the chassis M3019 and, as shown in FIG. 4, has attached to one end thereof an LF gear cover M3002 that protects both an LF gear M3003 secured to the drive shaft M3001a and a small gear M3012a (see FIG. 2) of an LF intermediate gear M3012 in mesh with the LF gear M3003. The LF intermediate gear M3012 is interlocked with a drive gear of a drive shaft of an LF motor E0002 described later and is driven by the driving force of the motor.

The pinch rollers M3014 are rotatably mounted at the front end of pinch roller holders M3015 which is pivotally supported on the chassis M3019. The pinch rollers M3014 are pressed against the LF roller M3001 by spiral spring-like pinch roller springs M3016 that bias the pinch roller holders M3015. As a result, the pinch rollers M3014 rotate following the rotation of the LF roller M3001 to feed forwardly the print sheet, which was at rest in a looped state as described above, by gripping it between the pinch rollers M3014 and the LF roller M3001.

Figure 5:
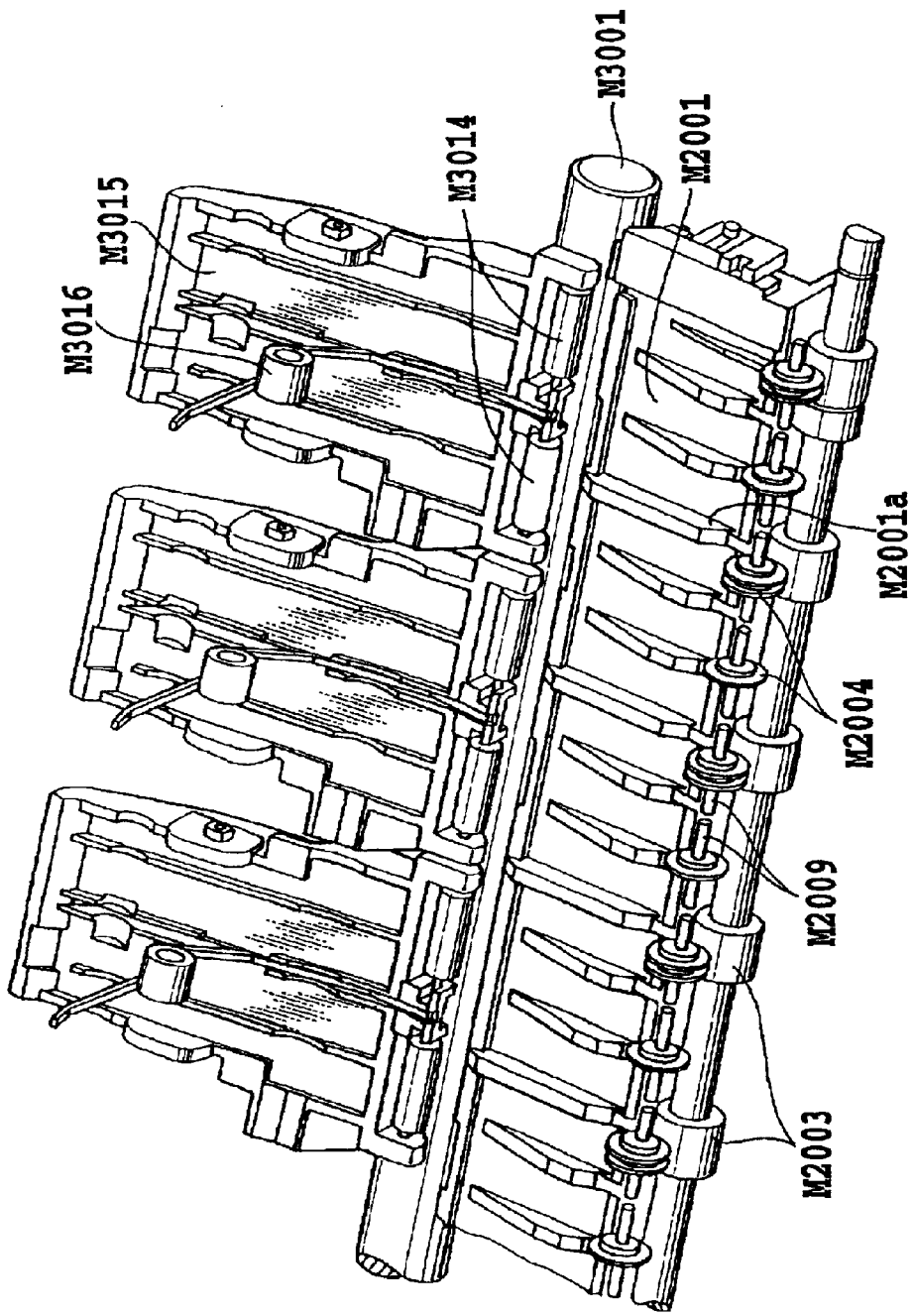
FIG. 5 is a perspective view showing pinch rollers and others shown in FIG. 2.

The rotation center of the pinch rollers M3014 is offset about 2 mm downstream of the rotation center of the LF roller M3001 in the direction of transport. Hence, the print sheet fed by the LF roller M3001 and the pinch rollers M3014 advances toward lower right in FIG. 3 along a print sheet support surface M2001a (FIG. 5).

A predetermined time after the feeding operation by the feed rollers M3026 of the automatic sheet feed unit M3022 has stopped, the paper transport unit constructed as described above starts the LF motor E0002. The driving force of the LF motor E0002 is transmitted via the LF intermediate gear M3012 and the LF gear M3003 to the LF roller M3001. As the LF roller M3001 rotates, the print sheet whose front end is in contact with the nip portion between the LF roller M3001 and the pinch rollers M3014 is carried to the print start position on the platen M2001.

At this time, the feed rollers M3026 resume rotating simultaneously with the LF roller M3001, so that the print sheet is transported downstream by the cooperation of the feed rollers M3026 and the LF roller M3001 for a predetermined period of time. A print head cartridge H1000 described later moves, mounted on a carriage M4001, along a carriage shaft M4012 secured at its ends to the chassis M3019, the carriage M4001 being adapted to reciprocate in a direction (a main-scan direction) perpendicular to the direction in which the print sheet is fed. As it travels in the scan direction, the print head cartridge H1000 ejects ink, according to an image information, onto the print sheet held at the print start position to form an image.

After the image has been printed, the LF roller M3001 is rotated to feed the print sheet a predetermined distance at a time, which may correspond to one line height of, for example, 5.42 mm, followed by the carriage M4001 performing the main scan along the carriage shaft M4012. This process is repeated to complete an entire image on the print sheet placed on the platen M2001.

The carriage shaft M4012 has its one end mounted on an adjust plate (not shown) through an adjust lever 2015 and the other end mounted on another adjust plate M2012 through a carriage shaft cam M2011. The carriage shaft M4012 is biased by a carriage shaft spring M2014. The adjust plate M2012 and the other adjust plate not shown are secured to the chassis M3019 so that the distance between the ejecting face of the print head cartridge H1000 and the print sheet support surface M2001a of the platen M2001 can be adjusted to be an appropriate value.

Further, the adjust lever 2015 can be selectively set at one of two stop positions, an upper end position shown in FIG. 1 and a lower end position not shown. When the adjust lever 2015 is moved to the lower end position, the carriage M4001 is retracted about 0.6 mm from the platen M2001. Hence, if the print sheet is thick, as when an envelope is printed, the adjust lever 2015 is moved to the lower end position before the sheet feeding operation by the automatic sheet feed unit M3022 is started.

Figure 14:
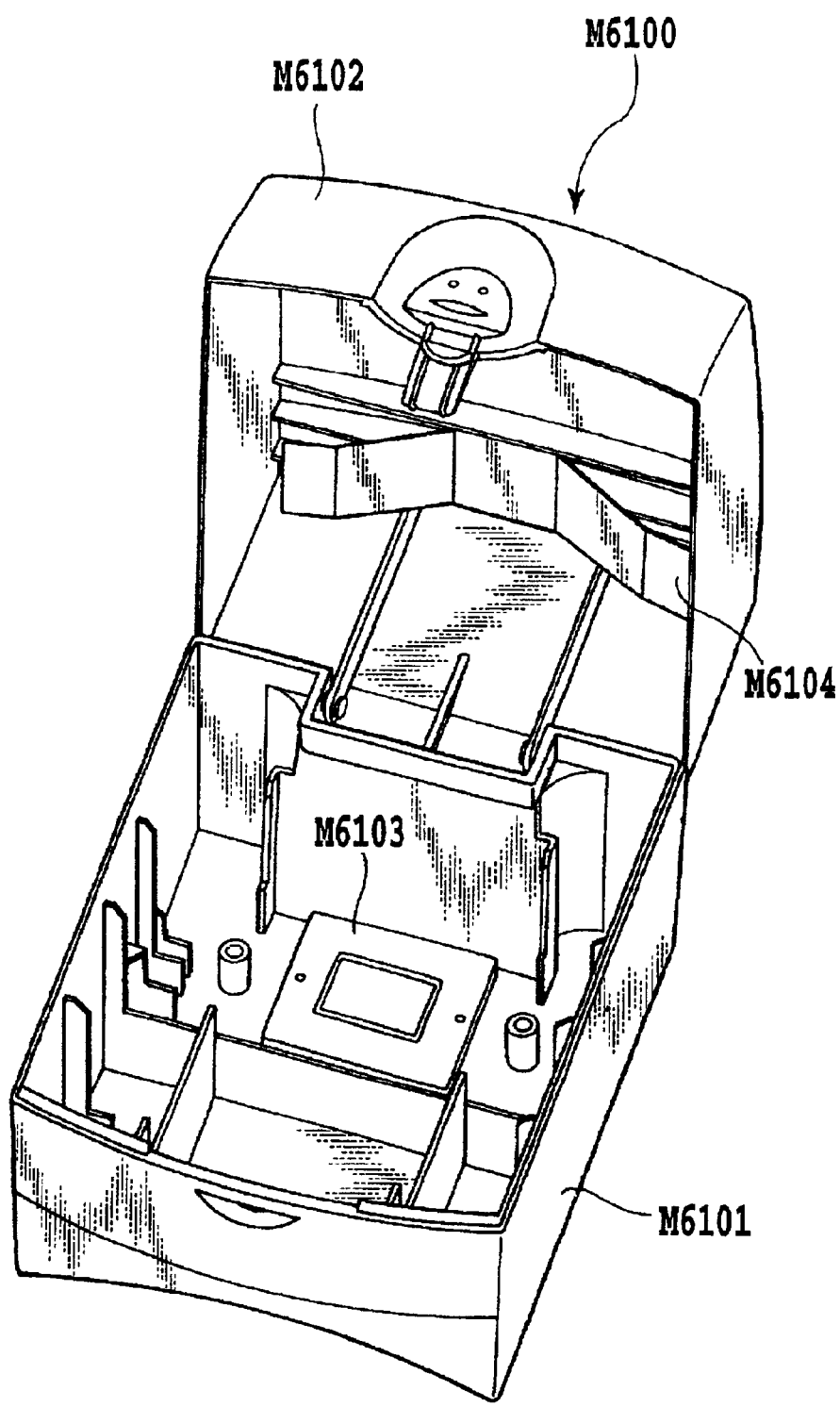
FIG. 14 is a perspective view showing a storage case in the embodiment of the invention.

When the adjust lever 2015 is located at the lower end position, this state is detected by the GAP sensor E0008 (see FIG. 14). Therefore, when the print sheet begins to be fed by the automatic sheet feed unit M3022, it is checked whether the position setting of the adjust lever 2015 is appropriate or not. When an inappropriate state is detected, a warning is issued by displaying a message or activating a buzzer to prevent the printing operation from being executed in an inappropriate condition.

I.2.3 Discharge Unit

Next, the discharge unit M3030 will be described by referring to FIGS. 2 and 3.

As shown in FIG. 3, the discharge unit M3030 has a discharge roller 2003; a discharge gear M3013 mounted on the discharge roller 2003 to transmit the driving force of the LF motor E0002 through the LF intermediate gear M3012 to the discharge roller 2003; a first spur M2004 rotated by the rotation of the discharge roller 2003 to grip the print sheet between it and the discharge roller 2003 to feed the sheet, and a discharge tray M1004 to aid in the discharge of the print sheet. The first spur M2004 is pressed against the discharge roller 2003 by a biasing force of a spur spring M2009 attached to a first spur holder M2006 mounted on a spur stay M2007.

The print sheet carried to the discharge unit M3030 is subjected to the transport force from the discharge roller 2003 and the first spur M2004. The rotation center of the first spur M2004 is offset about 2 mm upstream, in the transport direction, of the rotation center of the discharge roller 2003. Hence, the print sheet moved by the discharge roller 2003 and the first spur M2004 comes into light contact with the print sheet support surface M2001a of the platen M2001 with no gap between them and is therefore transported properly and smoothly.

The speed of the print sheet carried by the discharge roller 2003 and the first spur M2004 is almost equal to the speed of the sheet fed by the LF roller M3001 and the pinch roller M3014. To effectively prevent the print sheet from becoming slack, the speed at which the sheet is moved by the discharge roller 2003 and the first spur M2004 is set slightly higher.

Further, a second spur M2005 accommodated in a second spur holder M2008 is held on a part of the spur stay M2007 downstream of the first spur M2004 to prevent the print sheet from coming into a frictional, sliding contact with the spur stay M2007.

When the printing of an image on the print sheet is finished and the rear end of the print sheet comes off from between the LF roller M3001 and the pinch roller M3014, the print sheet is moved only by the discharge roller 2003 and the first spur M2004 until it is completely discharged.

I.2.4 Printing Unit

Here, the print unit M4000 will be described. The print unit M4000 comprises a carriage M4001 movably supported on a carriage shaft M4021 and a print head cartridge H1000 removably mounted on the carriage M4001.

I.2.4.1 Printing Head Cartridge

Figure 7:
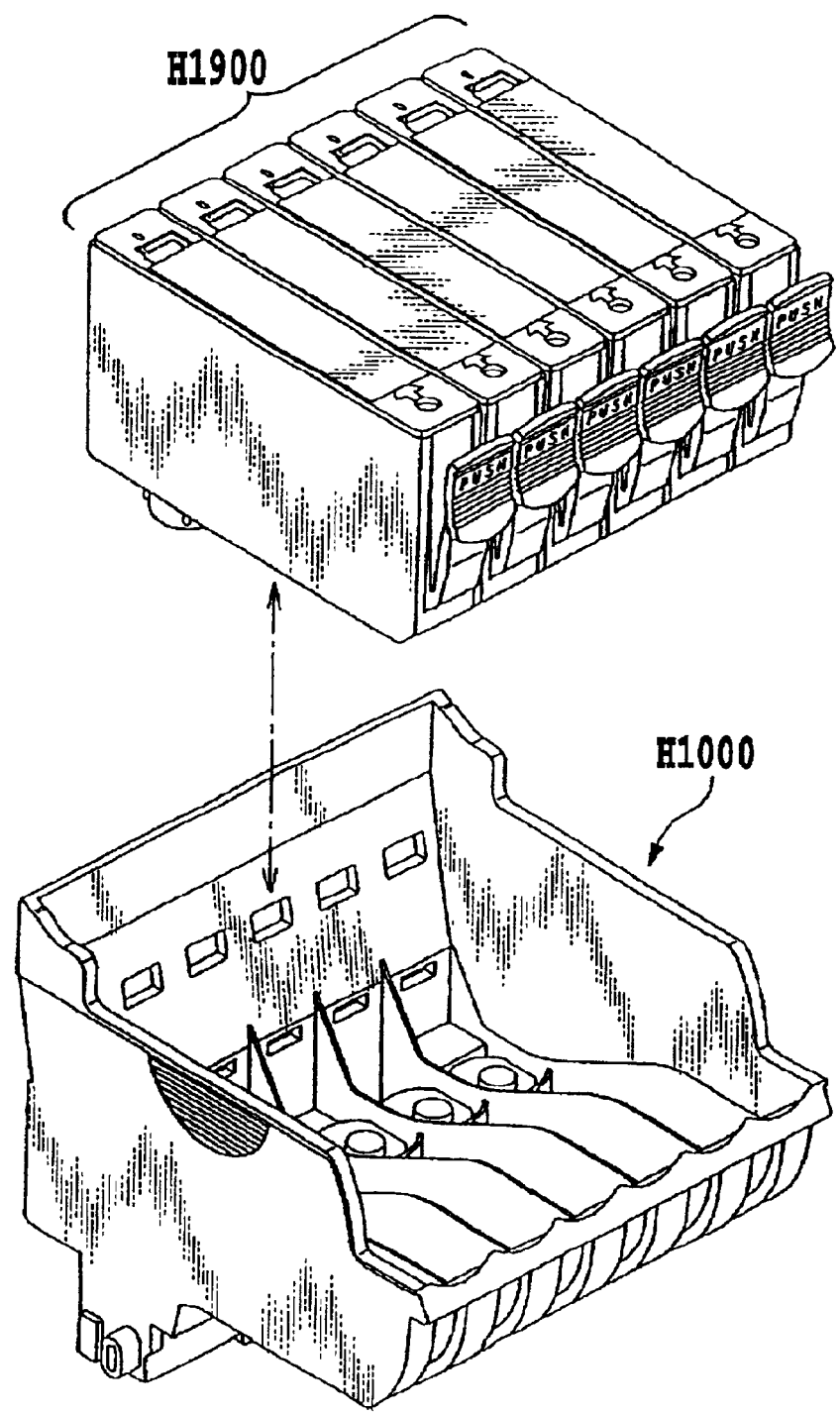
FIG. 7 is an exploded perspective view showing the print head cartridge of FIG. 6.
Figure 8:
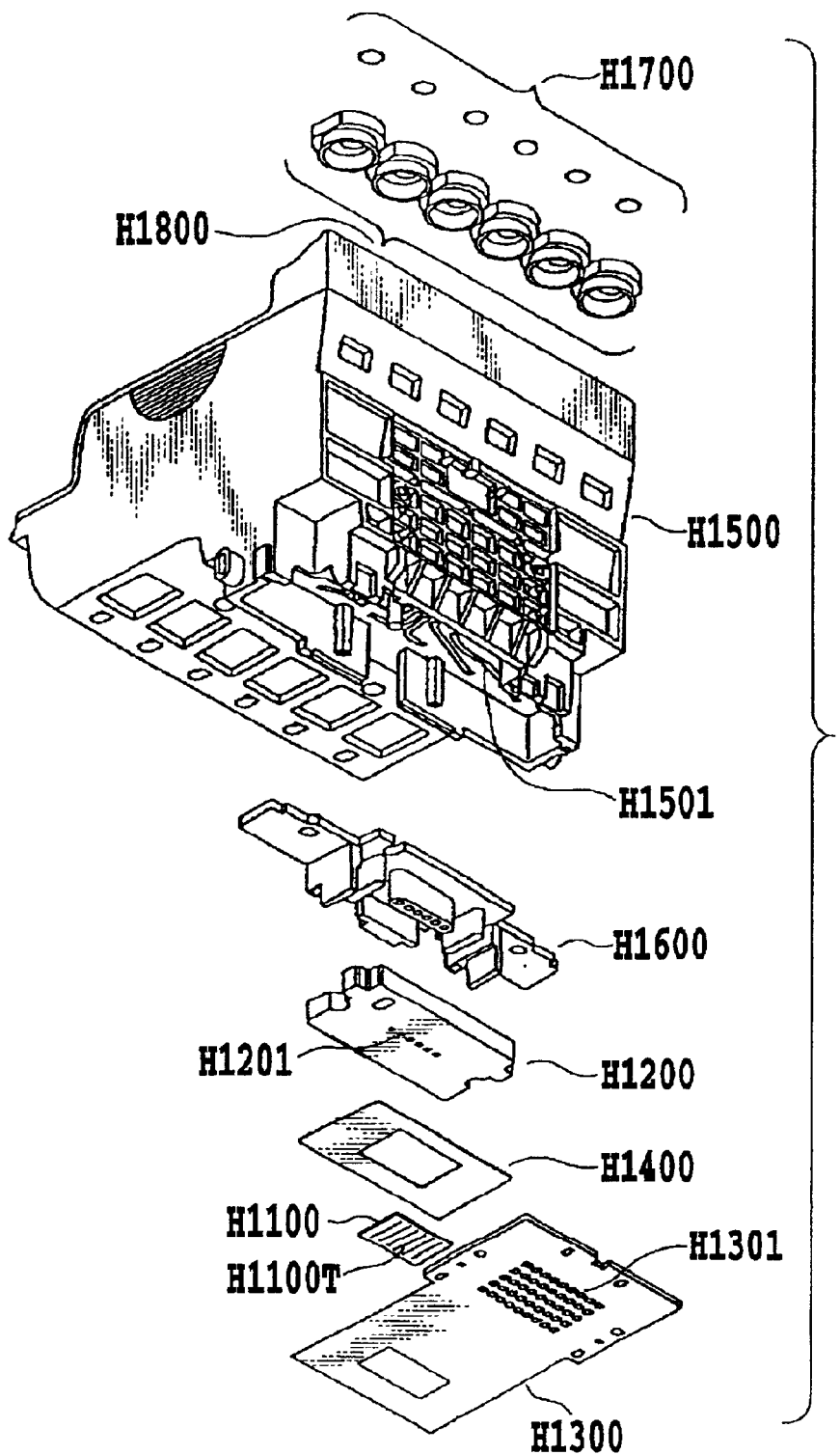
FIG. 8 is an exploded perspective view of the print head of FIG. 7 as seen from diagonally below.

First, the head cartridge used in the printing unit will be described with reference to FIGS. 6 to 8.

Figure 6:
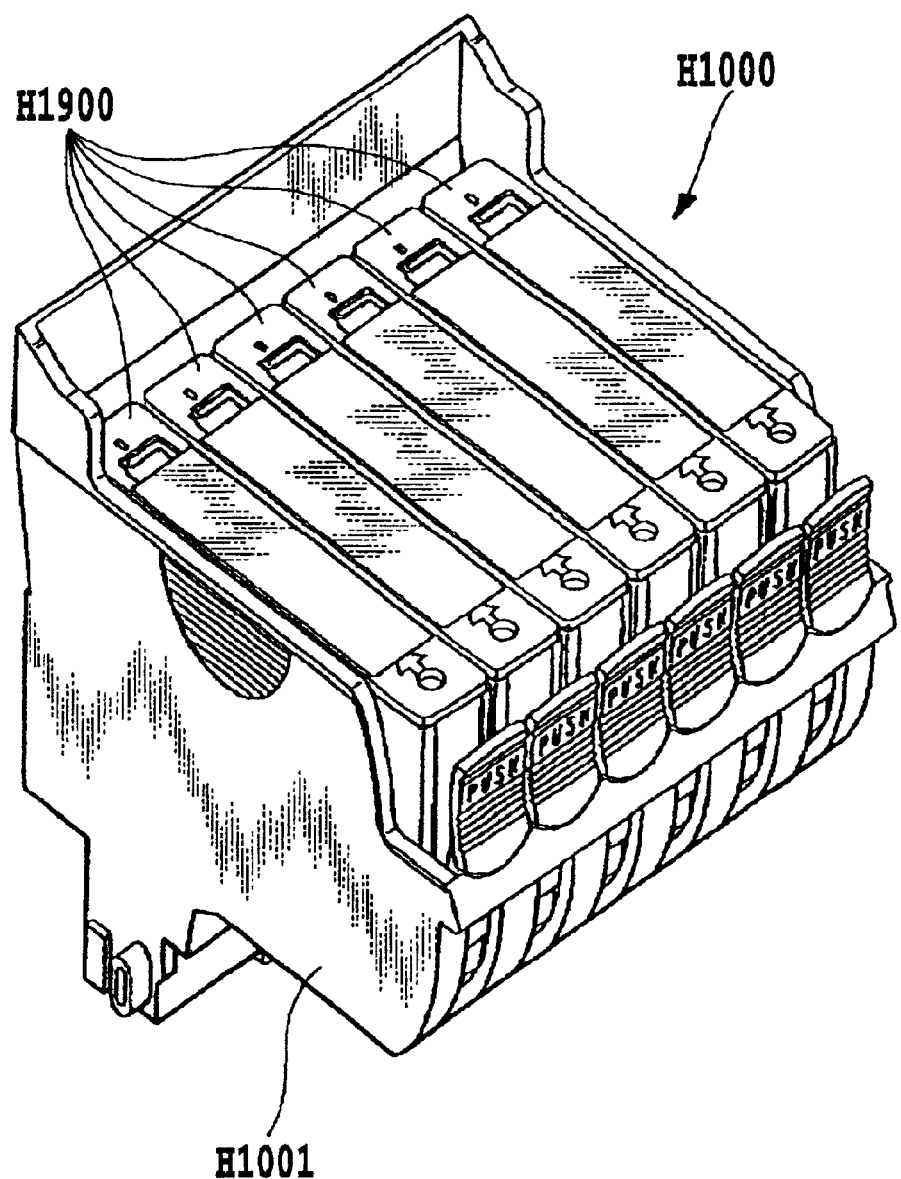
FIG. 6 is a perspective view showing an assembled print head cartridge used in the printer of one embodiment of the present invention.

A head tank H1001 in this embodiment, as shown in FIG. 6, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph. As shown in FIG. 4, these individual ink tanks are removably mounted to the print head H1001.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages. The print element substrate H1100 is securely bonded to the first plate H1200 which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

I.2.4.2 Carriage

Figure 9:
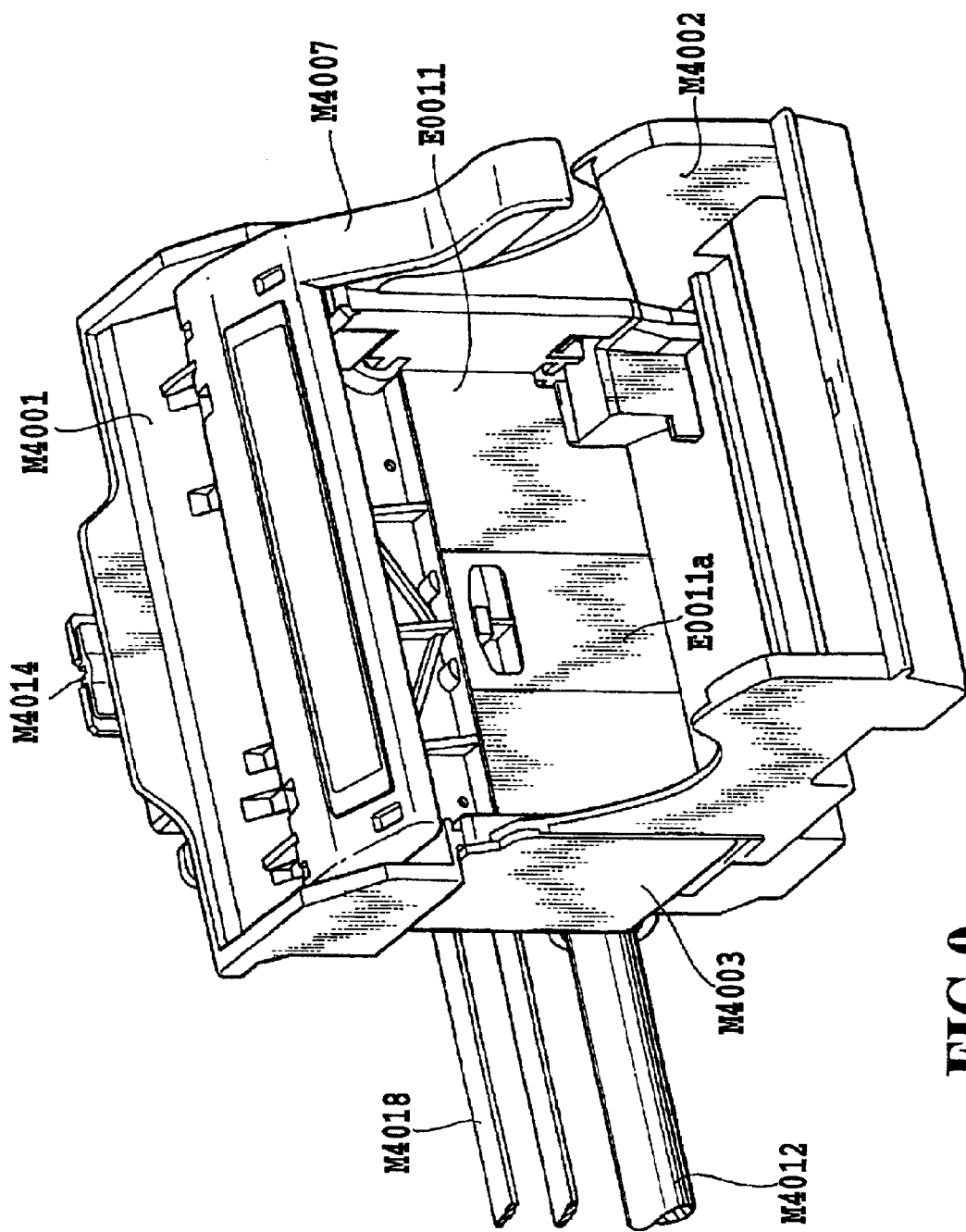
FIG. 9 is a perspective view showing the front side of a carriage used in the embodiment of the invention.

Next, by referring to FIGS. 2, 9 and 10, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft M4008. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (simply referred to as a contact FPC hereinafter) E0011 whose contact unit E0011a electrically contacts a contact portion (external signal input terminals) H1301 provided in the print head H1001 to transfer various information for printing and supply electricity to the print head H1001.

An elastic member such as rubber not shown is provided between a contact unit E0011a of a contact FPC E0011 and the carriage M4001. The elastic force of the elastic member and the pressing force of the head set lever spring combine to ensure a reliable contact between the contact unit E0011a and the carriage M4001. The contact FPC E0011 is drawn to the sides of the carriage M4001 and, as shown in FIGS. 9 and 10, has its end portions securely held to the sides of the carriage M4001 by a pair of FPC retainers M4003, M4006. The contact FPC E0011 is connected to a carriage printed circuit board E0013 mounted on the back of the carriage M4001 (see FIG. 10).

Figure 10:
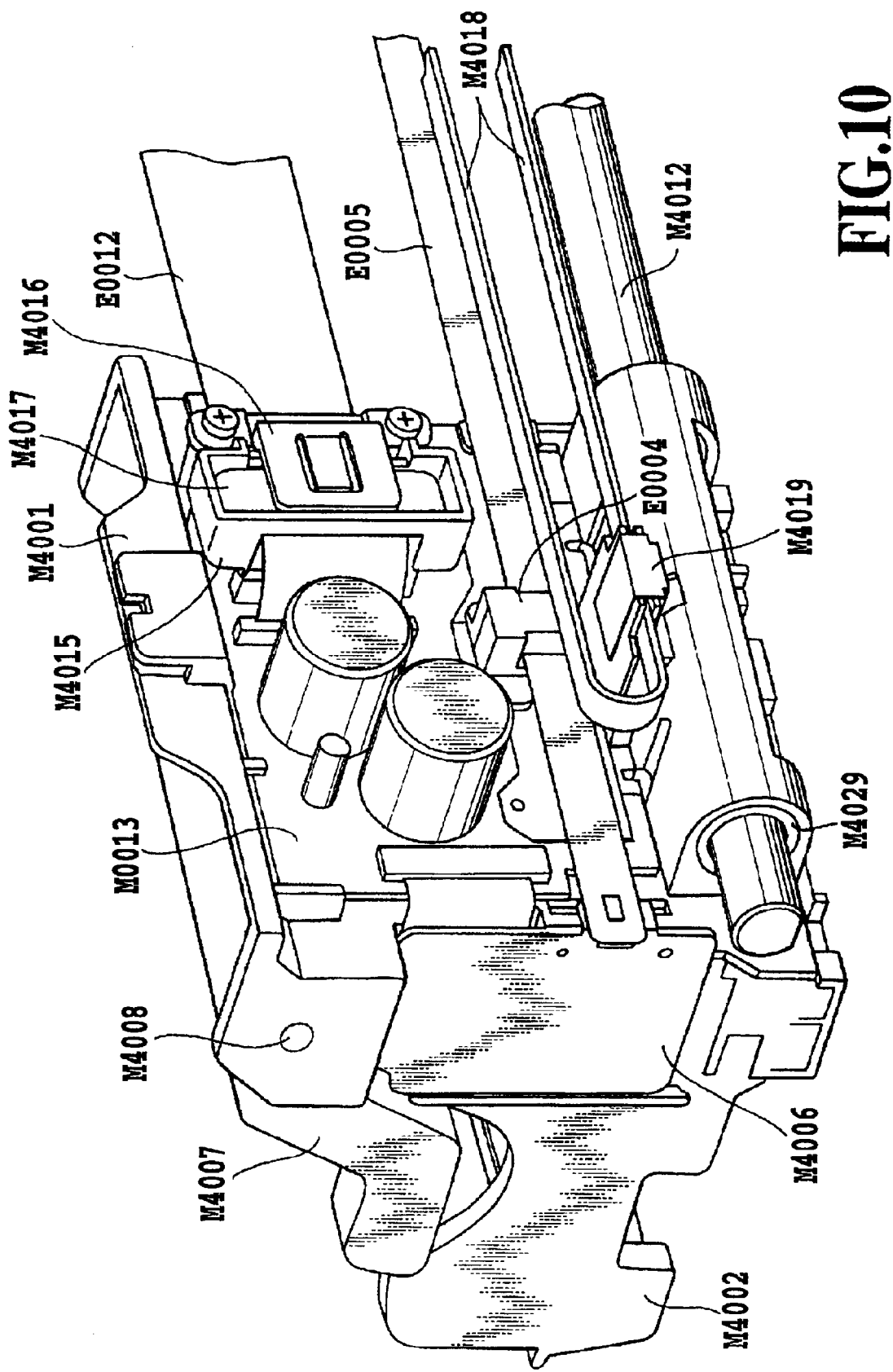
FIG. 10 is a perspective view showing the back side of the carriage of FIG. 9.

As shown in FIG. 10, the carriage printed circuit board E0013 is electrically connected through a carriage flexible flat cable (carriage FFC) E0012 to a main printed circuit board E0014 mounted on the chassis M3019 (see FIG. 15), which will be described later. Further, as shown in FIG. 10, at a joint portion between one end of the carriage FFC E0012 and the carriage printed circuit board E0013 a pair of retainer members, flexible flat cable retainers (FCC retainers) M4015, M4016, are provided to fixedly secure the carriage FFC E0012 to the carriage printed circuit board E0013 (see FIG. 15). Also installed at the joint portion is a ferrite core M4017 that shields electromagnetic radiations emitted from the carriage FFC E0012 and others.

The other end of the carriage FFC E0012 is fixed to the chassis M3019 (FIG. 2) by an FFC retainer M4028 (FIG. 2) and then drawn out to the rear side of the chassis M3019 through a hole not shown in the chassis M3019 and connected to the main printed circuit board E0014 (FIG. 15).

As shown in FIG. 10, the carriage printed circuit board E0013 has an encoder sensor E0004, which detects information from an encoder scale E0005 extending parallel to the carriage shaft M4012 between the both sides of the chassis M3019 to detect the position and scan speed of the carriage M4001. In this embodiment, the encoder sensor E0004 is of an optical transmission type. The encoder scale E0005 is a resin film, such as polyester film, which is printed, by the photographic plate making technique, alternately at a predetermined pitch with light shielding portions for shielding detection light emitted from the encoder sensor and light transmitting portions for transmitting the detection light.

Therefore, the position of the carriage M4001 moving along the carriage shaft M4012 can be detected at any time by first putting the carriage M4001 against one side plate of the chassis M3019 provided at an end of the scanning track of the carriage M4001, taking this position as a reference position, and counting the number of patterns formed on the encoder scale E0005 by the encoder sensor E0004 as the carriage M4001 performs scanning.

The carriage M4001 is guided for scan operation along the carriage shaft M4012 and the carriage rail M4013 extending between the both sides of the chassis M3019. At bearing portions for the carriage shaft M4012, the carriage M4001 has integrally formed therewith as by an insert molding a pair of carriage shaft bearings M4029 made of a sintered metal impregnated with lubricant such as oil. Further, at a portion engaging with the carriage rail M4013, the carriage M4001 has a carriage slider (CR slider) M4014 made of resin with excellent sliding performance and wear resistance. Along with the carriage shaft bearings M4029, the CR slider M4014 enables a smooth scanning motion of the carriage M4001.

The carriage M4001 is secured to a carriage belt M4018 that extends almost parallel to the carriage shaft between an idler pulley M4020 (FIG. 2) and a carriage motor pulley M4024 (FIG. 2). The carriage motor E0001 (FIG. 14) drives the carriage motor pulley M4024 to move the carriage belt M4018 in the forward or backward direction and thereby scan the carriage M4001 along the carriage shaft M4012. The carriage motor pulley M4024 is held at a fixed position by the chassis, whereas the idler pulley M4020 together with a pulley holder M4021 is held movable relative to the chassis M3019. Because the idler pulley M4020 is urged away from the carriage motor pulley M4024 by a spring, the carriage belt M4018 wound around the both pulleys M4020 and M4024 is given an appropriate tension at all times and thus kept in good state with no slack.

At the connecting portion between the carriage belt M4018 and the carriage M4001 is provided a carriage belt holder M4019 that ensures a secure holding of the carriage M4001 to the belt.

On the spur stay M2007 in the scanning track of the carriage M4001 an ink empty sensor E0006 (FIG. 2) is exposed facing an ink tank H1900 to measure the remaining amount of ink contained in the ink tank H1900 of the print head cartridge H1000 mounted on the carriage M4001. The ink empty sensor E0006 is held by an ink empty sensor holder M4026 and accommodated in an ink empty sensor cover M4027 having a metal plate to shield noise from outside, thus preventing erroneous operations of the sensor.

I.2.5 Ejection Performance Recovery Unit

Next, by referring to FIGS. 11 and 12, an ejection performance recovery unit that recovers the ejection performance of the print head cartridge H1000 will be described.

The ejection performance recovery unit 5000 in this embodiment can be mounted to and dismounted from the printer body M1000. The ejection performance recovery unit M5000 has a cleaning means to remove foreign matters adhering to a print element substrate H1100 of the print head H1001 and a recovery means to reinstate the normal condition of the ink path from the ink tank H1900 to the print element substrate H1100 of the print head H1001 (flow path from the portions H1501 to H1400 via H1600).

Figure 11:
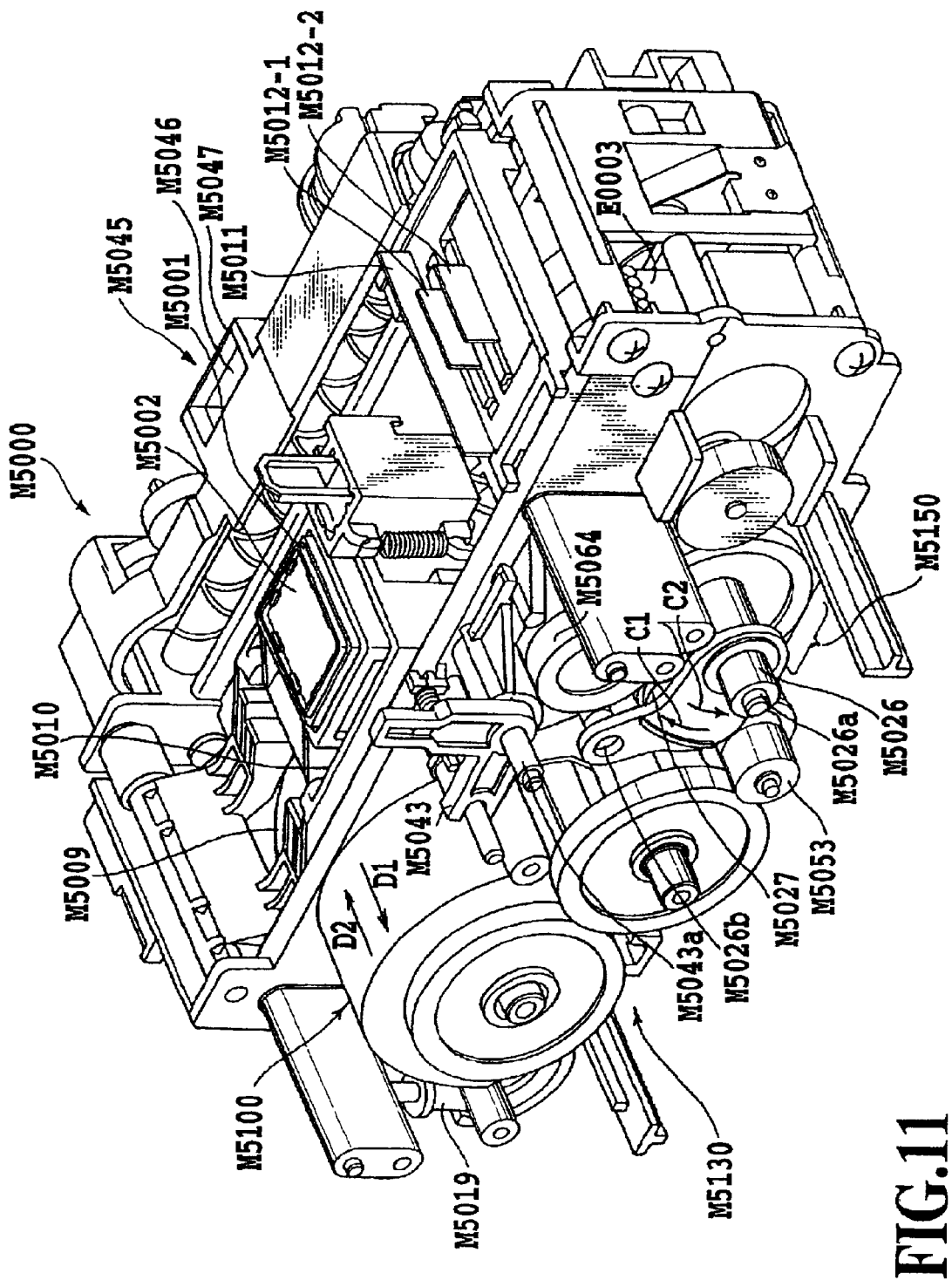
FIG. 11 is a perspective view showing one side of an ejection performance recovery unit in the embodiment of the invention.
Figure 12:
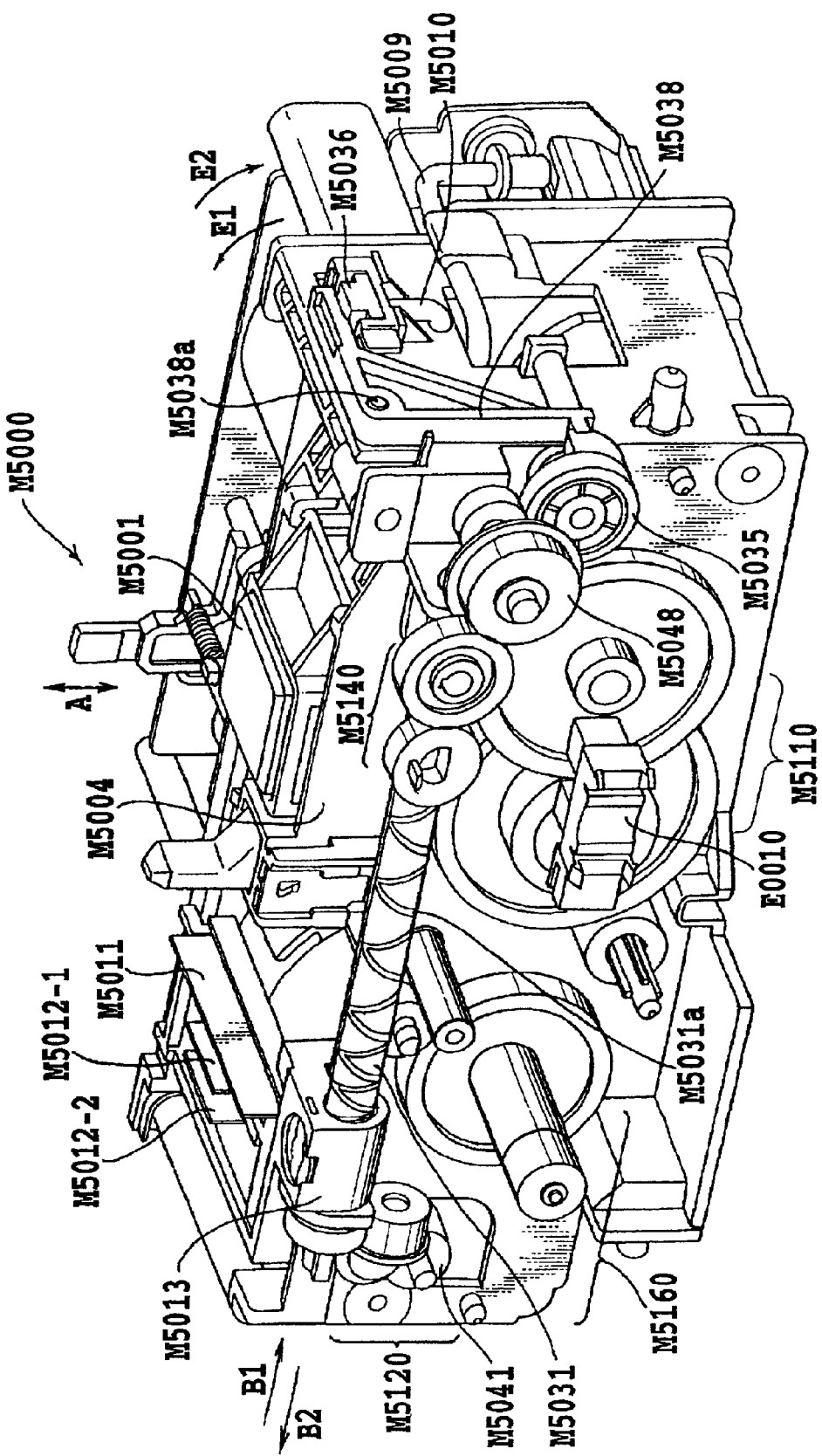
FIG. 12 is a perspective view showing the other side of the ejection performance recovery unit of FIG. 11.

In FIGS. 11 and 12, denoted E0003 is a PG motor which drives a cap M5001 to be described later, a pump M5100, wiper blades M5011, M5012-1, M5012-2 and the automatic sheet feed unit M3022. The driving force is extracted from both sides of the motor shaft of the PG motor E0003. The driving force extracted from one side is transmitted to the pump M5100 or the automatic sheet feed unit M3022 through a drive path switching means described later. The driving force extracted from the other side is transmitted to the cap M5001 and the wiper blades M5011, M5012-1, M5012-2 through a one-way clutch M5041 that engages when the PG motor E0003 rotates only in a particular direction (this rotation direction is referred to as a forward direction and the opposite direction as a reverse direction). Hence, when the PG motor E0003 is rotating in the reverse direction, the one-way clutch M5041 disengages blocking the driving force from being transmitted, so that the cap M5001 and the wiper blades M5011, M5012-1, M5012-2 are not operated.

The cap M5001 is made of an elastic member such as rubber and mounted on a cap lever M5004 that can be pivoted about its axis. The cap M5001 is moved in the direction of arrow A (FIG. 12) through the one-way clutch M5041, a cap drive transmission gear train M5110, a cap cam and the cap lever M5004 so that it can be brought into and out of contact with the print element substrate H1100 of the print head H1001. In the cap M5001 there is provided an absorbing member M5002 which is arranged to oppose the print element substrate H1100 with a predetermined gap therebetween during a capping operation.

The absorbing member M5002 disposed in this way can accept ink drawn out from the print head cartridge H1000 during the suction operation. Further, the ink in the cap M5001 can be discharged out into a used ink absorbing member completely by an evacuation operation described later. The cap M5001 is connected with two tubes, a cap tube M5009 and a valve tube M5010. The cap tube M5009 is connected to a pump tube M5019 of a pump M5100 described later and the valve tube M5010 to a valve rubber M5036 described later.

The wiper blades M5011, M5012-1, M5012-2 are made of elastic members such as rubber and are erected on a blade holder M5013 so that their edges project upward. The blade holder M5013 has a lead screw M5031 inserted therethrough with a projection not shown of the blade holder M5013 movably engaging in a groove formed in the lead screw M5031. As the lead screw M5031 rotates, the blade holder M5013 moves back and forth along the lead screw M5031 in the direction of arrow B1 or B2 (FIG. 12), causing the wiper blades M5011, M5012-1, M5012-2 to wipe clean the print element substrate H1100 of the print head cartridge H1000. The lead screw M5031 is connected to one side of the PG motor E0003 through the one-way clutch M5041 and a wiper drive transmission gear train M5120.

Designated M5100 is a pump that produces a pressure by pressing a roller (not shown) against and moving it along the pump tube M5019. This pump is connected to the other side of the PG motor E0003 via a drive path switching means and the pump drive transmission gear train M5130. The drive path switching means switches the driving force transmission path between the automatic sheet feed unit M3022 and the pump M5100. Although details are not provided, the pump M5100 has a mechanism to release the pressing force with which the roller (not shown) is pressed against the pump tube M5019 to squeeze it. When the PG motor E0003 rotates in the forward direction, the mechanism releases the pressing force from the roller, leaving the tube intact. When the PG motor E0003 rotates in the reverse direction, the mechanism applies the pressing force to the roller to squeeze the tube. One end of the pump tube M5019 is connected to the cap M5001 through the cap tube M5009.

The drive path switching means has a pendulum arm M5026 and a selector lever M5043. The pendulum arm M5026 is pivotable about a shaft M5026a in the direction of arrow C1 or C2 (FIG. 11) depending on the rotation direction of the PG motor E0003. The selector lever M5043 is switched according to the position of the carriage M4001. That is, when the carriage moves M4001 to a position over the ejection performance recovery unit M5000, a part of the selector lever M5043 is contacted by a part of the carriage M4001 and moved in the direction of arrow D1 or D2 (FIG. 11) depending on the position of the carriage M4001, with the result that a lock hole M5026b of the pendulum arm M5026 and a lock pin M5043a of the selector lever M5043 engage.

The valve rubber M5036 is connected with one end of the valve tube M5010 the other end of which is connected to the cap M5001. A valve lever M5038 is connected to the discharge roller 2003 (FIG. 5) through a valve cam M5035, a valve clutch M5048 and a valve drive transmission gear train M5140. As the discharge roller 2003 rotates, the valve lever M5038 is pivoted about a shaft M5038a in the direction of arrow E1 or E2 to come into or out of contact with the valve rubber M5036. When the valve lever M5038 is in contact with the valve rubber M5036, the valve is closed. When the lever is parted, the valve is open.

Denoted E0010 is a PG sensor that detects the position of the cap M5001.

Next, the operations of the ejection performance recovery unit M5000 of the above construction will be explained.

First, let us explain about the driving operation of the automatic sheet feed unit M3022.

When, with the carriage M4001 at the retracted position where it does not contact the selector lever M5043, the PG motor E0003 rotates in the reverse direction, the pendulum arm M5026 is pivoted in the direction of arrow C1 (FIG. 11) through a pendulum drive transmission gear train M5150, causing a selector output gear M5027 mounted on the pendulum arm M5026 to mesh with an ASF gear M5064 at one end of an ASF drive transmission gear train M5160. When in this state the PG motor E0003 continues to rotate in the reverse direction, the automatic sheet feed unit M3022 is driven by the PG motor through the ASF drive transmission gear train M5160. At this time, the driving force is not transmitted to the cap M5001 and the wiper blades M5011, M5012-1, M5012-2 because the one-way clutch M5041 is disengaged. Thus, the wiper blades are not operated.

Next, the suction operation of the pump M5100 will be described.

When, with the carriage M4001 at the retracted position where it does not contact the selector lever M5043, the PG motor E0003 rotates in the forward direction, the pendulum arm M5026 is pivoted in the direction of arrow C2 through the pendulum drive transmission gear train M5150, causing the selector output gear M5027 mounted on the pendulum arm M5026 to mesh with a pump gear M5053 at one end of the pump drive transmission gear train M5130.

Then, when the carriage M4001 moves to the capping position (a carriage position where the print element substrate H1100 of the print head cartridge H1000 faces the cap M5001), a part of the carriage M4001 abuts against a part of the selector lever M5043, which is then moved in the direction of D1, causing the lock pin M5043a of the selector lever M5043 to fit into the lock hole M5026b of the pendulum arm M5026. As a result, the pendulum arm M5026 is locked connected to the pump side.

Here, the discharge roller 2003 is driven in the reverse direction and the valve lever M5038 is rotated in the direction of arrow E1, opening the valve rubber M5036. In this open state, the PG motor E0003 rotates in the forward direction to drive the cap M5001 and the wiper blades M5011, M5012-1, M5012-2 to perform the capping operation (an operation whereby the cap M5001 hermetically contacts and covers the print element substrate H1100 of the print head H1001). At this time, the pump M5100 is operated but the pressing force of a roller (not shown) against the pump tube M5019 is released, so that the pump tube M5019 is not worked and no pressure is generated.

When the discharge roller 2003 is driven in the forward direction and the valve lever M5038 is pivoted in the direction of arrow E2 (FIG. 12), the valve rubber M5036 is closed. At this time, the PG motor E0003 rotates in the reverse direction to squeeze the pump tube M5019 by the pressing force of the roller to apply a negative pressure to the print element substrate H1100 of the print head cartridge H1000 through the cap tube M5009 and the cap M5001, forcibly drawing out ink and foams not suited for printing from the nozzles in the print element substrate H1100.

After this, the PG motor E0003 rotates in the reverse direction and at the same time the discharge roller 2003 is driven in the reverse direction to pivot the valve lever M5038 in the direction of arrow E1 (FIG. 12). Now the valve rubber M5036 is open. As a result, the pressure in the pump tube M5019, the cap tube M5009 and the cap M5001 is equal to an atmospheric pressure, stopping the forced suction of the ink nozzles in the print element substrate H1100 of the print head cartridge H1000. At the same time, the ink contained in the pump tube M5019, the cap tube M5009 and the cap M5001 is drawn out from the other end of the pump tube M5019 into the used ink absorbing member (not shown). This operation is referred to as an evacuation. Then, the PG motor E0003 is stopped, the discharge roller 2003 is driven in the forward direction and the valve lever M5038 is pivoted in the direction of arrow E2 (FIG. 12), closing the valve rubber M5036. Now the suction operation is finished.

Next, the wiping operation will be explained.

During the wiping operation, the PG motor E0003 is first rotated in the forward direction to move the wiper blades M5011, M5012-1, M5012-2 to the wiping start position (a position where the wiper blades M5011, M5012-1, M5012-2 are upstream of the print head cartridge H1000 in the printing operation, with the cap M5001 separated from the print head cartridge H1000). Next, the carriage M4001 moves to a wiping position where the wiper blades M5011, M5012-1, M5012-2 face the print element substrate H1100. At this time, the carriage M4001 is not in contact with the selector lever M5043 and the pendulum arm M5026 is not in the locked state.

Then, the PG motor E0003 rotates in the forward direction to move the wiper blades M5011, M5012-1, M5012-2 in the direction of arrow B1 (FIG. 12) wiping clean the print element substrate H1100 of the print head cartridge H1000. Further, a wiper blade cleaning means (not shown) provided downstream of the print element substrate H1100 of the print head cartridge H1000 in the direction of the printing operation clears the wiper blades of the adhering ink. At this time, the cap M5001 is kept in the separated state.

When the wiper blades reach the wiping end position (a downstream end position in the printing operation), the PG motor is stopped and the carriage M4001 is moved to the wiping standby position out of the wiping operation range of the wiper blades M5011, M5012-1, M5012-2. Then, the PG motor E0003 is rotated in the forward direction to move the wiper blades to the wiping end position. At this time, too, the cap M5001 is maintained in the separated state. Now, the wiping operation is finished.

Next, the preliminary ejection will be explained.

Performing the suction operation and the wiping operation on a print head that uses a plurality of inks may cause a problem of ink mixing.

For example, during the suction operation, ink drawn out from the nozzles may get into nozzles of other color inks and, during the wiping operation, inks of various colors adhering to the circumferences of the nozzles may be pushed into nozzles of different color inks by the wipers. When the next printing is started, the initial part of the printed image may be discolored (or exhibit mixed colors), degrading the printed image.

To prevent the color mixing, the ink that may have mixed with other color inks is ejected out immediately before printing. This is called a preliminary ejection. In this embodiment, as shown in FIG. 11, a preliminary ejection port M5045 is arranged near the cap M5001. Immediately before printing, the print element substrate H1100 of the print head is moved to a position opposing the preliminary ejection port M5045 where it is subjected to the preliminary ejection operation.

The preliminary ejection port M5045 has a preliminary ejection absorbing member M5046 and a preliminary ejection cover M5047. The preliminary ejection absorbing member M5046 communicates with the used ink absorbing member not shown.

I.3 Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figure 13B:
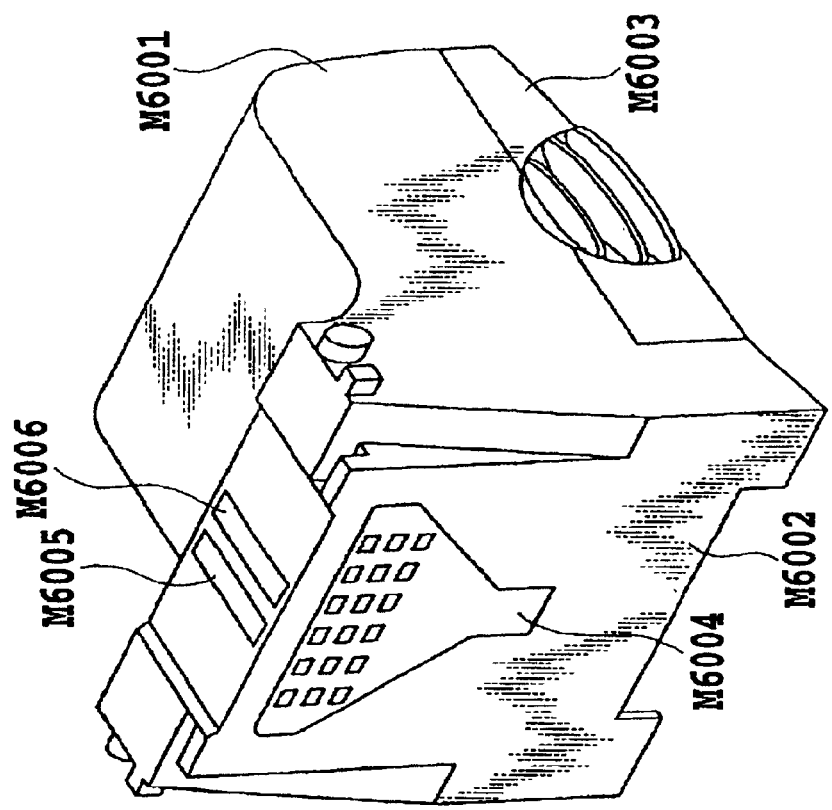
FIGS. 13A and 13B are perspective views showing a construction of a scanner cartridge upside down which can be mounted in the printer of one embodiment of the present invention instead of the print head cartridge of FIG. 6.
Figure 13A:
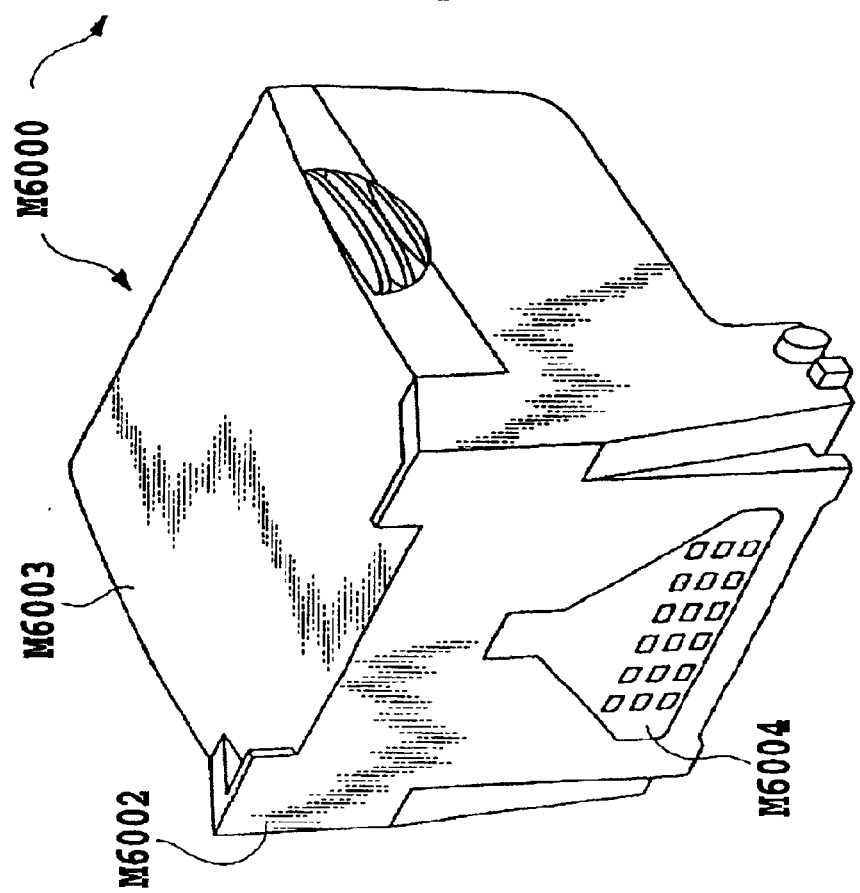

FIGS. 13A and 13B show the scanner M6000 upside down to explain about its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

I.4 Storage Box

FIG. 14 shows a storage box M6100 for storing the print head H1001.

The storage box M6100 comprises a storage box base M6101 having an opening at its top, a storage box cover M6102 pivotally mounted on the storage box base M6101 to open and close the opening, a storage box cap M6103 secured to the bottom of the storage box base M6101, and a leaf spring-like storage box spring M6104 secured to the inner top portion of the storage box cover M6102.

When the print head is to be stored in the storage box of the above construction, the print head is inserted into the storage box base M6101 so that the nozzle portion faces the storage box cap and then the storage box cover M6102 is closed to engage a locking portion of the storage box base M6101 with the storage box cover M6102 to keep the storage box cover M6102 in a closed state. Because the storage box spring M6104 in this closed state applies a pressing force to the print head H1001, the nozzle portion of the print head H1001 is hermetically covered by the storage box cap M6103. Therefore, this storage box can protect the print head nozzles against dust and ink evaporation and therefore maintain the print head in good condition for a long period of time.

The storage box M6100 for storing the print head H1001 can also be used for storing the scanner M6000. It is noted, however, that because the storage box cap M6103 that protects the nozzle portion of the print head H1001 is smeared with ink, it is strongly suggested that to prevent the ink from adhering to the scanner, the scanner be stored so that the scanner surface on which the scanner reading lens M6006 and the scanner illumination lens M6005 are arranged is directed away from the storage box cap M6103.

I.5 Example Configuration of Printer Electric Circuit

Next, an electric circuit configuration in this embodiment of the invention will be explained.

FIG. 15 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 16B:
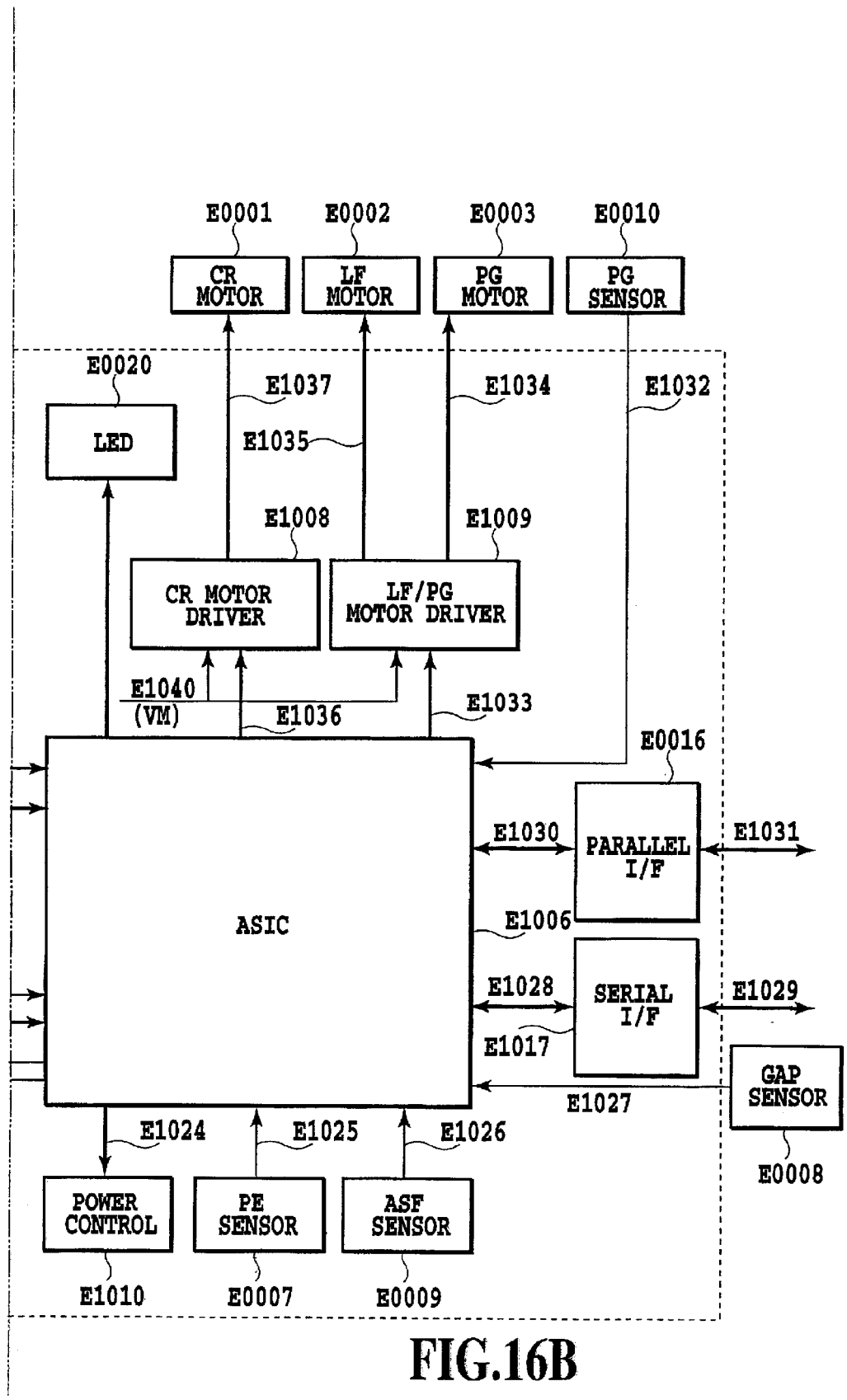
FIG. 16 is a diagram showing the relation between FIGS. 16A and 16B, FIGS. 16A and 16B being block diagrams representing an example inner configuration of a main printed circuit board (PCB) in the electric circuitry of FIG. 15.

FIG. 16 is a diagram showing the relation between FIGS. 16A and 16B, and FIGS. 16A and 16B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000.

E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 17A:
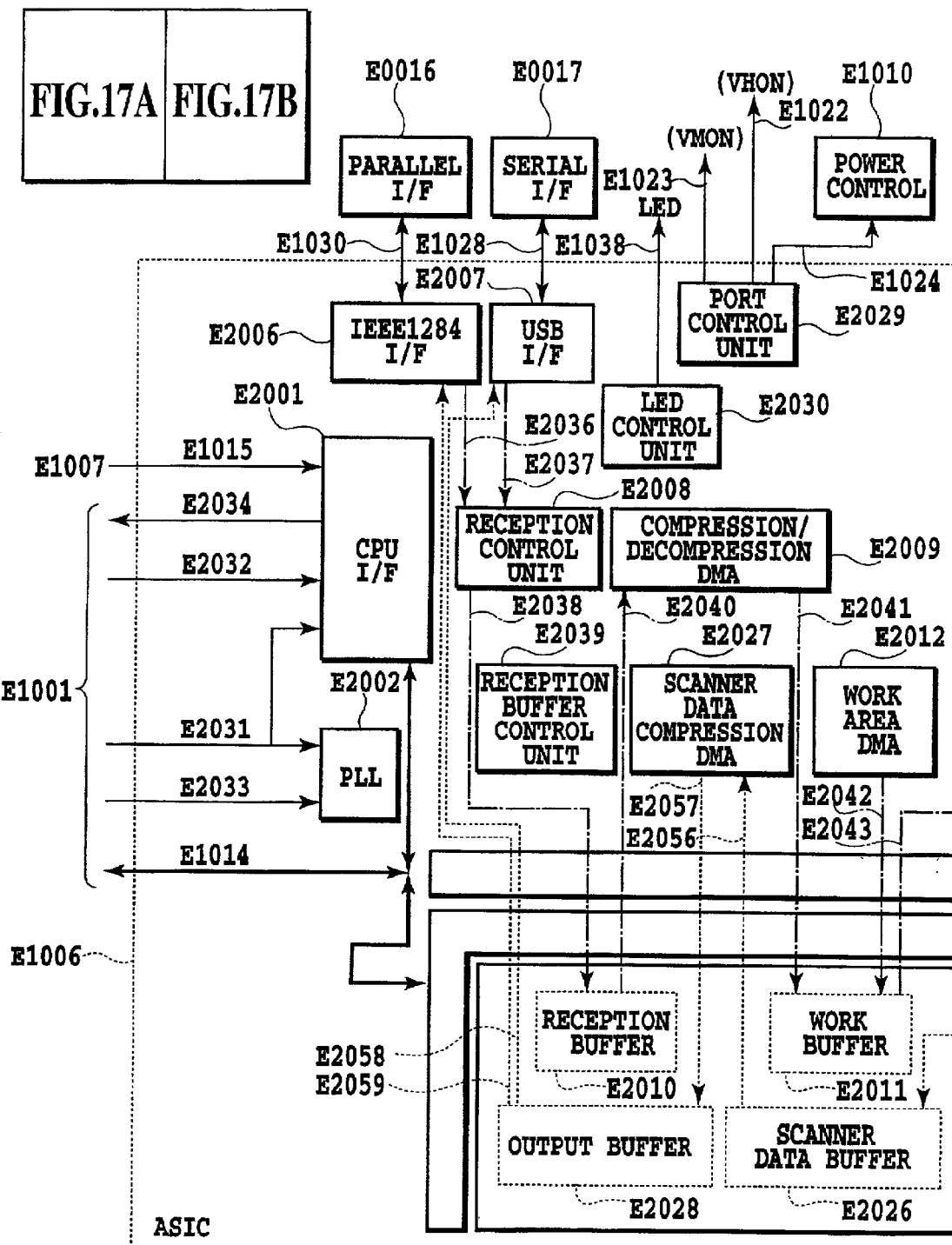
FIG. 17 is a diagram showing the relation between FIGS. 17A and 17B, FIGS. 17A and 17B being block diagrams representing an example inner configuration of an application specific integrated circuit (ASIC) in the main PCB of FIGS. 16A and 16B.
Figure 17B:
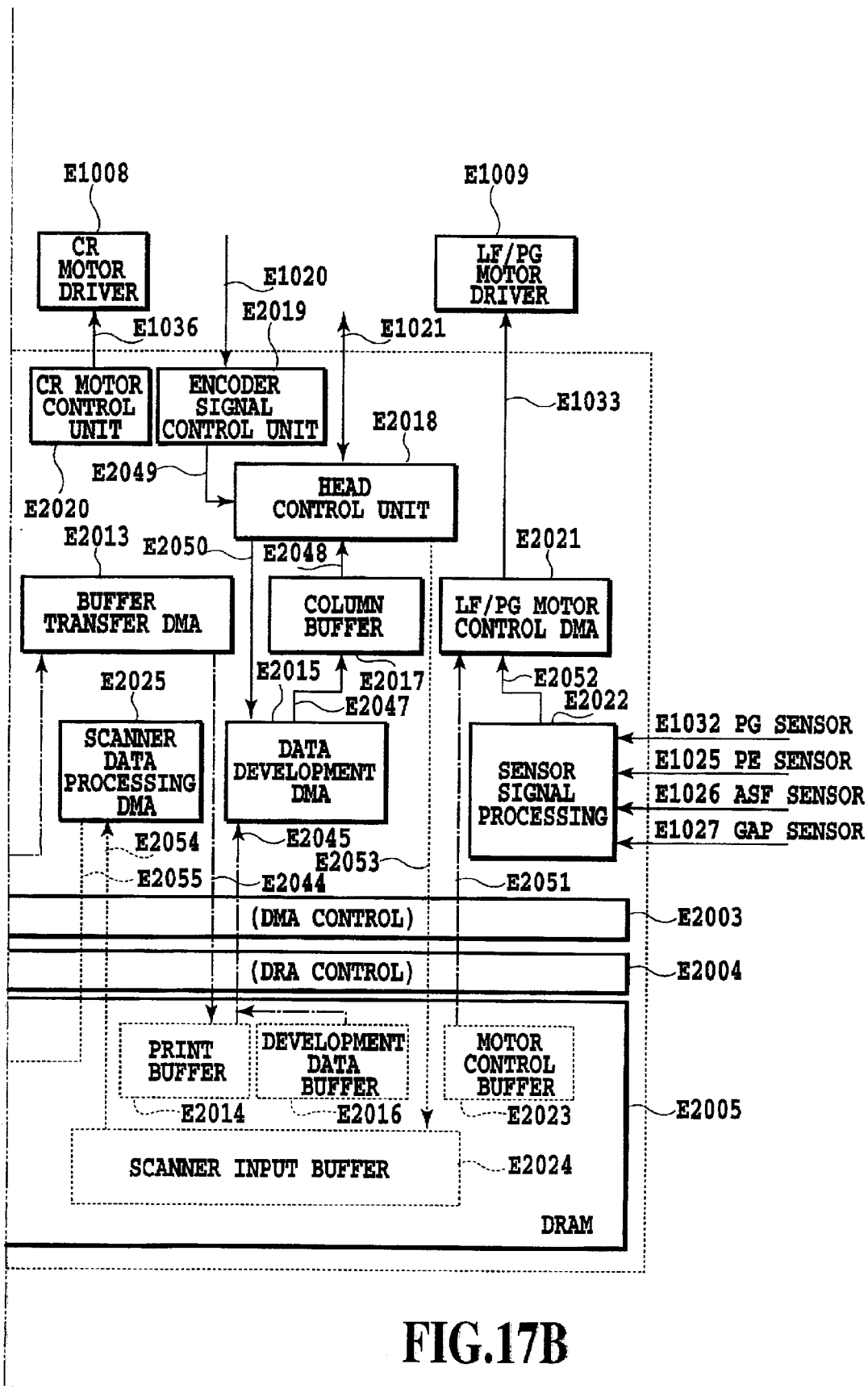

FIG. 17 is a diagram showing the relation between FIGS. 17A and 17B, and FIGS. 17A and 17B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001 shown in FIG. 16A, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

II.1 Operation of Printer

Figure 18:
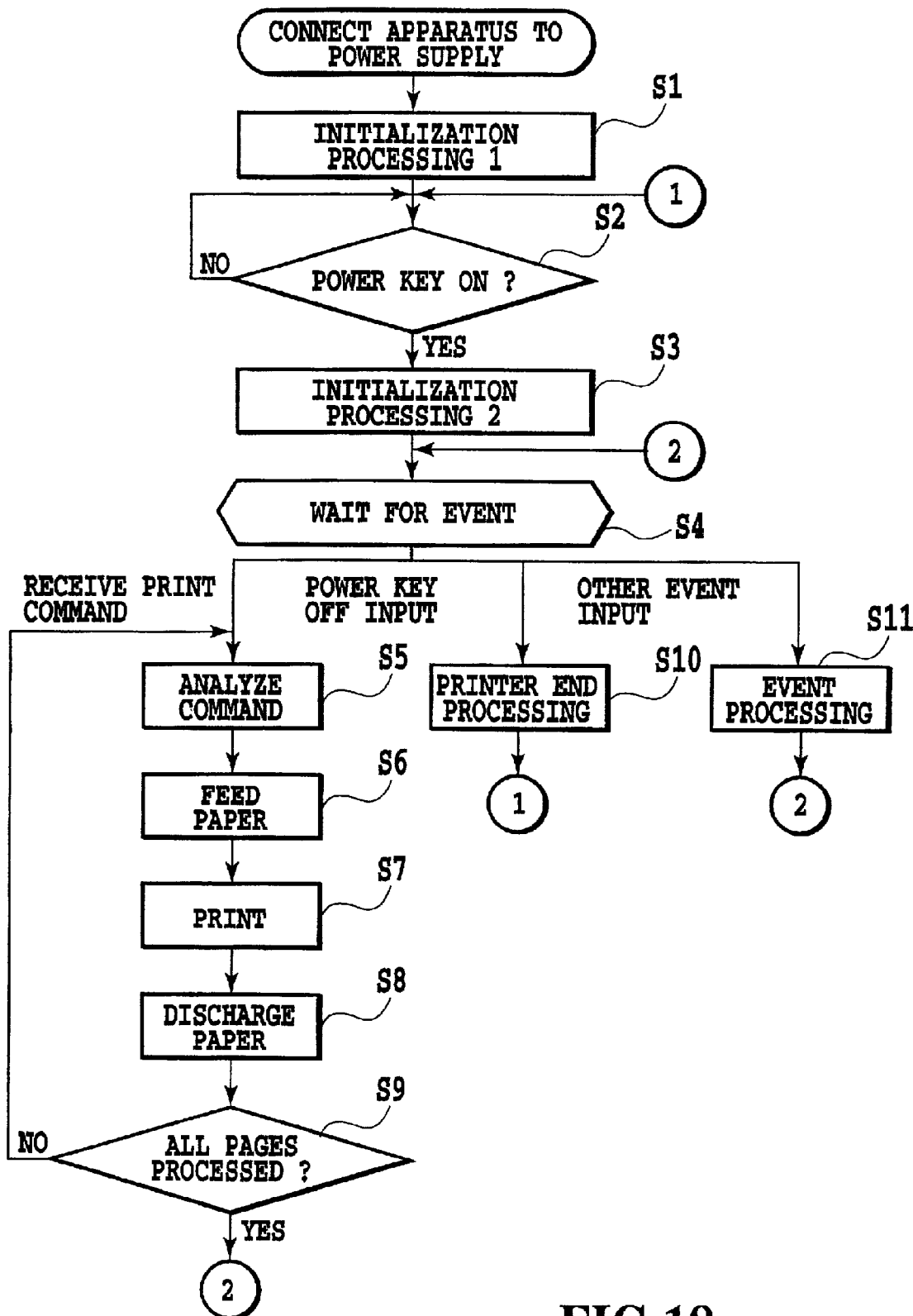
FIG. 18 is a flow chart showing an example of operation of the printer as one embodiment of the present invention.

Next, the operation of the ink jet printing apparatus in this embodiment of the invention with the above configuration will be explained by referring to the flow chart of FIG. 18.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel-keys or external I/F and the ejection performance recovery event that occurs internally. After the recovery processing is finished, the printer operation moves to step S4 waiting for the next event.

Embodiment 1

An embodiment in which the present invention has been applied to the ink jet printer described above will be described below.

In this embodiment, LF roller M3001, shown in FIG. 3 and other figures is defined as an upstream roller and the discharge roller M2003 is defined as a downstream roller. Further, various processes of the present invention described below are applied for a second area of a printing medium. Then, a back end area shown in FIG. 43A, in which deviation of dot forming locations in relation to the printing medium may occur due to a lack of accuracy of feeding with use of only the discharge roller as the downstream roller, is defined as the second area with respect to a first area in which printing locations are restrained from being deviated. More specifically, compared to the first area, the second area of the printing medium 2, shown in FIG. 43A, is subjected to a decrease in the feeding accuracy caused by the kicking or to the sheet floating, as described above, while the printing medium is being fed. Then, the relative deviation of the dot forming location is made larger in the second area, and accordingly the various processes described below are applied in the case of performing printing on this area.

The print head of this embodiment is provided for each of cyan, magenta, yellow, black, light cyan, and light magenta inks, and has an array of ejection ports arranged at a pitch of 21.17 m (equivalent to 1,200 dpi), as described above. Two hundred and twenty-five ejection ports are used for normal printing, and additional two are provided at either end of the array of these 255 ejection ports; the entire array includes 260 ejection ports. The printer of this embodiment can use these print heads to form ink dots at a density of 1,200 dpi in the main-scanning direction and the sub-scanning direction (sheet feeding direction), and the dots formed each have a size of about 45 $\mu$m. Then, a printing is performed by setting one pixel to have five values that can be expressed by arranging four dots in corresponding manners. That is, the printer of this embodiment is of a multi-valued printing in which a five-valued printing is performed with a pixel density of 600 ppi (pixel per inch) in the main- and sub-scanning directions, respectively. In this embodiment, five-valued data for each pixel can be obtained using an error diffusion method (ED), thereby enabling expressing pseudo gradation in halftone areas. The light cyan and magenta inks each have an ink concentration equal to one-sixth of that of the normal inks.

Now, a phenomenon in which the image quality is degraded by a sheet feeding error in the second area will be specifically described.

The sheet feeding error may occur during each sheet feeding operation as in the example shown in Table 1 below, thus causing the relative deviation of landing location of ink.

TABLE 1

| Relative Deviation of Dot Landing Locations in Second Area | | | | | | | | | | |
|---|---|---|---|---|---|---|---|---|---|---|
| After passage through LF roller [change-line operation] | 1 | 2 | 3 | 4 | 5 | 6 | 7 | 8 | 9 | 10 |
| Error (average) [$\mu$m] | 2.5 | −35.0 | 7.7 | 4.2 | 2.7 | 3.5 | 1.3 | 0.1 | 1.7 | 0.6 |

In Table 1, the upper row indicates the number of times that the printing sheet (printing medium) is fed at predetermined amount (this operation is hereinafter also referred to as a "change-line operation") after its back end has left the LF roller M3001 as the upstream roller. Further, the lower row indicates a sheet feeding error (deviation of landing locations) that may occur during a corresponding change-line operation and that is represented by the distance between dots printed before and after that change-line operation. In the example shown in Table 1, a certain error occurs during each change-line operation, and in particular, a relatively large error of −35.0 $\mu$m occurs during a second change-line operation.

The example shown in Table 1 indicates the average of measured data obtained by measuring patches 10 times which were printed in the second area using the above described printer of this embodiment and by excluding the maximum and minimum values from the results of the measurements.

Figure 19A:
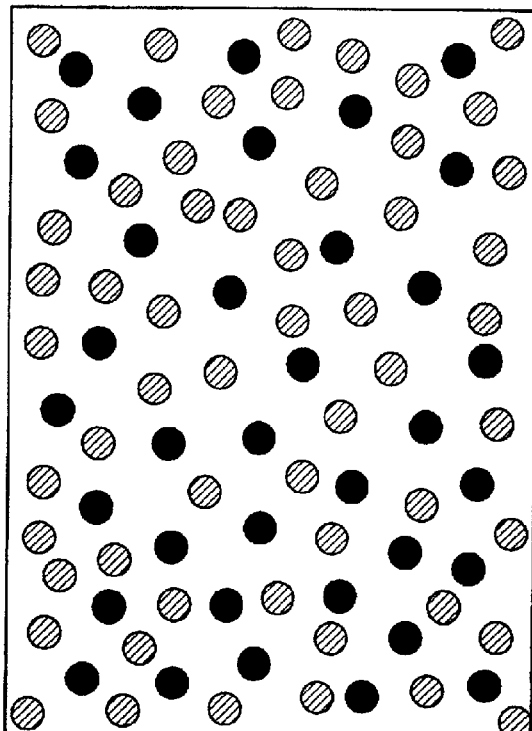
FIGS. 19A and 19B are diagrams for explaining how dots are deviated when the dots are formed on a second area of a printing sheet which is fed relatively inaccurately and how a white stripe occurs.
Figure 19B:
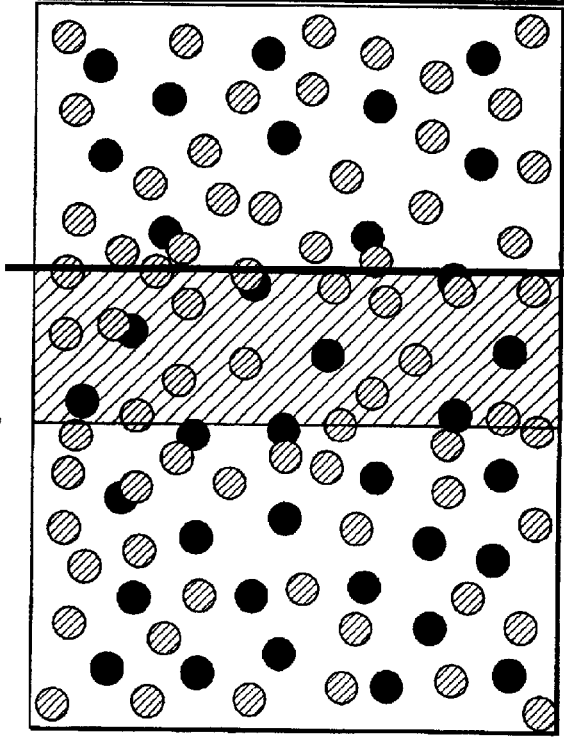

FIGS. 19A and 19B are diagrams showing the results on the printing of the first area, in which the printing sheet is accurately fed using both the LF roller M3001 of the upstream and the discharge roller M2003 of the downstream so that the printing locations do not substantially deviate, as well as the results of the printing on the second area (back end area), in which the printing sheet is inaccurately fed so that the printing locations deviate significantly. All these results were obtained when each raster constituting a patch of an intermediate density is printed by means of multi-pass printing, in which two scanning operations are performed with one change-line operation interposed between these two scanning operations and in which different ejection ports were used in each scanning operation (hereinafter referred to as "two-pass printing").

To print out the patch having even density on entire area thereof, print data is generated in such a manner that the dots are evenly disposed on the printing medium for each color finally by a halftone process using the error diffusion method. More specifically, the dots in each rater which is formed using the two passes are substantially linearly arranged if no sheet feeding error occurs. Accordingly, the results of the printing on the first area, which is ensured that the sheet is fed accurately, are such that the dots are arranged substantially evenly as shown in FIG. 19A. (The dots are not shown to be arranged precisely linearly in the horizontal direction of the figure. This, however, schematically shows the actual results of printing, and a slight misalignment may occur even if no sheet feeding error occurs.) On the other hand, in the second area, in which a large sheet feeding error may occur, the relative locations of the dots formed are shifted due to an error occurring during each change-line operation as shown in Table 1, so that the dots formed during different scanning operations overlap each other or are located close to each other, as shown in FIG. 19B. The overlapping of the dots or the like means that inks are not landed on proper locations on which the dots are originally formed, and then an ideal printed image to be obtained through the halftone process is spoiled. Consequently, the image may be perceived as a texture or observed as a stripe from a broad point of view, thus degrading quality of the printed image.

In the example of errors shown in Table 1, the deviation of the dot locations during the second change-line operation is particularly significant, and this part is perceived as a white stripe at a least distance of distinct vision of about 30 cm.

The large sheet feeding error (35 μm) occurring during the second change-line operation (the scanning operation after this change-line operation is hereinafter referred to as a "pass A") is due to following phenomenon. For example, when the printing sheet leaves the upstream LF roller M3001 to shift a printing area from the first area to the second area, the sheet is disengaged from the LF roller M3001 (and the pinch roller M3014) and then floats (this state is referred to as "sheet floating") due to a lack of an appropriate tension acting on the sheet, thereby significantly shifting the landing locations of inks. Also, when the printing area is shifted from the first area to the second area, so called the "kicking", which means that the sheet is fed at more amount than that in the normal feeding, may occur due to a disappearance of the tension acting on the printing medium between the LF roller M3001 and the discharge roller M2003. It should be noted that the relatively large sheet feeding error occurs rather due to the "kicking".

Figure 20:
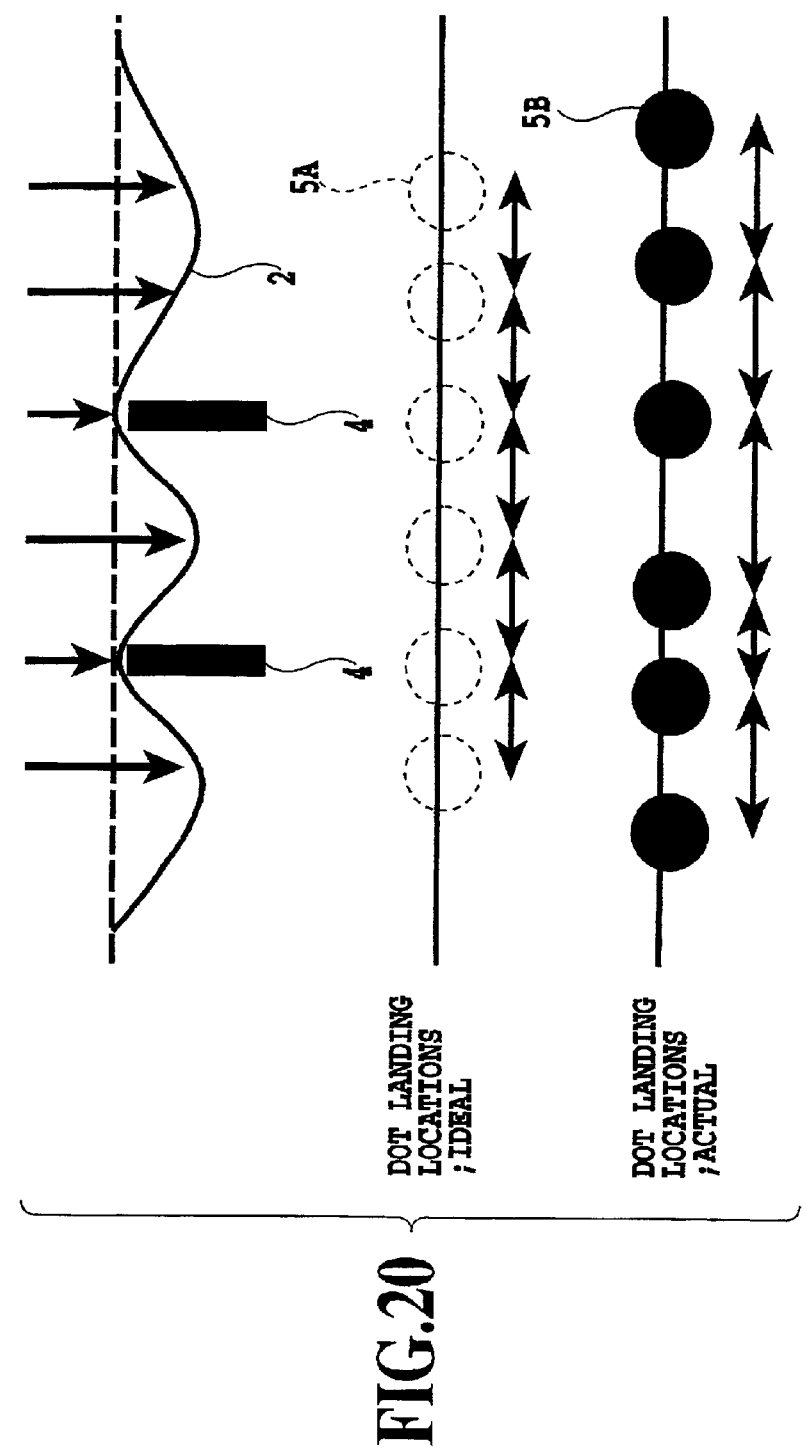
FIG. 20 is a diagram for explaining another example of the deviation of dot forming locations in the second area.

The error that may occur during the feeding of the printing sheet has been described, but in an area of the printing sheet on which printing is performed after the sheet has been disengaged from between the LF roller M3001 and the pinch roller M3024, the dot forming locations may also be more significantly shifted in the main-scanning direction of the print heads than in the first area, in which the sheet is ensured to be fed accurately, thus degrading the image quality. This is because the tension effected by both the upstream and downstream rollers is lost so that the printing sheet is curled to have no planarity or because, as shown in FIG. 20, the printing sheet 2 comes in contact with ribs 4 located below the transportation passage, and is thus warped so as to form projections and recesses thereon. As a result, the locations of dots 5A to be formed on the printing sheet, which is inherently flat, are shifted from one another, resulting in dots 5B formed depending on a curved surface of the printing sheet which includes projections and recesses.

As described above, in the second area, the sheet feeding error, which may occur during each change-line operation, or another factor causes the relative locations of the dots formed to be shifted, so that textures or stripes appear. By way of example, the amount of sheet feeding error beyond which the resulting stripes are visually observable will be described below.

An evaluation was carried out by using the above described printer of this embodiment to print an evenly gray patch having an optical reflection density of 1.0 while intentionally causing various amounts of sheet feeding error, and checking whether or not the deviation of the resulting dot forming locations can be perceived as stripes at a least distance of distinct vision of about 30 cm. As a result, as shown in Table 2 below, when the sheet feeding error amounted to 10 μm to 12 μm, the deviation could be recognized as stripes, and when the error amounted to 12 μm or more, the deviation could be clearly recognized as stripes.

TABLE 2

Evaluation of Stripes Resulting from Sheet Feeding Error

| Sheet feeding error [μm] | 0–8 | 8–10 | 10–12 | more than 12 |
|---|---|---|---|---|
| Evaluation Results | ◎ Cannot be recognized as stripes | ○ Can be recognized as stripes when viewed carefully | ● Can be recognized as stripes at least distance of distinct vision | Δ Can be clearly recognized as stripes |

Of course, the degradation of the image resulting from the deviation of the dot forming locations is not limited to the above described stripes. Any disturbance of the image caused by the deviation of the dots from their normal locations, for example, an uneven density or a texture, which is commonly observed, can be eliminated by the process of this embodiment, as understood from the following description:

This embodiment executes one or any of processes (1) to (8) shown below, solely or in combination, for the back end area of the printing sheet in order to reduce stripes or textures that may occur when the above described second area (back end area) is subject to printing.

Process (1): Changing Duty of Mask

This process distributes duty of printing performed during the scanning operation (pass) after a change-line operation with a particularly large sheet feeding error compared to the other areas, such as pass A, to other passes to reduce the number of dots printed during this pass, thereby making possible stripes unnoticeable. More specifically, in a multi-pass printing method of printing an image in a single scanning line through a plurality of scanning operations (passes) by associating these scanning operations with different ejection ports, the single scanning line is printed by the plurality of passes. Thus, a mask process is executed so that the duty of the particular pass is distributed to other passes. In this embodiment, for a mask for each pass, the duty of the particular pass A is reduced, and this amount of reduction is distributed to masks for other passes.

Figure 21:
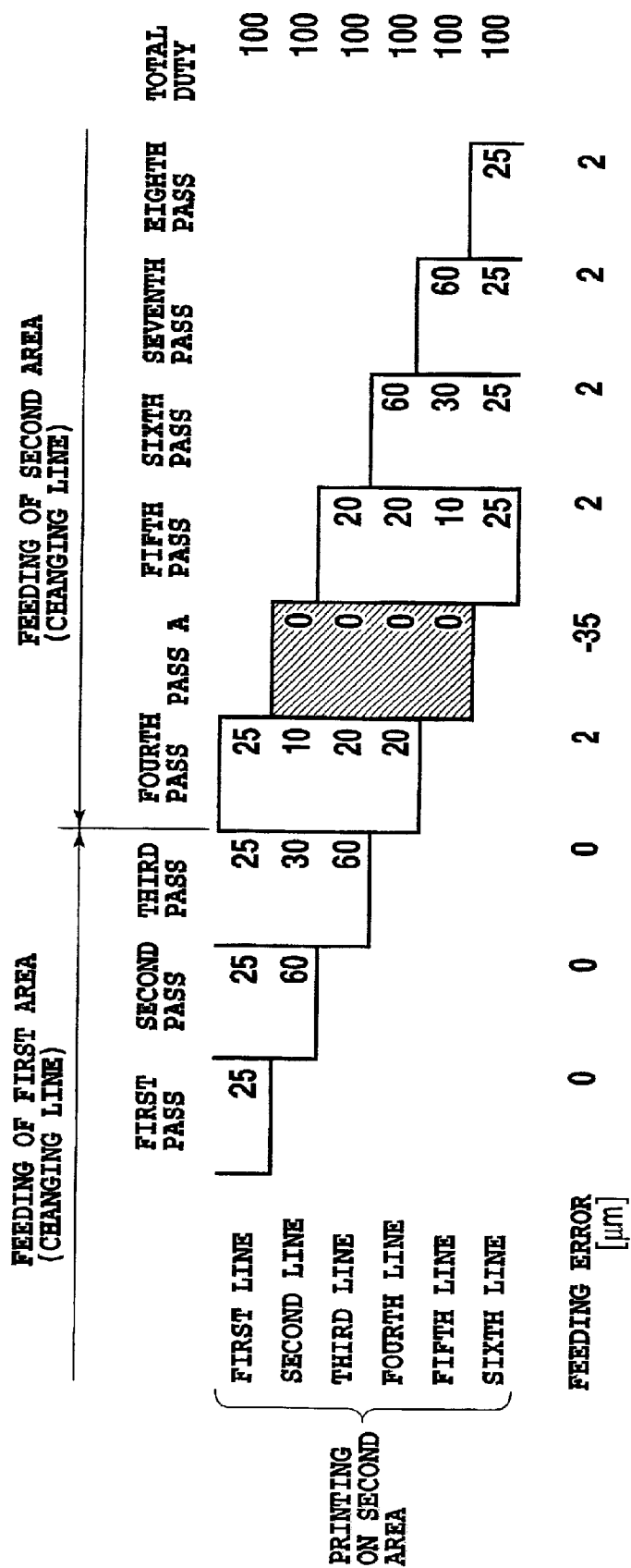
FIG. 21 is a diagram for explaining a process for printing on the second area according to the embodiment of the present invention, wherein the duty of one of the passes of a multi-pass printing operation in relation to which a sheet is fed inaccurately is distributed to other passes.

FIG. 21 is a diagram for explaining the basic configuration of this process. The example shown in this figure shows that each line is printed using four passes as in the first area. In this figure, the rectangle shown for each pass indicates the line printed during that pass, and the numbers inside the rectangle show the duty of the mask used during that pass.

As shown in this figure, for example, in the second area of the printing sheet, a first (scanning) line bounding on the first area is printed using passes each following a corresponding one of the last three change-line operations for the sheet feeding for the first area and using a pass after the first change-line operation for the sheet feeding for the second area. Thus, the printing of this line does not involve the pass A.

In contrast, for the printing of the second, third, fourth, and fifth (scanning) lines during the sheet feeding for the second area, the fourth pass for the second line, the third pass for the third line, the second pass for the fourth line, and the first pass for the fifth line each act as the pass A. The masks for the corresponding passes for the line printed using the four passes including the pass A are provided so that the duty of the pass A is zeroed and distributed to other passes. The duty is distributed in such a manner that more of the duty is distributed to later passes with respect to the pass A so as to reduce the adverse effects of the change-line operation for the pass A, which amount to an accumulated error. For example, in the printing of the third (scanning) line, the first scanning operation (third pass) has 60% of the duty, the second scanning operation (fourth pass) has 20% of the duty, and the fourth scanning operation (fifth pass) has 20% of the duty.

The above process allows more dots to be printed on a pass after a change-line operation with a reduced sheet feeding error, thereby reducing the number of dots printed so as to lie close to each other or overlap each other. Consequently, the appearance of stripes can be restrained.

As a variation of the above described process, it is contemplated that instead of the error that may occur during each change-line operation, the accumulated error may be taken into consideration.

Table 3 shows accumulated errors after corresponding change-line operations for the second area. The example shown in Table 3 indicates the accumulation of the errors occurring during the corresponding change-line operations as shown in Table 1.

pass more distant from the pass A, having a large error, and to the pass of larger-number of change-line operations for the second area, that is, the pass of more reduced the accumulated error. Preferably, for example, a single line is printed by 16 passes, and all of the duty is distributed to passes corresponding to the ninth or later change-line operation for the second area.

As described above, the perception of the error as stripes can be prevented all over the second area by, in particular, noting the accumulated error, and printing a large number of dots and preferably all dots while preventing the accumulated error from being clearly perceived as stripes.

The possibility of the large landing location error in the pass A can be determined on a basis of the results of a number of printing operations for the second area. This data can be stored in a memory as data which is specific to this printer and which can be used, for example, to control the printing for the pass A. It is also possible to print a predetermined patch or the like in the second area, use the above described scanner to read it to detect a stripe, check, on the basis of the result of the detection, which of the passes for the second area has resulted in this stripe and determine the amount of the misalignment of dots causing the stripe to be perceived, store this data in a predetermined memory, and execute the above described mask process on the basis of the data.

Process (2): Adding Noises to Masks

This process fills relatively large spaces with dots as noises, the spaces resulting from the deviation of dots caused by the sheet feeding error and being possibly perceived as white stripes. That is, as shown in FIG. 19B, in the second area, spaces are formed in areas other than those in which the dots overlap each other or are in contact with each other, and these space areas are perceived as white stripes. Accordingly, the white stripes are reduced by filling the areas in which the spaces are formed, with dots as noises.

TABLE 3

Accumulated Error in Dot Impact Locations in Second Area

| After passage through LF roller [change-line operation] | 1 | 2 | 3 | 4 | 5 | 6 | 7 | 8 | 9 | 10 |
|---|---|---|---|---|---|---|---|---|---|---|
| Accumulated error (average)[$\mu$m] | 2.5 | −32.5 | −24.8 | −20.6 | −17.9 | −14.4 | −13.1 | −13.0 | −11.3 | −10.7 |

As shown in Table 3, the accumulated error gradually decreases during the sheet feeding for the second area, and amounts to less than 12 $\mu$m after the ninth change-line operation. This is a boundary error value above which the error is not clearly perceived as stripes, as described in Table 2.

In this variation process, it is noted that the accumulated error thus decreases with an increase in the number of change-line operations performed and that the error is not clearly visually perceived after the ninth change-line operation. Thus, the number of passes for printing a single scanning line is increased compared to the sheet feeding for the first area, and the duty is distributed to passes that serve to minimize the accumulated error. The duty is distributed so that more of the duty is allotted to later passes with respect to the pass A, as in the basic configuration shown in FIG. 21.

Figure 22:
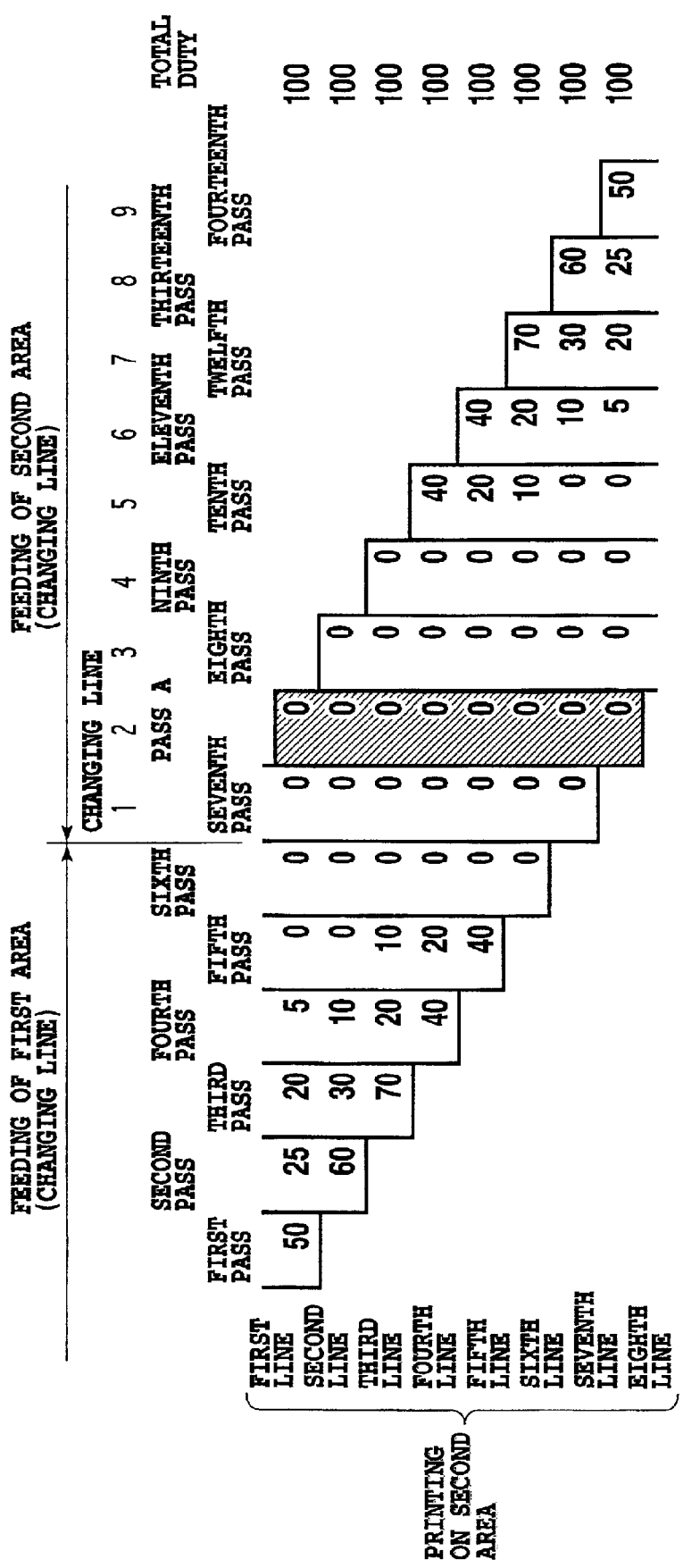
FIG. 22 is a diagram for explaining a variation of the process of distributing the duty of one of the passes of a multi-pass printing operation, in relation to which a sheet is fed inaccurately, to other passes.

FIG. 22 is a diagram showing an example in which the first area is printed by four passes, whereas in the second area, each line is printed by corresponding eight passes. As shown in this figure, more of the duty is distributed to the FIGS. 23A to 23C are diagrams for explaining the effects of the addition of noises. FIG. 23A shows that no sheet feeding error occurs, thus preventing the printed dots from being deviated. On the other hand, FIG. 23B shows that the printed dots are deviated due to the sheet feeding error. This process deals with this state and performs a printing operation by adding dots as noises to a mask as shown in FIG. 23C. FIGS. 23A and 23C show actually formed dots and schematically show the contents of the mask. Further, this process is based on random masks. This also applies to other examples of masks, described below.

By, for example, adding, to a mask used in the multi-pass printing, dots corresponding to 0.1% to 50% of the total duty of this mask, the dots can be printed so as to fill areas having a reduced number of dots due to the sheet feeding error. This dot addition can be achieved by, for example, changing normal masks for corresponding scanning operations which have the respective duties total of which is a 100% duty.

Figure 24:
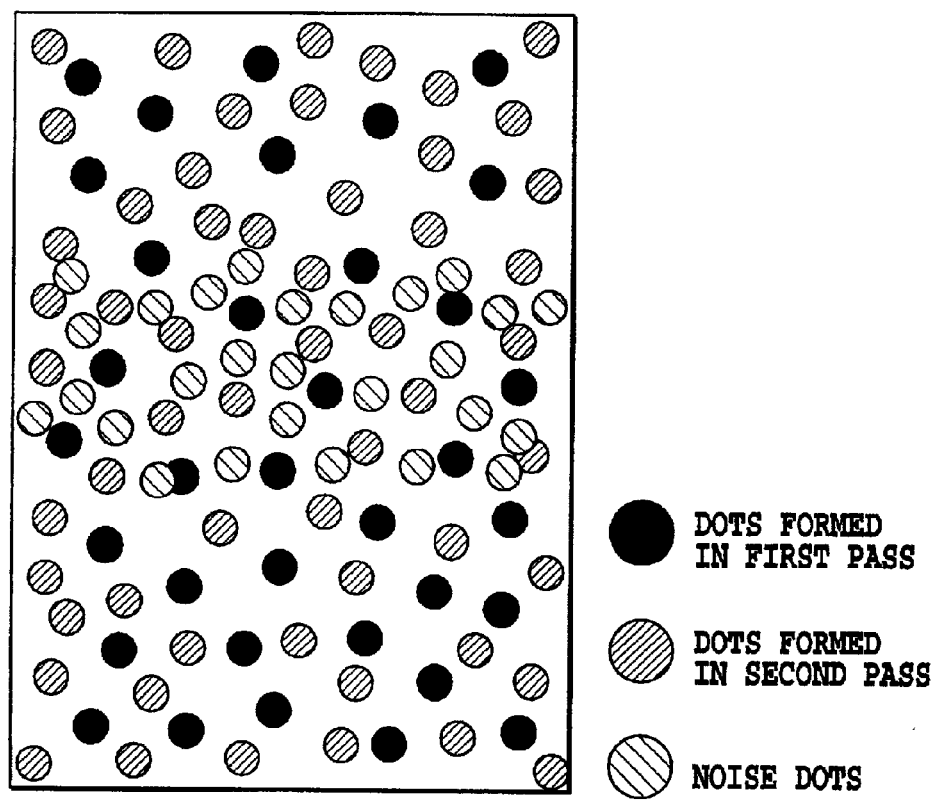
FIG. 24 is a diagram for explaining inconveniences of the process of printing the noise dots in the spaces formed due to the deviation of the printed dots.

However, if an excessively large amount of noise is added or noise is added rapidly to a particular pass (for example, the above described pass A), the dots may be densely arranged to cause a black stripe to be perceived as shown in FIG. 24, if the sheet feeding error is relatively small (for example, 12 µm or less).

Then, as shown in FIG. 25, noise is added by weighting scanning lines preceding and following one (corresponding to the fourth change-line operation in this figure) in which the white stripe is assumed to appear. Thus, the black stripe can be prevented from appearing by the addition of noise if the sheet feeding error is small and if the dots are thus not substantially deviated.

Process (3): Setting Mask to Have Pattern Hard To Be Affected by Deviation in Sub- or Main-scanning Direction Instead of noting the particular pass that may cause the dot forming locations to be significantly shifted, such as the above described pass A, this process reduces possible stripes or the like by providing a mask having a pattern that is hard to be affected by the deviation of the dots in the sub- or main-scanning direction caused by the sheet feeding error or the like.

Figure 26A:
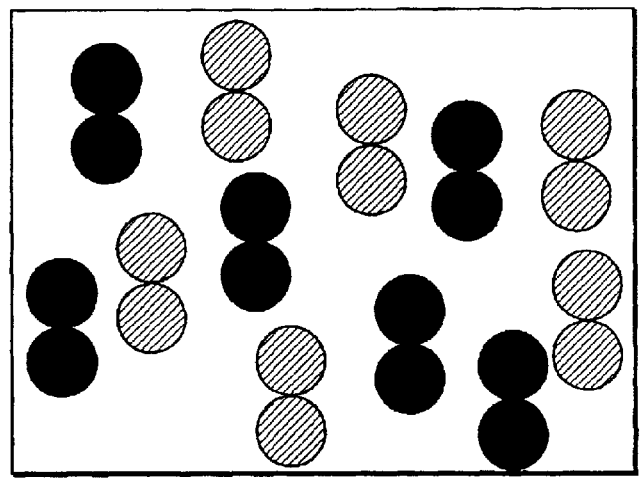
FIGS. 26A and 26B are diagrams for explaining still another process for printing on the second area according to the embodiment of the present invention, and showing a mask pattern hard to be affected by the deviation of the dots in a sheet feeding direction by comparative dot formations which are differed in the formation without or with the dot deviation, respectively.
Figure 26B:
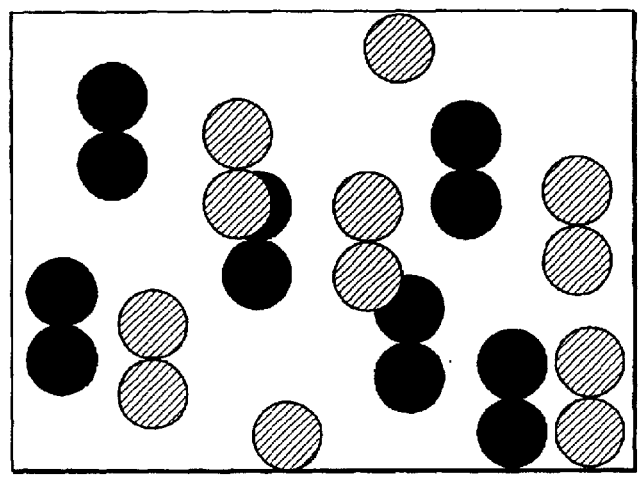

For example, for the printing of the second area, ① the contents of a mask are set such that the dots printed during a single pass constitute masses in the sub-scanning direction as shown in FIGS. 26A and 26B. This can be realized by providing such a mask that, for example, the ink is ejected from adjacent ejection ports during the single pass. Then, even if, as shown in FIG. 26B, the sheet feeding error or the like causes all the dots formed during the second pass to be shifted downward in the figure relative to the dots formed during the first pass, large gaps are prevented from being formed between the dots formed during each pass. The masks shown in these figures are used for two-pass printing in which the printing operation for each scanning line is completed by two passes; they are random masks.

<Case that Further Larger Error Occurs in Sub-scanning Direction>

For the first area, for example, a mask used for 4-pass bi-directional printing is generated by randomly arranging dot masses which have ratio of the width to the length is 2:1, in order to prevent uneven colors that may result from bi-directional printing. On the other hand, for the second area, a greater importance is attached to the elimination of stripes even if this results in slightly uneven colors. Then, as a variation of the masks shown in FIGS. 26A and 26B, a mask is provided such that the size of each of the dot masses is increased in the sub-scanning direction, for example, up to 2×4 and these masses are randomly shifted relative to the sub-scanning direction, that is, a random relationship is established between the locations of dots formed during the first and second passes, as shown in FIGS. 27A and 27B. This effectively reduces stripes that may result from the deviation of the dot formed locations in the sub-scanning direction.

<Case that Large Error Occurs in Main-scanning Direction>

As another variation, a mask is provided such that the size of each of the dot masses is increased in the main-scanning direction, for example, up to 4×1 and these masses are randomly shifted relative to the main-scanning direction, as shown in FIGS. 28A and 28B. This effectively reduces stripes that may result from the deviation of the dot forming locations in the main-scanning direction.

<Case that Large Errors Occur in Both Main- and Sub-scanning Directions>

As yet another variation, a mask is provided such that the dot masses are each shaped like a cross and are shifted in both the main- and sub-scanning directions, as shown in FIGS. 29A to 29C. This also effectively reduces possible stripes.

② The masks described in FIGS. 27A and 27B in connection with the above ① can be changed so that the dots are arranged in the sub-scanning direction in a staggered or checkered pattern as shown in FIGS. 30A and 30B.

③ A mask can also be generated such that the dots are formed at a higher-spatial-frequency side, for which human beings have a low visual intensity, so that the dots visually appear to have evenness, thereby preventing the easy perception of the deviation of dots caused by the sheet feeding error or the like. Such a mask can be generated, for example, as a blue noise one or using the method described in Japanese Patent Application No. 2000-203882 by the assignee of the present application.

Figure 32A:
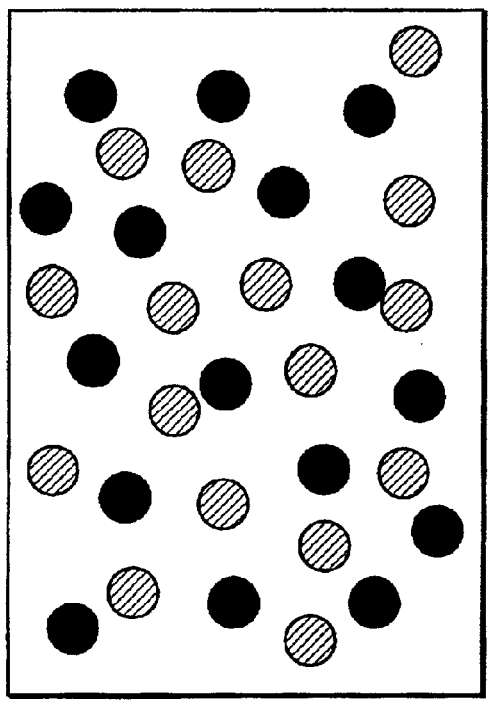
FIGS. 32A and 32B are diagrams showing yet another example of a mask pattern hard to be affected by the dot deviation in the sheet feeding direction.
Figure 32B:
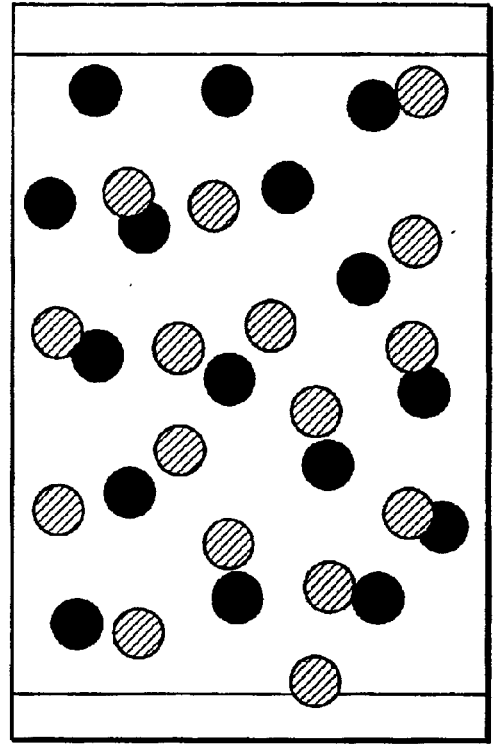

FIGS. 31A and 31B show, for comparison, the case where the dots are randomly printed, so that the resulting image contains low frequency components of dots and does not appear to have evenness. On the other hand, the dots can be visually evenly arranged on the basis of the blue noise mask as shown in FIGS. 32A and 32B. This prevents the dots from being formed with the deviation due to the sheet feeding error and from causing the space between the dots.

Process (4): Using Different Masks for Respective Colors

This process varies the above described mask process for the second area, depending on the color. FIGS. 33A and 33B are diagrams based on the random mask patterns shown in FIGS. 27A and 27B, described above, and show only mask patterns involving magenta and cyan for simplification. Specifically, the (random) relationship between the locations of the dots formed during the first and second passes is varied depending on the color. Thus, taking into consideration, for example, the fact that the different colors have respective effects on striping or texturing, different masks can be used for the respective colors according to the degree of the effects thereof, thus effectively reducing possible stripes or the like.

Further, certain types of the printing medium used are likely to show unevenness of color, textures, or ink bleeding in the case that the dot masses are extended in the sub-scanning direction (process (3)). Accordingly, in the case that printing medium that are likely to show unevenness of color are used, a mask with dot masses extending in the sub-scanning direction may be used only for dots that are visually noticeable, while the mask for the first area may be directly used for the other colors. As a result, possible stripes or the like can be reduced while preventing unevenness of color and other adverse effects.

Process (5): Using Different Masks for Respective Printing Modes

In case of a printing apparatus capable of executing a plurality of printing modes, the type of printing medium or the number of passes for the multi-pass printing may depend on the printing mode. Correspondingly, unevenness of color, ink bleeding, texturing, or the like may occur in different manners. Accordingly, in this process, for the printing on the second area, an appropriate mask is selected according to the printing mode.

If ordinary paper, which is likely to show ink bleeding, is used, since stripes that may result from the deviation of the dot forming locations in the second area are not substantially noticeable, the printing operation may be performed in the same manner as in the first area by favoring the printing speed and without executing this process or any of the above described processes.

Process (6): Using Different Masks for Two or More Types of Dots of Different Sizes This process is applicable to a printing apparatus in which dots formed have a plurality of sizes. The mask used for the second area is varied according to two or more types of dots having different sizes. FIGS. 34A and 34B are diagrams based on the masks for the process (3) shown in FIG. 27, and show masks in which the random arrangement of large and small dots is changed between the first and second passes, as well as the results of printing.

For example, in a printer that uses large and small dots for different colors, such as a printer capable of ejecting, for example, 4 pl and 10 pl of inks for each color, the small dots are used for printing a highlight area with a low density in order to reduce a granular feeling. On the other hand, more large dots are used in areas of an intermediate density or more in order to increase an area factor per printing operation, thereby improving the printing speed. In this case, the above described deviation of the dot forming locations is assumed to have the largest effects on a density area in which the amount of small dots formed is close to its peak and which is located immediately before an area where the large dots are formed. Thus, the mask shown in FIG. 34A can be used preferentially for the small dots.

Further, for a printer that uses large and small dots depending on colors, such as a printer in which the amount of ink ejected is, for example, 4 pl for the magenta and cyan inks and 10 pl for the other color inks, the mask shown in FIG. 34A can be used preferentially for the small dots, taking into consideration the fact that the small dots are more likely to be affected, than the large dots, by the deviation of the dot forming locations in the main- or sub-scanning direction due to their smaller area factor.

Process (7): Using Different Halftone Processes

Figure 35B:
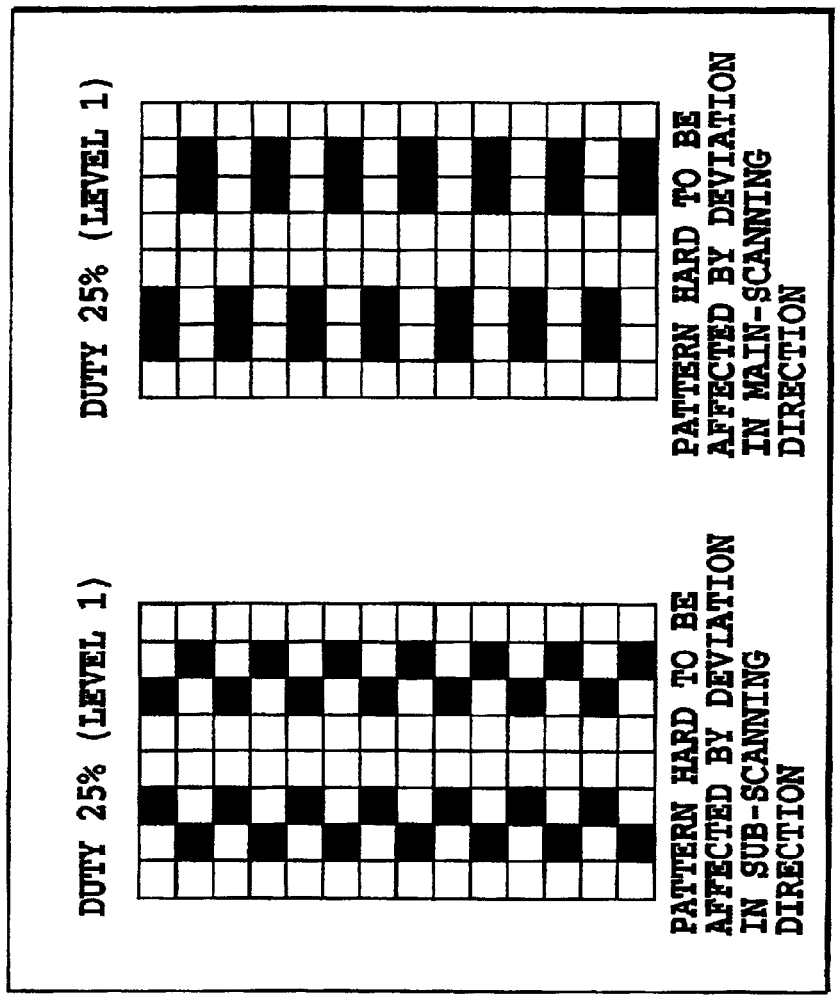
FIGS. 35A and 35B are diagrams for explaining still another process for printing on the second area according to the embodiment of the present invention, and showing index patterns used in a multi-valued process and which are adapted to deal with the deviation of the dot forming locations in the sheet feeding and the main-scanning directions.
Figure 35A:
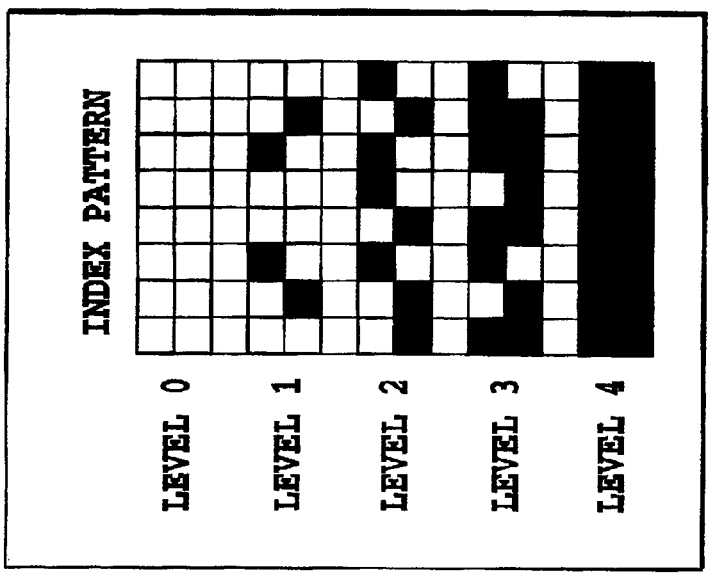

This process varies the index pattern used for multivalued processes, according to the tendency of the deviation of the dot forming locations in the second area. FIG. 35A shows an index pattern for setting dot arrangements for each pixel level of a 5-valued process. FIG. 35B shows an index pattern for a level 1 which is used when the dot forming locations are significantly shifted in the sub- and main-scanning directions. Specifically, the index pattern is determined so that the dots are formed along the direction of the deviation of the dot locations which is particularly likely to occur in the second area, upon the generation of printing data for this area. This prevents, for example, unnecessarily large spaces from being formed among the dots due to the deviation, thereby reducing white stripes.

The present invention is similarly applicable to the error diffusion (ED) or other dither processes, relating to the halftone process. FIGS. 36A to 36C show a normal error diffusion coefficient, an error diffusion coefficient used in the case where the dot forming locations are significantly shifted in the main-scanning direction, and an error diffusion coefficient used in the case where the dot forming locations are significantly shifted in the sub-scanning direction, respectively. Specifically, as shown in these figures, the error diffusion coefficient is determined so that the density value varies slowly along the direction in which the deviation of the dot forming locations increases. More specifically, the error diffused along the direction in which the deviation of the dot forming locations increases is made large (in size) or the error diffusion coefficient itself is made large, so as to minimize the variation of the density value after the error diffusion along the same direction. Then, the number of dots can be increased in the direction of the deviation, thus obtaining effects similar to those of the above described process (2) or (3). For the error diffusion process with respect to a boundary between the first and the second areas, the error diffusion coefficient (or the size) is changed at first raster of the second area after completion of the error diffusion process for the first area. The above described process also applies to the other dither processes, and for example, a dither matrix the size of which increases in the direction in which the deviation increases can be used for the second area.

Process (8): Limiting Number of Nozzles Used

For the second area, in addition to the above described processes (1) to (7), a process can be used which limits the number of ejection ports (also referred to as nozzles) used to one Nth nozzles (for example, in 4-pass printing, 256 nozzles are limited to 64 nozzles. N is a natural number equal to or larger than 2) as shown in FIGS. 37A to 37C. Then, not only the effects of the above-described processes are obtained but the feeding error in the sub-scanning direction during each scanning operation can also be reduced. Furthermore, the limitation of the number of nozzles serves to reduce the bandwidth per raster, thereby increasing the varying frequency of the interval between adjacent rasters. This is visually advantageous.

More preferably, after the number of nozzles used has been limited, the locations of these nozzles are changed depending on the transporting accuracy for the second area or the object of the printer, for example, whether a greater importance is attached to the image quality or the speed.

Specifically, in the case that the feeding accuracy for the second area is extremely lower than that for the first area or in the case that the decrease in the printing speed is to be minimized, the locations of the nozzles used are set more upstream within the print head as shown in FIG. 37C. As a result, the second area can be narrowed (see FIG. 43A) to restrain the image quality from being degraded due to an increase in the deviation of the dot forming locations in the second area, while minimizing the decrease in the printing speed.

On the other hand, in the case that the accuracy for the second area does not substantially decrease compared to the accuracy for the first area in the sub-scanning direction and a greater importance is attached to the image quality, the locations of the nozzles used are set more downstream within the print head. As a result, the printing operation can be performed with the range of nozzles that serve to minimize the unevenness of the printing medium caused by the lack of an appropriate tension acting on the printing medium in the second area. Therefor, the decrease in the image quality can be minimized.

Figure 38A:
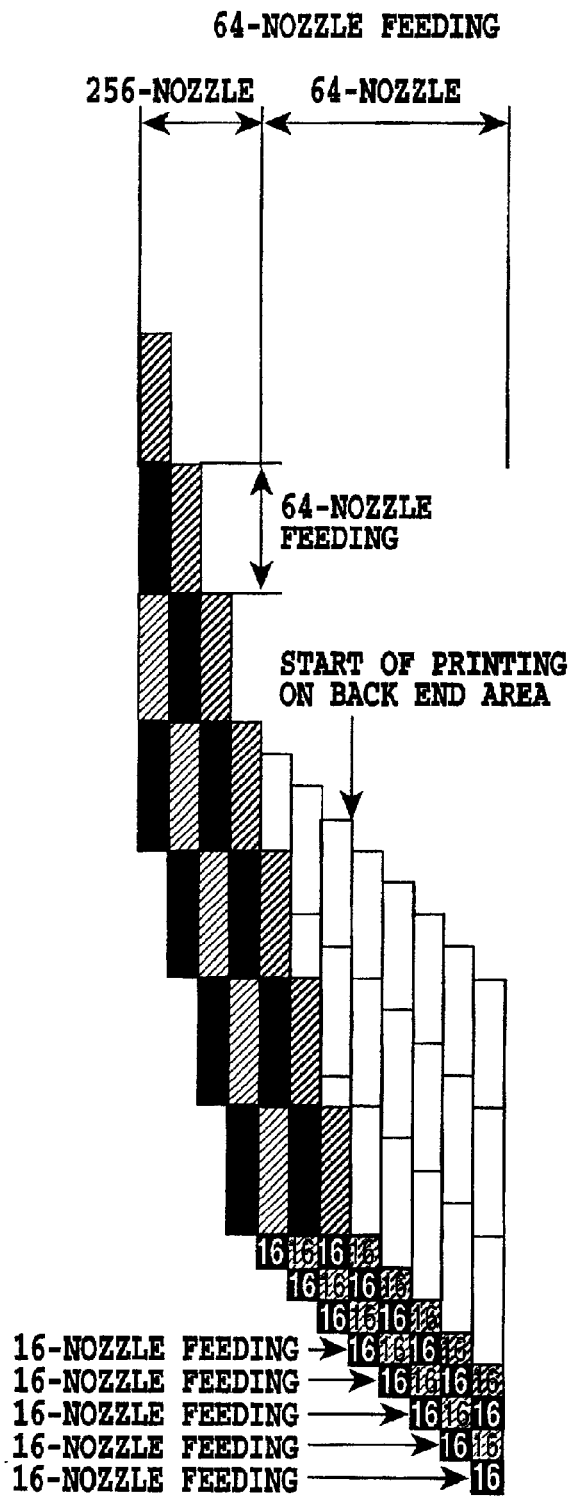
FIGS. 38A to 38C are diagrams for explaining a comparative example of the process of limiting the range of ejection ports used for printing.
Figure 38B:
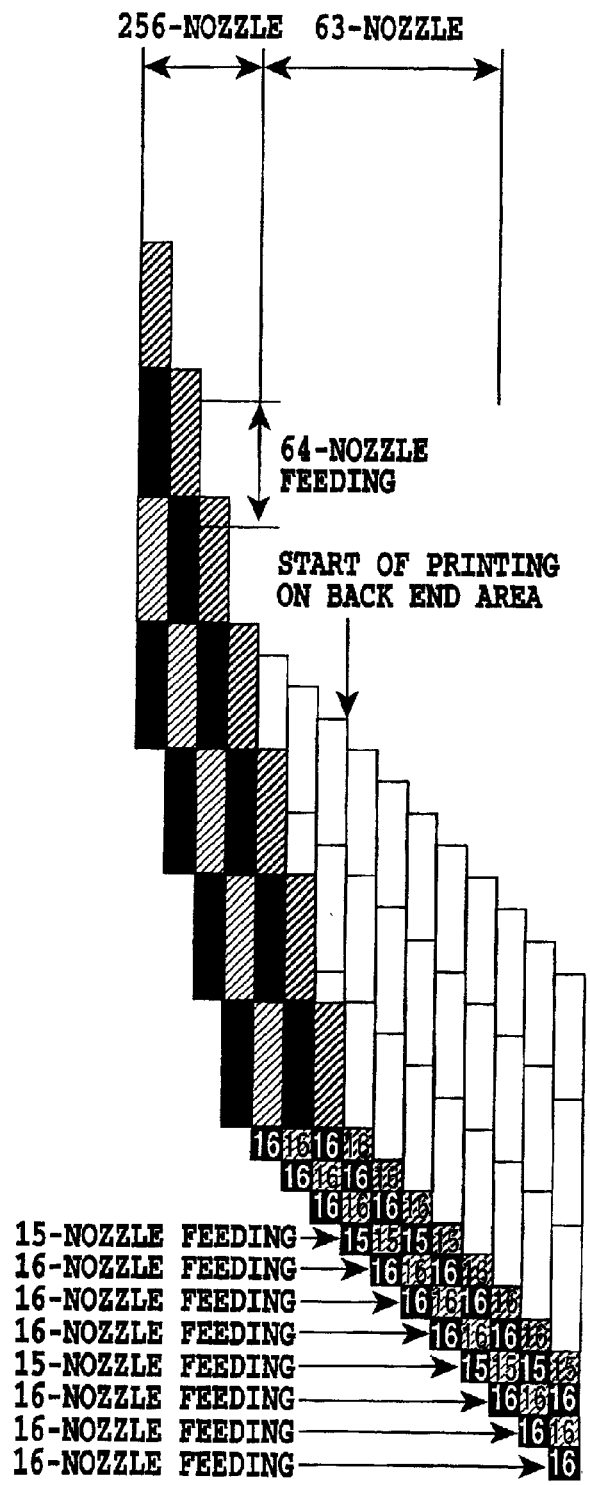
Figure 38C:
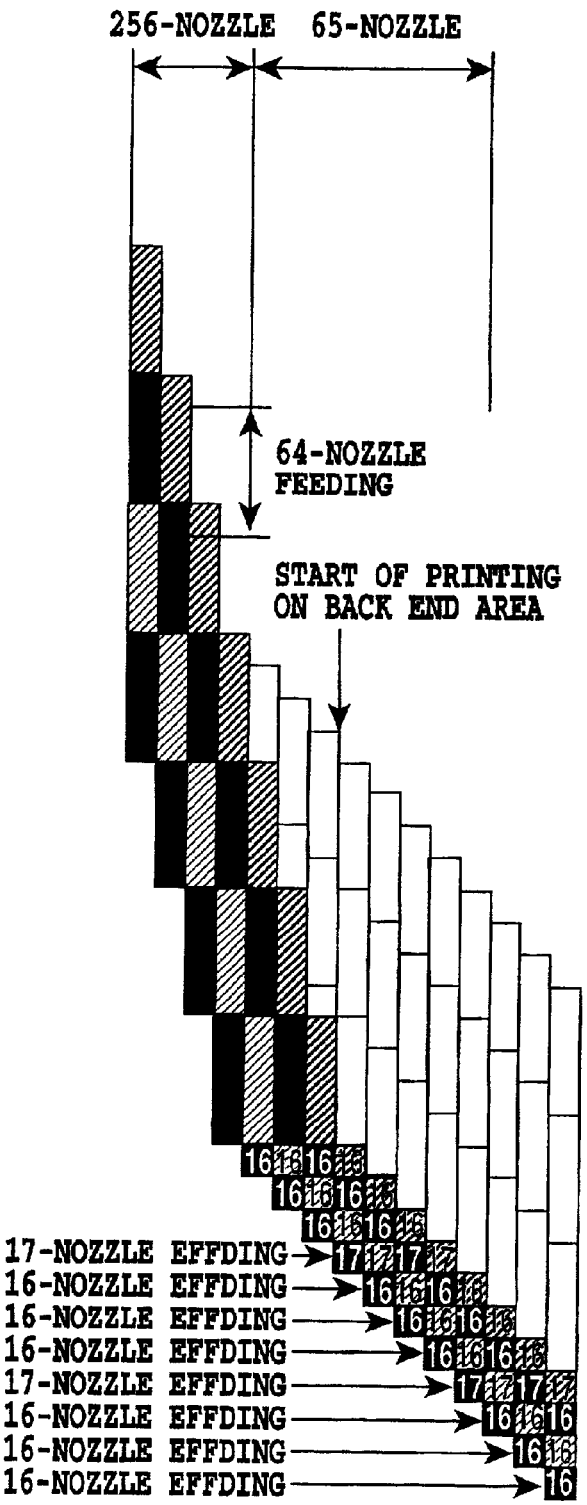
Figure 39A:
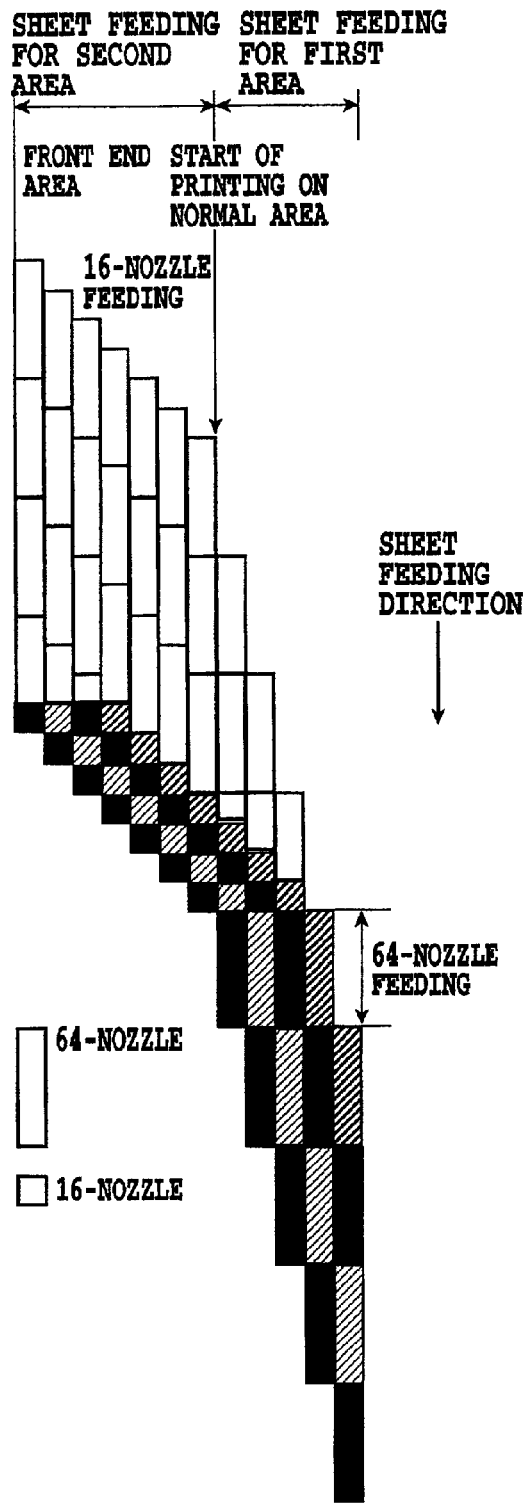
FIGS. 39A and 39B are diagrams for explaining an example of the process of limiting the range of ejection ports used.
Figure 39B:
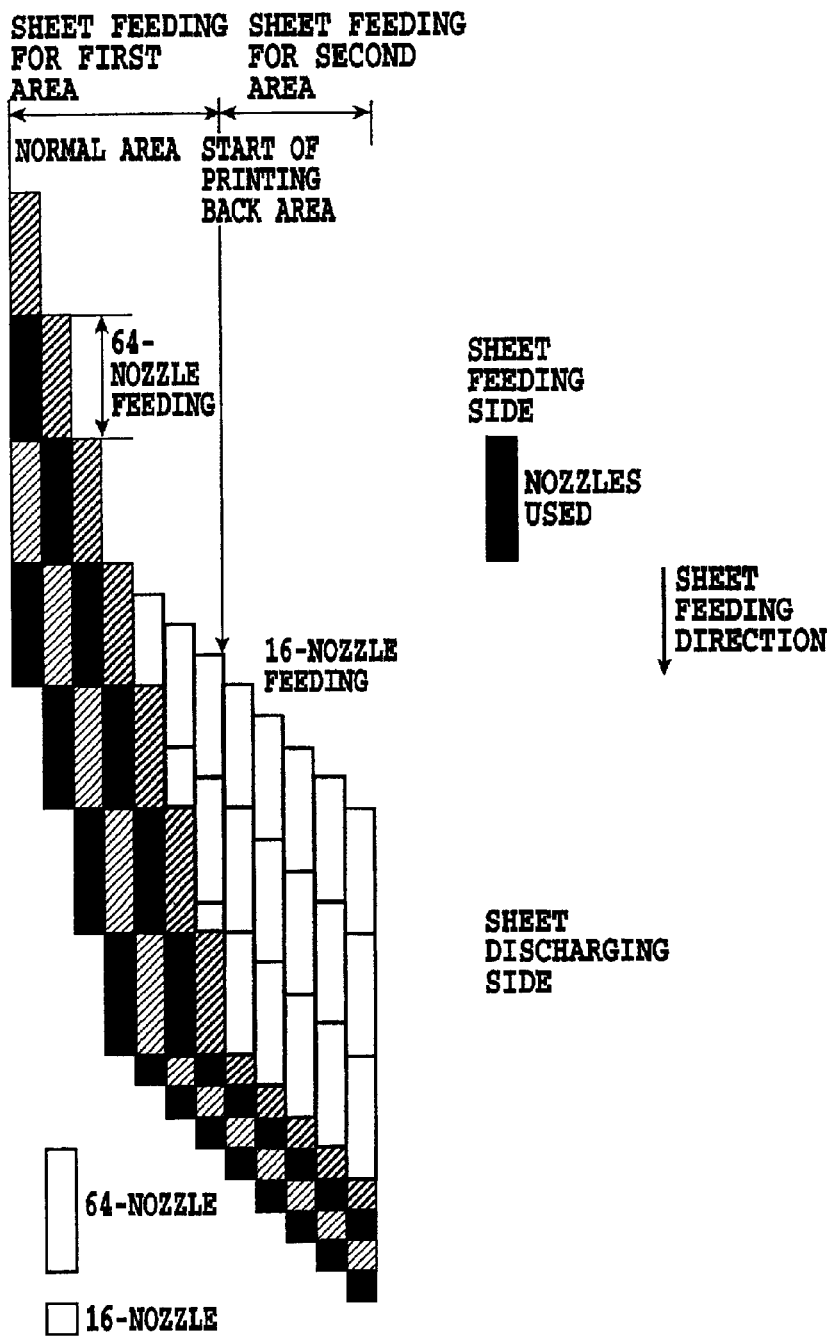

In the case that, in order to reduce the feeding error in the sub-scanning direction, the number of nozzles used is limited to an indivisible number instead of the one Nth (N is a natural number equal to or larger than 2), it is very difficult to control the printing operation (data processing and sheet feeding) compared to the case where the number of nozzles used is limited to one Nth. For example, when 256 nozzles are limited to 63 or 65 nozzles for the 4-pass printing as shown in FIGS. 38A to 38C, the amount of sheet fed per change-line operation changes during a certain period, so that the mask and the amount of sheet fed must be correspondingly switched. As a result, compared to the case where the number of nozzles used is limited to one Nth, the amount of sheet fed must be controlled more precisely, or a larger amount of mask data must be provided so as to allow the mask to be switched properly. Consequently, the printing control becomes complicated.

The above described limitation of the number of nozzles used reduces stripes or textures that may result from the feeding error associated with the third and subsequent changed lines in the second area but does not appropriately deal with the deviation of the dot locations arising from a relatively large feeding error caused by the sheet floating or the kicking or from the curling of the printing sheet, as described above. Accordingly, as described above, in addition to the limitation of the number of nozzles used, the above described processes (1) to (8) are desirably executed as shown in FIG. 38B. FIG. 38A shows that similar processes are applicable to the front end area as the same second area.

Further, the number of nozzles used is more preferably limited in a step by step manner. For example, 250 nozzles are limited to 128 nozzles (half) and then the 128 nozzles are limited to 64 nozzles. Consequently, an uneven density that may result from the switching is prevented to achieve a more optimal process.

Furthermore, when the number of nozzles used is limited, it is preferable that a gradation mask serving to reduce the duties corresponding to both ends of the range nozzles used is used to the extent that the above described processes are not be affected. Specifically, when the number of nozzles used is limited to narrow the printing width per scanning operation and when the dot forming locations are shifted at the opposite ends of the range of nozzles used (this phenomenon is called "deflection"), the use of a mask having an even printing duty may result in white stripes to degrade the image quality. Thus, by using the gradation mask to reduce the use frequencies of the nozzles located at the opposite ends and which may cause the deflection, the printing grade can be prevented from decreasing.

Process (9): Correcting Sheet Feeding Error Using Backup Ejection Ports

This process does not limit the number of nozzles as in the process (8) but corrects the deviation of the dot locations by shifting the locations of the ejection ports for use in the feeding direction (sub-scanning direction) to vary the range of ejection ports used depending on a known error in each pass for the second area. Further, this process may be executed together with the processes (1) to (7) in the case that the correction can not be completed only by the process of (9).

In the example of the deviation of the dot landing locations in the second area shown in Table 1, described above, stripes that are clear enough to be visually recognized appear after the printing based on the pass A after the second change-line operation, as described above. Thus, the correction carried out by this process is applied to the printing during the pass A.

Specifically, the sheet feeding error has a maximum value of 35 $\mu$m, and the ejection ports in the print head of this embodiment are arranged at a pitch of 21.17 $\mu$m. Thus, the above error substantially corresponds to two pixels, that is, two ejection ports.

Figure 40:
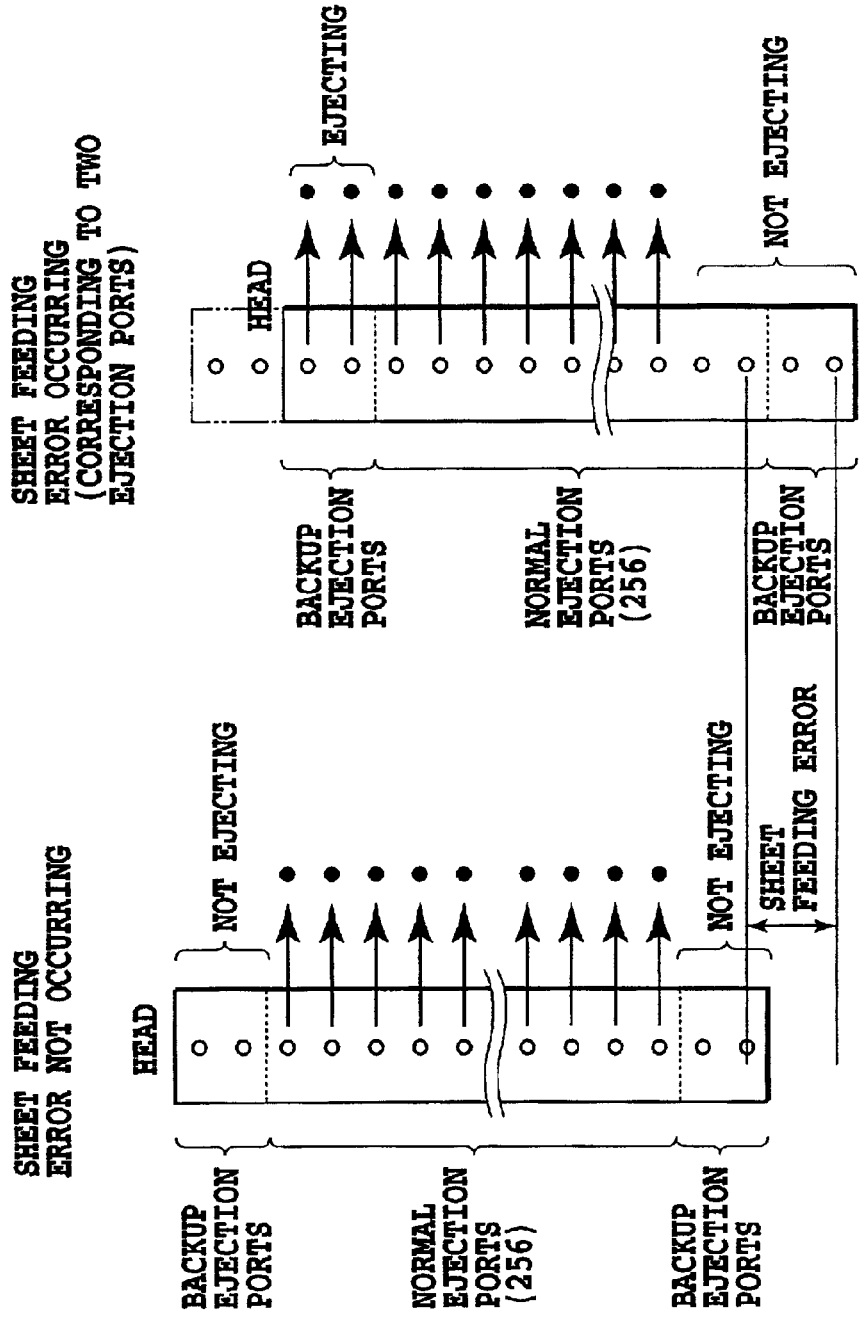
FIG. 40 is a diagram for explaining a process for printing on the second area according to the embodiment of the present invention, wherein the range of ejection ports used for printing is changed.

To this error, in this process, when the second area is printed by the pass A, the two backup ejection ports at the upper end are used, whereas the four ejection ports at the lower end including two backup ejection ports are not used, as shown in FIG. 40. Thus, the deviation of the print head relative to the printing sheet caused by the sheet feeding error can be corrected to reduce the deviation of the dots printed by the pass A to the dots printed during the scanning operation prior to the pass A.

This process is achieved by, for example, driving the print head before each scanning operation to change enabled ejection ports.

The process of using the backup ejection ports as described above can eliminate stripes or the like that may result from the deviation of the dot locations only by executing the process of shifting a range of ejection ports for use in the feeding direction. Consequently, the back end area, in which the sheet is inaccurately fed, can be appropriately printed without reducing the printing speed.

Selecting One or Any of Processes

The above described processes (1) to (7) and the process of limiting the number of nozzles used cannot only be individually executed but any of them can also be combined to obtain a multiplier effect on the reduction of strips arising from the sheet feeding error. Further, these combinations may depend on the printing mode or the performance of hardware such as a printer.

In this case, the process (8): limiting the number of nozzles used and the processes (1) to (7) are the process for dealing with the deviation of the dot formed locations in the second area. Thus, if any of these processes is executed in the first area, the following are not sufficiently coped with: errors resulting from the irregular movement of the carriage (in the main-scanning direction), uneven colors relating to the order of ink impacts, the adverse effect of an inaccurate reciprocating registration on the image, and the like. If the number of nozzles used is further limited, the time required for the printing substantially increases.

For example, for exclusive photographic printing sheets used to print photographic images, dot masses in masks have a size of 2×1 (width×length) in order to prevent uneven colors or the degradation of the image resulting from the deviation of the dot formed locations during reciprocation. Thus, these masses are inconsistent with the masses corresponding to the pattern that prevents the sheet feeding error and having an increased size in the sub-scanning direction, as described in ① of the process (3).

Consequently, it must be determined whether or not the process used for the first process is also used for the second area, depending on whether or not, for the second area, a greater importance should be attached to the same cause of the image degradation.

For example, in a mode in which the printing speed is preferential, the printing speed cannot be lowered in the second area, so that one or any of the following processes may be selected and used solely or in combination:

Process (1): correcting the sheet feeding error using the backup ejection ports

Process (2): changing the duty of the mask (however, the number of passes remains the same as in the first area)

Process (3): Adding noise to the mask

Process (4): Changing the mask to a pattern hard to be affected by the deviation in the sub-scanning direction These combinations or the like serve to restrain the image degradation such as striping which arises from the sheet feeding error, while avoiding reducing the printing speed.

On the other hand, when the image quality is preferential for the second area, a high image quality must be maintained for the second area even if this leads to a decrease in the printing speed. Accordingly, one or any of the following processes may be selected and used solely or in combination to appropriately restrain the image degradation such as striping which may result from the sheet feeding error, while maintaining a high image quality equivalent to that achieved for the first area.

Process (1): correcting the sheet feeding error using the backup ejection ports

Process (2): changing the duty of the mask (setting the number of passes at a sufficient value to reduce the sheet feeding error)

Process (3): Adding noise to the mask

Figure 41:
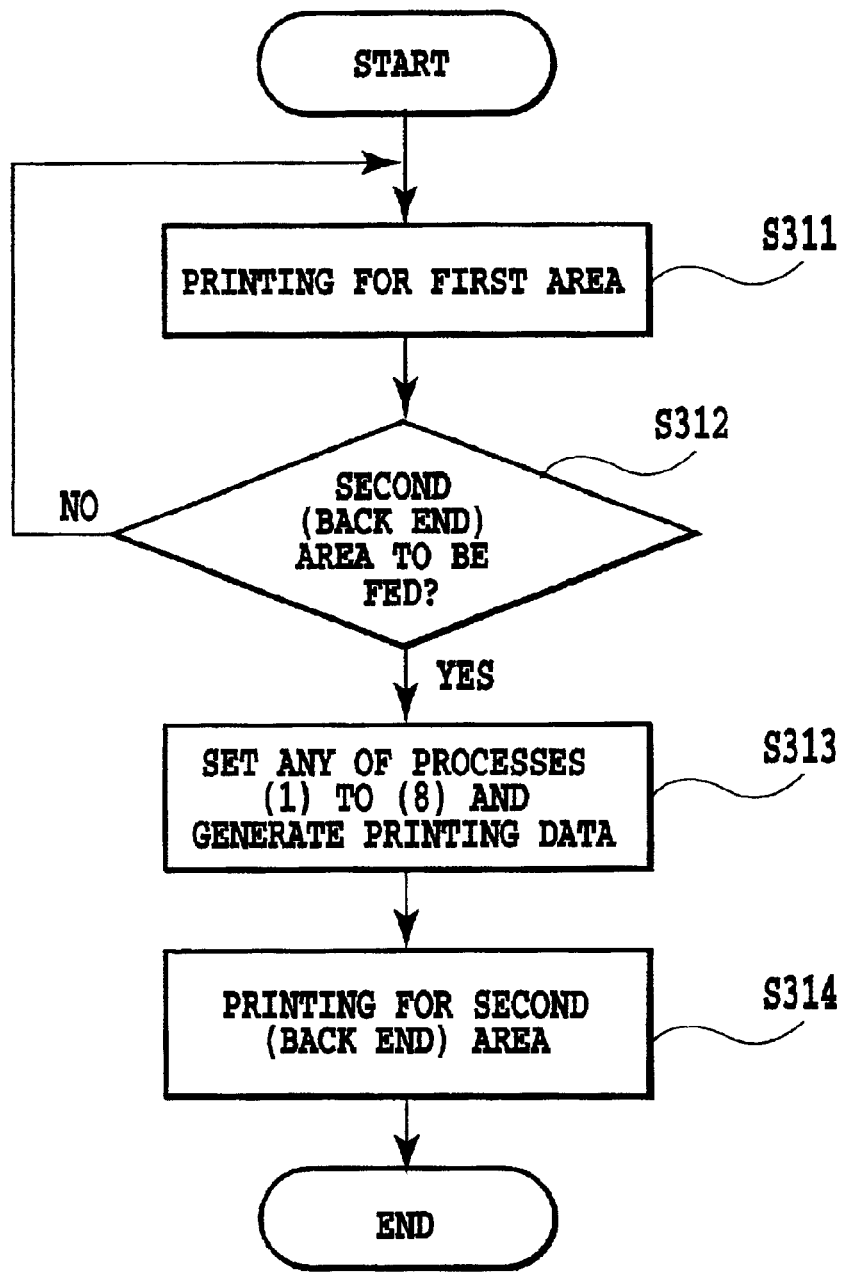
FIG. 41 is a flow chart showing a printing process according to a first embodiment of the present invention.

Process (4): Changing the mask to a pattern hard to be affected by the deviation in the sub-scanning direction Printing Process FIG. 41 is a flow chart showing the procedure of a printing process in a mode of printing the first area and the above described second area.

At step S311, a printing operation is performed on a basis of the feeding of the first area. That is, in this area, the LF roller M3001 essentially ensures the sheet feeding accuracy, and cooperates with the downstream discharge roller M2003 in relatively accurately feeding sheets, while performing a printing operation, as described previously. Specifically, the multi-pass printing method of 4 pass is performed to enable the variation of ejection characteristics relating to the ejection ports or the like to be diffused on the printed image, thereby achieving a relatively high image quality.

At step S312, during the printing operation based on the feeding of the first area, it is determined whether or not the feeding of the printing sheet has switched to the second area thereof. This determination can be made by, for example, using an sheet end sensor installed in the printer main body or using a scanner provided in the carriage or the like to detect, for example, an end of the fed printing sheet and determining, based on the location of this end, the point of time when the back end of the printing sheet leaves the LF roller M3001. This may also be executed on the basis of the sizes of the image and the printing sheet which have previously been input to the printer main body or the personal computer by the user.

The second area is fed in such a manner that after the printing sheet has been disengaged from the LF roller M3001, only the discharge roller M2003 is used to relatively accurately feed the sheet. Thus, when it is determined that the feeding has been switched to this area, then at step S313, to compensate for a decrease in the sheet feeding accuracy, one of the processes (1) to (8) or a combination of any of them is set and printing data is generated on the basis of this setting, as described above. This process setting may be input by the user to the personal computer or to the printer driver beforehand as part of the process. Also, the process (9) may be set at this step.

When the setting has been completed and all the required printing data for the second area has been generated, the second area is printed at step S314, thus completing this printing process.

As described above, according to the first embodiment of the present invention, the process relating to generation of data for forming the dot (for example, mask process) is differentiated between the case of printing on the area (the first area) of the printing medium which is defined when the printing medium is fed by means of both the upstream roller and the downstream roller and the case of printing on the area (the second area) of the printing medium which is defined when the printing medium is fed only by means of the downstream roller. That is, depending on the area on which printing is performed: the first area or the second area, data generating process (masking process) is changed. For, example, when printing is changed from on the first area to on the second area, the data generating process (masking process) is changed accordingly. The first embodiment of the present invention is also such that the data generating process (masking process) is differentiated in accordance with a location of the printing medium which is fed (feeding location of the printing medium). That is, depending on the location of the printing medium: the location which is defined when the printing medium is fed by means of both the upstream roller and the downstream roller and the location which is defined when the printing medium is fed only by means of the downstream roller, the data generating process (masking process) is changed accordingly.

According to the first embodiment described above, deterioration of the printed image due to the dot deviation on the back end area (the second area) can be decreased.

Embodiment 2

Although the first embodiment of the present invention relates to the feeding of the back end area of the printing medium, a second embodiment thereof relates to a printing apparatus in which the front end area constitutes the second area, which is relatively inaccurately fed.

That is, in this embodiment, with a configuration in which the downstream roller 3B can feed sheets relatively accurately, an area of the printing medium 2 starting with the front end thereof and which is printed until the front end reaches the downstream roller 3B is subjected to the same process as described in the first embodiment, as shown in FIG. 43B. The second embodiment can be made same as the first embodiment, except the above described arrangements relating to the upstream and downstream rollers. Thus, the description of the duplicate elements is omitted.

Figure 42:
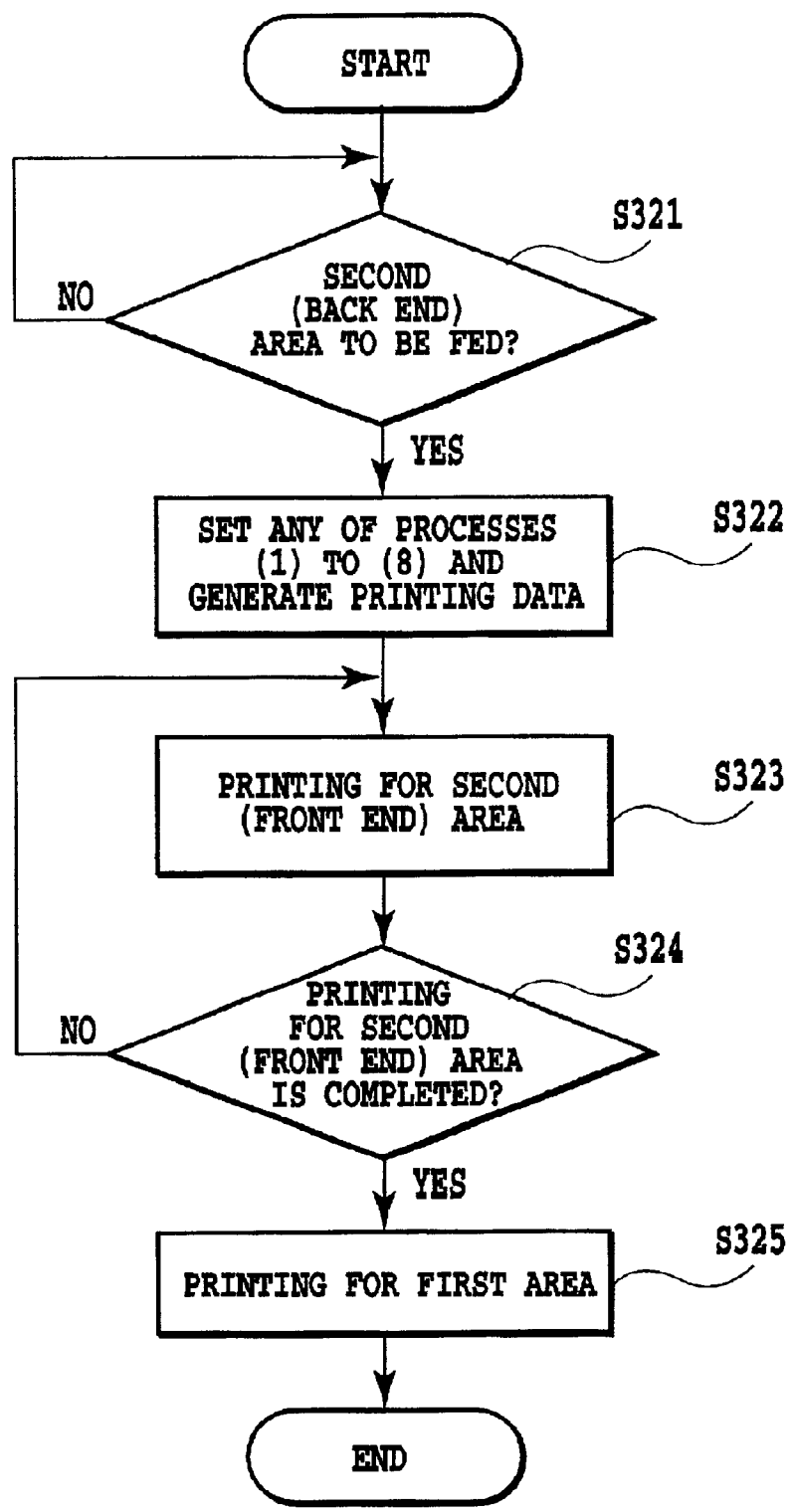
FIG. 42 is a flow chart showing a printing process according to a second embodiment of the present invention.

FIG. 42 is a flow chart showing the procedure of a printing process according to the second embodiment; it shows a process similar to that shown in the flow chart in FIG. 41 for the first embodiment.

When a printing mode of printing on the second (the front end) area is activated, then at step S321, the sensor or the like detects the front end of the printing sheet as in the first embodiment. Then, at step S322, to start printing when the front end or its neighborhood is located opposite the print head, one of the above described processes (1) to (8), a combination of any of them or the process (9) is set. Then, at step S323, the second (leading end) area is printed. While the second area is being printed, it is determined at step S324 whether or not the entire leading end area has been printed. This determination can be made on the basis of sensor or printing data and the size of the printing medium as in the first embodiment.

When printing on the entire second area has been completed, a printing operation is performed at step S325 on the basis of the feeding of the first area, which is relatively accurately fed, thereby completing this process.

As described above, depending on the location of the printing medium: the location which is defined when the printing medium is fed by means of both the upstream roller and the downstream roller and the location which is defined when the printing medium is fed only by means of the upstream roller, the data generating process (masking process) is changed accordingly.

According to the second embodiment, degaradation of the printed image due to the dot deviation on the front end area (the second area) can be decreased.

In consideration of both the first and the second embodiments, the process relating to generation of data for forming the dot (for example, mask process) is differentiated between the case of printing on the area (the first area) of the printing medium which is defined when the printing medium is fed by means of both the upstream roller and the downstream roller and the case of printing on the area (the second area) of the printing medium which is defined when the printing medium is fed only by means of any of the upstream or the downstream roller. According to this configuration, an adverse effect by the dot deviation on the second area in which relative large deviation may occur can be decreased.

Embodiment 3

The third embodiment of the present invention is featured in combination of the first and the second embodiments described above. More specifically, the third embodiment executes any of or the combination of any of the process (1) to (9) for both the back end and front end areas while the first embodiment execute that processes for the back end area and the second embodiment execute that processes for the front end area.

According to the third embodiment, for both the back end and front end areas the process for decreasing the dot deviation so that degradation of the printed image due to the dot deviation can be suppressed.

The above described embodiments relate to a printer using print heads comprising printing elements based on what is called the bubble jet method, but the application of the present invention is of course not limited to such a printing method. The present invention is applicable to a printing apparatus using print heads comprising printing elements based on the ink jet method, any printing method using printing elements having piezoelectric elements, or any thermal transfer method other than the ink jet method, as is apparent from the above description.

Other Embodiments

As described above, the present invention is applicable either to a system comprising plural pieces of device (such as a host computer, interface device, a reader, and a printer, for example) or to an apparatus comprising one piece of device (for example, a copy machine or facsimile terminal device).

Additionally, an embodiment is also included in the category of the present invention, wherein program codes of software such as those shown in FIGS. 19 to 42, for example, which realize the above described embodiments, are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a nonvolatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

According to the embodiments of the present invention, the printing medium has the first and second areas specified for feeding of the printing medium, and when the second area is printed, in which the dot forming locations are more significantly deviated in relation to the printing medium than in the first area, the process for generating dot forming data for each printing operation of the plurality of scanning operations is made differed from the one for the first area. Preferably, the process is made differed from the process for the first area in such a manner that the dots are formed during each of the plurality of scanning operations so that the deviation of the dot forming locations in the second area is made unnoticeable. Accordingly, even if the deviation of the dot forming locations on the printing medium increases because of a printing medium feeding error in the second area or the unevenness of the printing medium, the degradation of the printed image caused by the deviation of the dot locations is not perceived when the printed image is viewed as a whole.

Further, when the second area is subject to printing, the range of printing elements in the print head used for the second area has the same size as the range of printing elements used for the first area in relation to feeding of the printing medium and includes printing elements different from those used for printing on the first area. Consequently, the printing operation can be performed so as to deal with and compensate for the feeding error without changing the amount of printing on a single scanning operation, thus restraining the deviation of the dots resulting from the above described errors.

As a result, the transportation area in which the dot formed locations may be significantly shifted due to the transporting accuracy or the like can be printed without degrading the image quality.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An image printing method for executing an operation that cuases a printing head having a plurality of printing elements to scan a plurality of times on a same line on a printing medium so that different printing elements are used in the plurality of scans to form dots on the same line, and an operation that cuases the printing medium to be fed between the scans of the printing head, to print an image on the printing medium, said method comprising:

a first distributing step for of first and second areas defined on the printing medium in relation to feeding said printing medium, distributing data for the dots to be formed on the same line of the first area by using mask patterns, among the plurality of scans; and a second distributing step for distributing data for the dots to be formed on the same line of hte second area, in which a deviation of dot forming location become larger than that in the first area, by using mask patterns, among the plurality of scans, wherein the number of scans to the same line of the first erea is the same as the number of scans to the same line of the second area, and wherein data distribution of the mask patterns for the plurality of scans which are used for the first distributing step, are different from the data distribvtion ratios of the mask patterns for the plurality of scans, which are used fo rthe second step.

2. An image processing method as claimed in claim 1, wherein the first area is an area on the printing medium printeable with the printing head when the printing medium is held by both an upstream roller and a down stream roller, both roller being provided for feeding the printing medium, and the second area is an area on the printing medium printable with the printing head when the printing medium is held by any one of the upstream roller and the down stream roller.

3. An image printing method for executing an operation that causes a printing head having a plurality of printing elements to scan a plurality of times on a same line on a printing medium so that different printing elements are used in the plurality of scans to form dots on the same line, and an operation that causes the printing medium to be fed, by at least one of a first feed roller and a second feed roller, between the scans of the printing head, to print an image on the printing medium, comprising the steps:

a first distributing step for distributing data for the dots to be formed on the same line of a first area on the printing medium by using mask patterns, among the plurality of scans, the dot formation onto the first area being performed in a state where the printing medium is held by both the first feed roller and the second feed roller, the first feed roller being disposed on a upstream side of the printing head in a direction in which the printing medium is fed and the second feed roller being disposed on a downstream side of the printing head in the feed direction; and a second distributing step for distributing data for the dots to be formed on the same line of a second area different from the first area on the printing medium by using mask patterns, among the plurality of scans, the dot formation onto the second area being performed in a state where the printing medium is held by any one of the first feed roller and the second feed roller, wherein the number of scans to the same line of the first area is the same as the number of scans to the same line of the second area, and wherein data distribution ratios of the mask patterns used in said first distributing step are different from the data distribution ratios of the mask patterns used in the second distributing step.

4. An image printing method as claimed in claim 3, wherein printing on the second area is performed using a part of the plurality of printing elements in the printing head during the plurality of scans between which a feeding operation by a smaller feeding amount than the feeding amount in the first area is intervened.

5. An image printing method as claimed in claim 3, wherein the data distribution ratios of the mask patterns used in the second distributing step are determined so that, of the plurality of scans, for a scan which is separated a longer time from a predetermined scan, the higher data distribution ratio is determined.

6. An image printing method as claimed in claim 5, wherein the predetermined scan is a scan in which an accumulated error relating to feeding of the printing medium in a second area is maximum, and the distributing of data is performed for only the scan in which the accumulated error is smaller than a predetermined value.

7. An image printing method as claimed in claim 3, wherein a sum of the data distribution ratios of the mask patterns used in the second distributing step is greater than 100%.

8. An image printing method as claimed in claim 7, wherein noises are added to the mask patterns for making the sum of the data distribution ratios of the mask patterns to be greater than 100%.

9. An image printing method for executing an scanning operation that causes a printing head having a plurality of printing elements to scan a plurality of times on a same line on a printing medium so that different printing elements are used in the plurality of scans to form dots on the same line, and an feeding operation that causes the printing medium to be fed between the scans of the printing head, to print an image on the printing medium, said method comprising:

a first distributing step for distributing data for the dots to be formed on the same line of a first area on the printing medium by using mask patterns, among the plurality of scans, the first area being printed during the plurality of scans between which the feeding operation by a first feeding amount is intervened; and a second distributing step for distributing data for the dots to be formed on the same line of a second area on the printing medium, by using mask patterns, among the plurality of scans, the second area being printed during the plurality of scans between which the feeding operation by a second feeding amount smaller than the first feeding amount is intervened, wherein the number of scans to the same line of the first area is the same as the number of scans to the same line of the second area, and wherein the mask patterns used for the first distributing step are different from to mask patterns used for the second distributing step.

10. An image printing method as claimed in claim 9, wherein each the mask pattern used for the second distributing step is a pattern which can form a plurality of dots continuously in a feeding direction.

11. An image printing method as claimed in claim 9, wherein each mask used for the second distributing step is a pattern which can form a plurality of dots continuously in a feeding and scanning direction.

12. An image printing method as claimed in claim 9, wherein each mask pattern used for the second distribution step is a pattern where dot formable positions are arranged at random.

13. An image processing method as claimed in claim 9, wherein the second feeding amount is set at 1/N (N is an integer greater than or equal to 2) of the first feeding amount.

14. An image printing method as claimed in claim 9, wherein the printing head is capable of forming at least first color dots and second color dots, and the mask patterns used for the second distributing step are different between the first and second color.

15. An image printing method as claimed in claim 9, wherein the mask patterns used for the second distributing step are different depending on printing modes.

16. An image printing method as claimed in claim 9, wherein the printing head is capable of forming two or more sizes of dots and the mask patterns used for the second distributing step are different in accordance with the size of dot formed.

17. An image processing method for generating data used in operation that causes a printing head having a plurality of printing elements to scan a plurality of times on a same line on a printing medium so that different printing elements are used in the plurality of scans to form dots on the same line, and an operation that causes the printing medium to be fed between the scans of the printing head, to print an image on the printing medium, said method comprising:

performing a process relating to generation of dot forming data for printing in each of the plurality of scans on a second area in which a deviation of dot forming location becomes larger than that in a first area, the first and second areas being defined on the printing medium in relation to feeding said printing medium, wherein a process relating to generation of dot forming data for the second area is different from the process relating to generation of dot forming data for the first area, the process relating to generation of dot forming data being a process using an index pattern in accordance with density level of a pixel.

18. An image processing method for generating data used in operation that causes a printing head having a plurality of printing elements to scan a plurality of times on a same line on a printing medium so that different printing elements are used in the plurality of scans to form dots on the same line, and a operation that causes the printing medium to be fed between the scans of the printing head, to print an image on the printing medium, said method comprising:

performing a process relating to generation of dot forming data for printing in each of the plurality of scans on a second area in which a deviation of dot forming location becomes larger than that in a first area, the first and second areas being defined on the printing medium in relation to feeding said printing medium, a process relating to generation of dot forming data for the second area is different from the process relating to generation of dot forming data for the first area, the process relating to generation of dot forming data being an error diffusion process.

19. An image processing method for generating data used in operation that causes a printing head having a plurality of printing elements to scan a plurality of times on a same line on a printing medium so that different printing elements are used in the plurality of scans to form dots on the same line, and an operation that causes the printing medium to be fed between the scans of the printing head, to print an image on the printing medium, said method comprising:

performing a process relating to generation of dot forming data for printing in each of the plurality of scans on a second area in which a deviation of dot forming location becomes larger than that in a first area, the first and second areas being defined on the printing medium in relation to feeding said printing medium, a process relating to generation of dot forming data for the second area is different from the process relating to generation of dot forming data for the first area, the process relating to generation of dot forming data being a dither process.

20. A control method for a printing apparatus, which uses a printing head having a plurality of printing elements and performs scanning with the printing head relatively to a printing medium so as to perform printing, wherein if printing is performed on a second area in which a deviation of dot forming location becomes larger than that in a first and second areas being defined on the printing medium in relation to feeding said printing medium, feeding of the printing medium is executed at the same feeding amount as the first area, a range of printing elements used in changed by shifting the printing elements used without changing a number of printing elements which is a number of printing elements which is a number of printing elements used for the first area, and printing is controlled to be performed with the changed printing elements.

21. An image printing apparatus for executing an operation that causes a printing head having a plurality of printing elements to scan a plurality of times on a same line on a printing medium so that different printing elements are used in the plurality of scans to form dots on the same line, and an operation that causes the printing medium to be fed between the scans of the printing head, to print an image on the printing medium, said apparatus comprising:

first distributing means for, of first and second areas defined on the printing medium in relation to feeding said printing medium, distributing data for the dots to be formed on the same line of the first area by using mark patterns, among the plurality of scans; and second distributing means for distributing data for the dots to be formed on the same line of the second area, in which a deviation of dot forming location becomes larger than that in the first area, by using mask patterns, among the plurality of scans, wherein the number of scans to the same line of the first area is the same as the number of scans to the same line of the second area, wherein data distribution ratios of the mask patterns for the plurality of scans, which are used for said first distributing means, are different from the data distribution ratios of the mask patterns for the plurality of scans, which are used for said second distributing means.

22. An image apparatus as claimed in claim 21, wherein the first area is an area on the printing medium printable with the printing head when the printing medium is held by both an upstream roller and a down stream roller, both roller being provided for feeding the printing medium, and the second area is an area on the printing medium printable with the printing head when the printing medium is held by any one of the upstream roller and the down stream roller.

23. An image printing apparatus for executing an operation that causes a printing head having a plurality of printing elements to scan a plurality of times on a same line on a printing medium so that different printing elements are used in the plurality of scans to form dots on the same line, and an operation that causes the printing medium to be fed between the scans of the printing head, to print an image on the printing medium, said apparatus comprising:

a first roller for feeding the printing medium, the first feed roller being disposed on a upstream side of the printing head in a direction in which the printing medium is fed;

a second roller for feeding the printing medium, the second feed roller being disposed on a downstream side of the printing head in a direction in which the printing medium is fed;

first distributing means for distributing the data for the dots to be formed on the same line of a first area on the printing medium by using mask patterns, among the plurality of scans, the dot formation on the first area being performed in a state where the printing medium is held by both the first feed roller and the second feed roller; and second distributing means for distributing data for the dots to be formed on the same line of a second area different from the first area on the printing medium by using mask patterns, among the plurality of scans, the dot formation onto the second area being performed in a state where the printing medium is held by any one of the first feed roller and the second feed roller, wherein the number of scans to the same line of the first area is the same as the number of scans to the same line of the second area, and wherein data distribution ratios of the mask patterns used by said first distributing means are different from the data distribution ratios of the mask patterns used by said second distribution means.

24. An image printing apparatus as claimed in claim 23, wherein printing on the second area is performed using a part of the plurality of printing elements in the printing head during the plurality of scans between which a feeding operation by a smaller feeding amount than the feeding amount in the first area.

25. An image processing apparatus for executing an scanning operation that causes a printing head having a plurality of printing elements to scan a plurality of times on a same line on a printing medium so that different printing elements are used in the plurality of scans to form dots on the same line, and a feeding operation that causes the printing medium to be fed between the scan of the printing head, to print an image on the printing medium, said apparatus comprising:

first distributing means for distributing data for the dots to be formed on the same line of a first area on the printing medium by using mask patterns, among the plurality of scans, the first area being printed during the plurality of scans between which the feeding operation by a first feeding amount is intervened; and second distributing means for distributing data for the dots to be formed on the same line of a second area on the printing medium by using mask patterns, among the plurality of scans, the second area being printed during the plurality of scans between which the feeding operation by a second feeding amount smaller than the first feeding amount is intervened, wherein the number of scans to the same line of the first area is the same as the number of scans to the same line of the second area, and wherein the mask patterns used for said first distributing means are different from the mask patterns used for the second distributing means.

26. An image printing apparatus as claimed in claim 25, wherein the first feeding amount is set at 1/N (N is an integer greater than or equal to 2) of the second feeding amount.

27. A printing apparatus, which uses a printing head having a plurality of printing elements and performs scanning with the printing head relatively to a printing medium so as to perform printing, wherein if printing is performed on a second area in which a deviation of dot forming location becomes lager than that in a first area, and first and second areas being defined on the printing medium in relation to feeding said printing medium, feeding of the printing medium is executed at the same feeding said printing medium, feeding of the printing medium is executed at the same feeding amount as the first area, a range of printing elements used is changed by shifting the printing elements used without changing a number of printing elements which is a number of printing elements used for the first area, and printing is controlled to be performed with the changed printing elements.

* * * * *

UNITED STATES PATENT AND TRADEMARK OFFICE
CERTIFICATE OF CORRECTION

PATENT NO.     : 6,963,423 B2
DATED          : November 8, 2005
INVENTOR(S)    : Takayuki Ogasahara et al.

It is certified that error appears in the above-identified patent and that said Letters Patent is hereby corrected as shown below:

Column 4,
Line 57, "the" (1st occurrence) should be deleted.

Column 5,
Lines 17 and 18, "differed" should read -- different --.

Column 6,
Lines 17 and 23, "example" should read -- example of --.

Column 30,
Line 3, "the" (3rd occurrence) should be deleted.

Column 31,
Line 38, "is" should be deleted.

Column 32,
Line 62, "above" should read -- above- --.

Column 40,
Line 49, "for" should read -- for, --.
Line 57, "become" should read -- becomes --.
Line 61, "erea" should read -- area --.
Line 63, "distribution" should read -- distribution ratios --.

Column 41,
Line 4, "down stream" should read -- downstream --.
Line 5, "roller" should read -- rollers --.
Line 8, "down" should read -- downstream --.
Line 9, delete "stream".

Column 42,
Lines 3 and 8, "an" should read -- a --.
Line 28, "to" should read -- the --.
Line 31, "the" should be deleted.
Line 35, "mask" should read -- mask pattern --.

Column 43,
Line 15, "a" should read -- an --.
Line 55, "first and" should read -- first area, the first and --.
Line 59, "in" should read -- is --.
Line 62, "which is a number of printing elements" should be deleted.

UNITED STATES PATENT AND TRADEMARK OFFICE
CERTIFICATE OF CORRECTION

PATENT NO. : 6,963,423 B2
DATED : November 8, 2005
INVENTOR(S) : Takayuki Ogasahara et al.

It is certified that error appears in the above-identified patent and that said Letters Patent is hereby corrected as shown below:

<u>Column 44,</u>
Line 28, "down stream" should read -- downstream --.
Line 42, "a" should read -- an --.

<u>Column 45,</u>
Line 9, "an" should read -- a --.
Line 15, "scan" should read -- scans --.

<u>Column 46,</u>
Line 16, "lager" should read -- larger --.
Line 17, "and" (1st occurrence) should read -- the --.
Line 21, "said printing medium," should be deleted.
Line 22, should be deleted.
Line 23, "feeding" should be deleted.

Signed and Sealed this

Fourth Day of April, 2006

JON W. DUDAS
*Director of the United States Patent and Trademark Office*